(12) United States Patent
Hashimoto et al.

(10) Patent No.: US 12,532,004 B2
(45) Date of Patent: Jan. 20, 2026

(54) IMAGE DECODING APPARATUS

(71) Applicant: Sharp Kabushiki Kaisha, Osaka (JP)

(72) Inventors: Tomonori Hashimoto, Sakai (JP); Tomohiro Ikai, Sakai (JP); Takeshi Chujoh, Sakai (JP); Eiichi Sasaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/782,503

(22) Filed: Jul. 24, 2024

(65) Prior Publication Data

US 2024/0380902 A1  Nov. 14, 2024

Related U.S. Application Data

(63) Continuation of application No. 18/142,105, filed on May 2, 2023, now Pat. No. 12,096,008, which is a continuation of application No. 17/276,535, filed as application No. PCT/JP2019/037107 on Sep. 20, 2019, now Pat. No. 11,689,731.

(30) Foreign Application Priority Data

Sep. 21, 2018 (JP) ................................ 2018-177818

(51) Int. Cl.
*H04N 19/182* (2014.01)
*H04N 19/105* (2014.01)
*H04N 19/159* (2014.01)
*H04N 19/70* (2014.01)

(52) U.S. Cl.
CPC ......... *H04N 19/182* (2014.11); *H04N 19/105* (2014.11); *H04N 19/159* (2014.11); *H04N 19/70* (2014.11)

(58) Field of Classification Search
CPC .. H04N 19/182; H04N 19/105; H04N 19/159; H04N 19/70; H04N 19/174; H04N 19/176; H04N 19/577
See application file for complete search history.

(56) References Cited

U.S. PATENT DOCUMENTS

| | | | |
|---|---|---|---|
| 2019/0230350 A1* | 7/2019 | Chen | H04N 19/139 |
| 2021/0037258 A1* | 2/2021 | Zhang | H04N 19/577 |
| 2021/0314609 A1* | 10/2021 | Yu | H04N 19/186 |

OTHER PUBLICATIONS

Hashimoto et al., "Image Decoding Apparatus", U.S. Appl. No. 18/142,105, filed May 2, 2023.

\* cited by examiner

*Primary Examiner* — Francis Geroleo
(74) *Attorney, Agent, or Firm* — Keating & Bennett, LLP

(57) ABSTRACT

A WP prediction and a GBI prediction are adaptively used in combination. A video decoding apparatus (31) includes: a weighted prediction unit (3094) configured to generate a prediction image by using at least one of a weight coefficient or an offset configured for a first unit region and a weight coefficient configured for a second unit region different from the first unit region, the weight coefficient and the offset each being applied to a pixel value included in one or a plurality of reference images.

1 Claim, 39 Drawing Sheets

(a)

| gbiIndex | Weight value of $w_1$ | Binarization of gbiIndex |
|---|---|---|
| 0 | -1/4 | 0000 |
| 1 | 3/8 | 001 |
| 2 | 1/2 | 1 |
| 3 | 5/8 | 01 |
| 4 | 5/4 | 0001 |

(b)

| gbiIndex | Weight value of $w_1$ | Binarization of gbiIndex |
|---|---|---|
| 0 | 3/8 | 00 |
| 1 | 1/2 | 1 |
| 2 | 5/8 | 01 |

FIG. 13

```
if(luma_log2_weight_denom>3)
{
  shift=luma_log2_weight_denom-3;
  w0=w0+(gbw0<<shift);
  w1=w1+(gbw1<<shift);
  log2Wd=luma_log2_weight_denom+shift1+1;
}
else
{
  shift=3-luma_log2_weight_denom;
  w0=(w0<<shift)+gbw0;
  w1=(w1<<shift)+gbw1;
  log2Wd=4+shift1;
}
```

WP WEIGHT DERIVATION

```
w0=LumaWeightL0[refIdxL0]
w1=LumaWeightL1[refIdxL1]
o0=luma_offset_l0[refIdxL0]<<WpOffsetBdShiftY
o1=luma_offset_l1[refIdxL1]<<WpOffsetBdShiftY
log2Wd=luma_log2_weight_denom+shift1
```

(b)

GBI WEIGHT DERIVATION

```
gbw0=gbiWtable[gbiIndex]
gbw1=(1<<log2Gbi)-gbiWtable[gbiIndex]
log2Gbi2=log2Gbi+shift1-1
```

(c)

INTEGRATED WEIGHT DERIVATION

```
if(log2Wd>log2Gbi2) //>= MAY BE USED INSTEAD OF > OK
{
  shift=log2Wd-log2Gbi2
  w0=w0+(gbw0<<shift), w1=w1+(gbw1<<shift)
  log2Wd = log2Wd + 1 (= luma_log2_weight_denom + shift1 + 1)
}
else
{
  shift=log2Gbi2-log2Wd
  w0=(w0<<shift)+gbw0, w1=(w1<<shift)+gbw1
  o0=(o0<<shift), o1=(o1<<shift)
  log2Wd=log2Gbi2 + 1 (=log2Gbi+shift1)
}
```

(d)

WP BI-PREDICTION WEIGHTED PREDICTION

```
(predL0[x][y]*w0
+ predL1[x][y]*w1
+ ((o0+o1+1)<<log2Wd))>>(log2Wd+1)
```

FIG. 29

INTEGRATED WEIGHT DERIVATION

```
if(luma_log2_weight_denom+shift1>log2Gbi+shift1-1)//>= MAY BE USED INSTEAD OF > OK
{
  shift=(luma_log2_weight_denom+shift1)-(log2Gbi+shift1-1)
    w0=w0+(gbw0<<shift),w1=w1+(gbw1<<shift)
    log2Wd=log2Wd + 1(= luma_log2_weight_denom + shift1 + 1)
}
else
{
 shift=(log2Gbi+shift1-1)-(luma_log2_weight_denom+shift1)
  w0=(w0<<shift)+gbw0,w1=(w1<<shift)+gbw1
  o0=(o0<<shift),o1=(o1<<shift)
  log2Wd=log2Gbi2 + 1(=log2Gbi+shift1)
}
```

FIG. 30

INTEGRATED WEIGHT DERIVATION

```
if(luma_log2_weight_denom>log2Gbi-1) // >= MAY BE USED INSTEAD OF > OK
{
  shift=luma_log2_weight_denom-log2Gbi+1
  w0=w0+(gbw0<<shift), w1=w1+(gbw1<<shift)
  log2Wd=log2Wd + 1 (= luma_log2_weight_denom + shift1 + 1)
}
else
{
   shift=log2Gbi-1-luma_log2_weight_denom
  w0=(w0<<shift)+gbw0, w1=(w1<<shift)+gbw1
  o0=(o0<<shift), o1=(o1<<shift)
  log2Wd=log2Gbi2 + 1 (=log2Gbi+shift1)
}
```

FIG. 31

INTEGRATED WEIGHT DERIVATION

```
if(luma_log2_weight_denom>3) //>= MAY BE USED INSTEAD OF > OK
{
  shift=luma_log2_weight_denom-3
  w0=w0+(gbw0<<shift), w1=w1+(gbw1<<shift)
  log2Wd=luma_log2_weight_denom + shift1  + 1
}
else
{
  shift=3-luma_log2_weight_denom
  w0=(w0<<shift)+gbw0, w1=(w1<<shift)+gbw1
  o0=(o0<<shift), o1=(o1<<shift)
  log2Wd=4+shift1
}
```

| WP WEIGHT DERIVATION | w0=LumaWeightL0[refIdxL0]<br>w1=LumaWeightL1[refIdxL1]<br>o0=luma_offset_l0[refIdxL0]<<WpOffsetBdShiftY<br>o1=luma_offset_l1[refIdxL1]<<WpOffsetBdShiftY<br>log2Wd==luma_log2_weight_denom+shift1 |

(b)

| GBI WEIGHT DERIVATION | gbw0=gbiWtable[gbiIndex]<br>gbw1=(1<<log2Gbi)-gbiWtable[gbiIndex] |

(c)

| INTEGRATED WEIGHT DERIVATION | w0=w0*gbw0<br>w1=w1*gbw1<br>o0=o0*gbw0<br>o1=o1*gbw1<br>log2Wd=log2Wd+log2Gbi-1 |

(d)

| BI-PREDICTION WEIGHTED PREDICTION | (predL0[x][y]*w0<br>+predL1[x][y]*w1<br>+((o0+o1+1)<<log2Wd))>>(log2Wd+1) |

FIG. 33

IMAGE DECODING APPARATUS

TECHNICAL FIELD

The embodiment of the present invention relates to a video decoding apparatus and a video coding apparatus.

BACKGROUND ART

A video coding apparatus which generates coded data by coding a video, and a video decoding apparatus which generates decoded images by decoding the coded data are used for efficient transmission or recording of videos.

Specific video coding schemes include, for example, schemes proposed in H.264/AVC and High-Efficiency Video Coding (HEVC), and the like.

In such a video coding scheme, images (pictures) constituting a video are managed in a hierarchical structure including slices obtained by splitting an image, coding tree units (CTUs) obtained by splitting a slice, units of coding (coding units; which will be referred to as CUs) obtained by splitting a coding tree unit, and transform units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

In addition, NPL 1 is exemplified as a recent technique for video coding and decoding.

CITATION LIST

Non Patent Literature

NPL 1: "Algorithm Description of Joint Exploration Test Model 7," JVET-G1001, Joint Video Exploration Team (JVET) of ITU-T SG 16 WP 3 and ISO/IEC JTC 1/SC 29/WG 11, Aug. 19, 2017

SUMMARY OF INVENTION

Technical Problem

In a prediction using a Weighted prediction (WP) prediction, a Generalized bi-prediction (GBI prediction), or the like, a prediction image is generated by multiplying an interpolation image by a weight coefficient.

Each of the weighted prediction and the GBI prediction uses a specific weight coefficient. Therefore, in terms of which weight coefficient is used, a problem that it may be difficult to use the WP prediction and the GBI prediction simply in combination may arise.

Furthermore, in generation of a prediction image by the GBI prediction, in a case that a prediction image with fade, resolve, or the like is generated, a problem may arise that an effect equivalent to that in the generation of the prediction image by the weighted prediction is not obtained.

Furthermore, in a weighted prediction in a merge prediction mode, a problem may arise in which an available weight coefficient may not be inherited from merge candidates.

Furthermore, a problem may arise that the generation technology of prediction image using the GBI prediction is used in a bi-prediction (bi-pred), and therefore cannot be used in a uni-prediction (uni-pred).

Furthermore, in the generation of the prediction image using the GBI prediction, a problem may arise that the table size of a table indicating the weight coefficient may be increased.

Solution to Problem

In order to solve the above-described problems, an image decoding apparatus according to an aspect of the present invention is an image decoding apparatus for performing image decoding processing with reference to a prediction image, the image decoding apparatus includes: a prediction image generation unit configured to generate a bi-prediction image by using a weight coefficient of a first prediction configured for a first unit region and a weight coefficient of a second prediction configured for a second unit region different from the first unit region, the weight coefficient of the first prediction and the weight coefficient of the second prediction each being a weight coefficient applied to a pixel value included in one or a plurality of reference images, in which the weight coefficient of the first prediction is a coefficient selected, based on a reference picture index, from a plurality of the weight coefficients decoded from coded data, in a case that the first prediction is on, a prediction image is generated by using the weight coefficient of the first prediction, the weight coefficient of the second prediction is a coefficient selected, based on a GBI index decoded from coded data, from a table of weight coefficients, and in a case that the first prediction is off and the second prediction is on, a prediction image is generated by using the weight coefficient of the second prediction.

In order to solve the above-described problems, an image decoding apparatus according to an aspect of the present invention is an image decoding apparatus for performing image decoding processing with reference to a prediction image, the image decoding apparatus includes: a prediction image generation unit configured to generate a prediction image by using a weight coefficient of a second prediction (a weight coefficient of GBI prediction) applied to a pixel value included in one or a plurality of reference images, in which the weight coefficient of the second prediction is a coefficient selected, based on a GBI index decoded from coded data, from a table of weight coefficients, a bi-prediction image is generated by using the weight coefficient of the second prediction in a case that the GBI index indicates a value other than a prescribed value, and otherwise a bi-prediction image is generated by using a weight coefficient of ½.

In order to solve the above-described problems, an image decoding apparatus according to an aspect of the present invention is an image decoding apparatus for performing image decoding processing with reference to a prediction image, the image decoding apparatus includes: a prediction image generation unit configured to generate a prediction image by using a weight coefficient of a second prediction applied to a pixel value included in one or a plurality of reference images, in which in a case that the prediction image generation unit generates a prediction image by using a merge prediction, the weight coefficient of the second prediction is a coefficient selected, based on a GBI index derived from a weight coefficient of a spatial merge candidate, from a table of weight coefficients, a bi-prediction image is generated by using the weight coefficient of the second prediction in a case that the GBI index indicates a value other than a prescribed value, and otherwise a bi-prediction image is generated by using a weight coefficient of ½.

Advantageous Effects of Invention

According to the configurations described above, any of the above-described problems can be solved.

BRIEF DESCRIPTION OF DRAWINGS

FIG. 13 is diagram illustrating examples (a) and (b) of a table gbwTable[ ] including a plurality of weight coefficient candidates used in a GBI prediction according to the present embodiment.

FIG. 28 is a diagram illustrating an example of derivation of integrated weight coefficients by the weighted prediction unit according to the present embodiment.

FIGS. 29(a) to (d) are diagrams illustrating an example of a WP bi-prediction weighted prediction using the derived integrated weight coefficients by the weighted prediction unit according to the present embodiment.

FIG. 30 is a diagram illustrating an example of derivation of the integrated weight coefficients and offsets by the weighted prediction unit according to the present embodiment.

FIG. 31 is a diagram illustrating an example of derivation of the integrated weight coefficients and the offsets by the weighted prediction unit according to the present embodiment.

FIG. 32 is a diagram illustrating an example of derivation of the integrated weight coefficients and the offsets by the weighted prediction unit according to the present embodiment.

FIG. 33 is a diagram illustrating an example of a bi-prediction weighted prediction using the derived integrated weight coefficients by the weighted prediction unit according to the present embodiment.

DESCRIPTION OF EMBODIMENTS

First Embodiment

Hereinafter, an embodiment of the present invention will be described with reference to the drawings.

Figure 1:
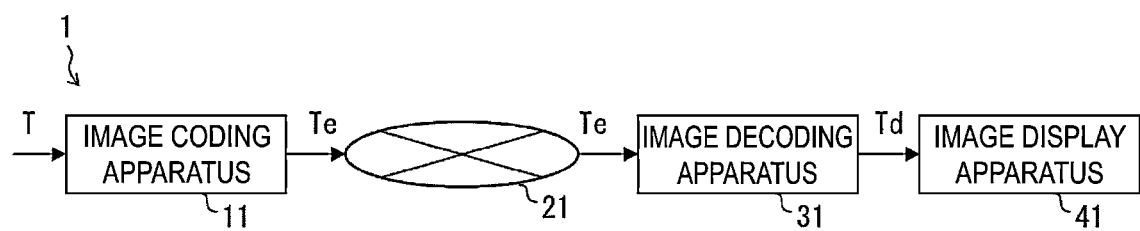
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. Furthermore, the network 21 may be substituted by a storage medium in which the coding stream Te is recorded, such as a Digital Versatile Disc (DVD: registered trademark) or a Blue-ray Disc (BD: registered trademark).

The video decoding apparatus 31 decodes each of the coding streams Te transmitted from the network 21 and generates one or a plurality of decoded images Td.

The video display apparatus 41 displays all or part of one or a plurality of decoded images Td generated by the video decoding apparatus 31. For example, the video display apparatus 41 includes a display device such as a liquid crystal display and an organic Electro-Luminescence (EL) display. Forms of the display include a stationary type, a mobile type, an HMD type, and the like. In addition, in a case that the video decoding apparatus 31 has a high processing capability, an image having high image quality is displayed, and in a case that the apparatus has a lower processing capability, an image which does not require high processing capability and display capability is displayed.

Operator

Operators used in the present specification will be described below.

>> is a right bit shift, << is a left bit shift, & is a bitwise AND, | is a bitwise OR, |= is an OR assignment operator, and | indicates a logical sum.

x?y: z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
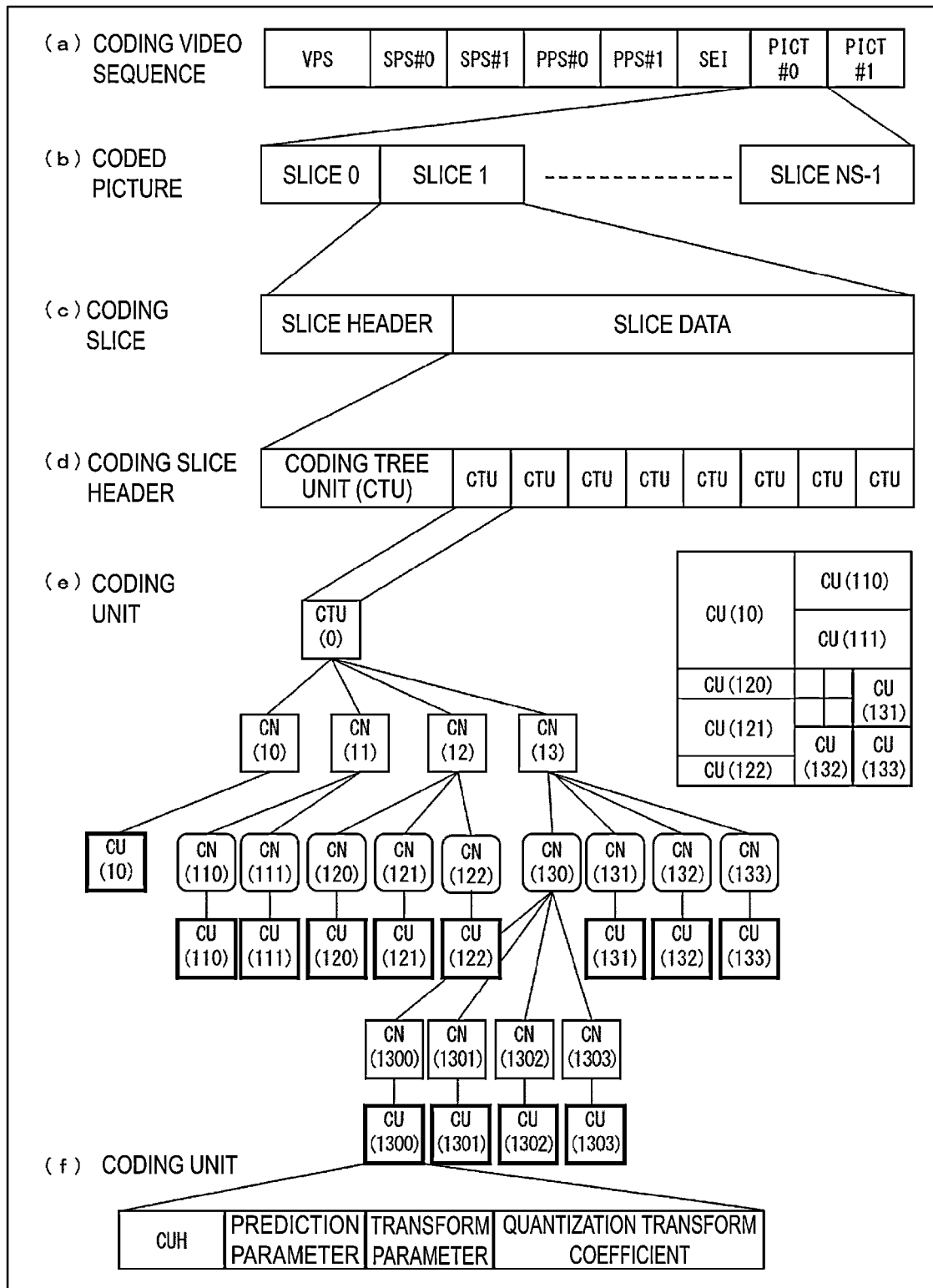
FIG. 4 is a diagram illustrating a hierarchical structure of data of a coding stream.

FIG. 4 is a diagram illustrating a hierarchical structure of data of the coding stream Te. The coding stream Te includes a sequence and a plurality of pictures constituting the sequence illustratively. (a) to (f) of FIG. 4 are diagrams illustrating a coding video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit, respectively.

Coding Video Sequence

In the coding video sequence, a set of data referred to by the video decoding apparatus 31 to decode the sequence SEQ to be processed is defined. As illustrated in FIG. 4(a), the sequence SEQ includes a Video Parameter Set, a Sequence Parameter Set SPS, a Picture Parameter Set PPS, a picture PICT, and Supplemental Enhancement Information SEI.

In the video parameter set VPS, in a video including a plurality of layers, a set of coding parameters common to a plurality of videos and a set of coding parameters associated with the plurality of layers and an individual layer included in the video are defined.

In the sequence parameter set SPS, a set of coding parameters referred to by the video decoding apparatus 31 to decode a target sequence is defined. For example, a width and a height of a picture are defined. Note that a plurality of SPSs may exist. In that case, any of the plurality of SPSs is selected from the PPS.

In the picture parameter set PPS, a set of coding parameters referred to by the video decoding apparatus 31 to decode each picture in a target sequence is defined. For example, a reference value (pic_init_qp_minus26) of a quantization step size used for decoding of a picture and flags (weighted_pred_flag, weighted_bipred_flag) indicating an application of a prediction with weight are included. Note that a plurality of PPSs may exist. In that case, any of the plurality of PPSs is selected from each picture in a target sequence.

Coded Picture

In the coded picture, a set of data referred to by the video decoding apparatus 31 to decode the picture PICT to be processed is defined. As illustrated in FIG. 4(b), the picture PICT includes a slice 0 to a slice NS−1 (NS is the total number of slices included in the picture PICT).

Note that in a case that it is not necessary to distinguish each of the slice 0 to the slice NS−1 below, subscripts of reference signs may be omitted. In addition, the same applies to other data with subscripts included in the coding stream Te which will be described below.

Coding Slice

In the coding slice, a set of data referred to by the video decoding apparatus 31 to decode the slice S to be processed is defined. As illustrated in FIG. 4(c), the slice includes a slice header and a slice data.

The slice header includes a coding parameter group referred to by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Furthermore, in a case that flags (weighted_pred_flag, weighted_bipred_flag) indicating application of the prediction with weight signalled by the picture parameter set PPS are 1 (indicating the application of the prediction with weight), the slice header includes information required to derive weighted prediction parameters (weight coefficients, offsets) described later in the slice header. These weighted prediction parameters are specified for each reference picture.

Note that the slice header may include a reference to the picture parameter set PPS (pic_parameter_set_id).

Coding Slice Data

In the coding slice data, a set of data referred to by the video decoding apparatus 31 to decode the slice data to be processed is defined. The slice data includes a CTU as illustrated in FIG. 4(d). The CTU is a block of a fixed size (for example, 64×64) constituting a slice, and may be called a Largest Coding Unit (LCU).

Coding Tree Unit

In FIG. 4(e), a set of data referred to by the video decoding apparatus 31 to decode the CTU to be processed is defined. The CTU is split into coding unit CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

The CT includes, as CT information, a QT split flag (cu_split_flag) indicating whether or not to perform a QT split, an MT split flag (split_mt_flag) indicating the presence or absence of an MT split, an MT split direction (split_mt_dir) indicating a split direction of an MT split, and an MT split type (split_mt_type) indicating a split type of the MT split. cu_split_flag, split_mt_flag, split_mt_dir, and split_mt_type are sent for each coding node.

Figure 5:
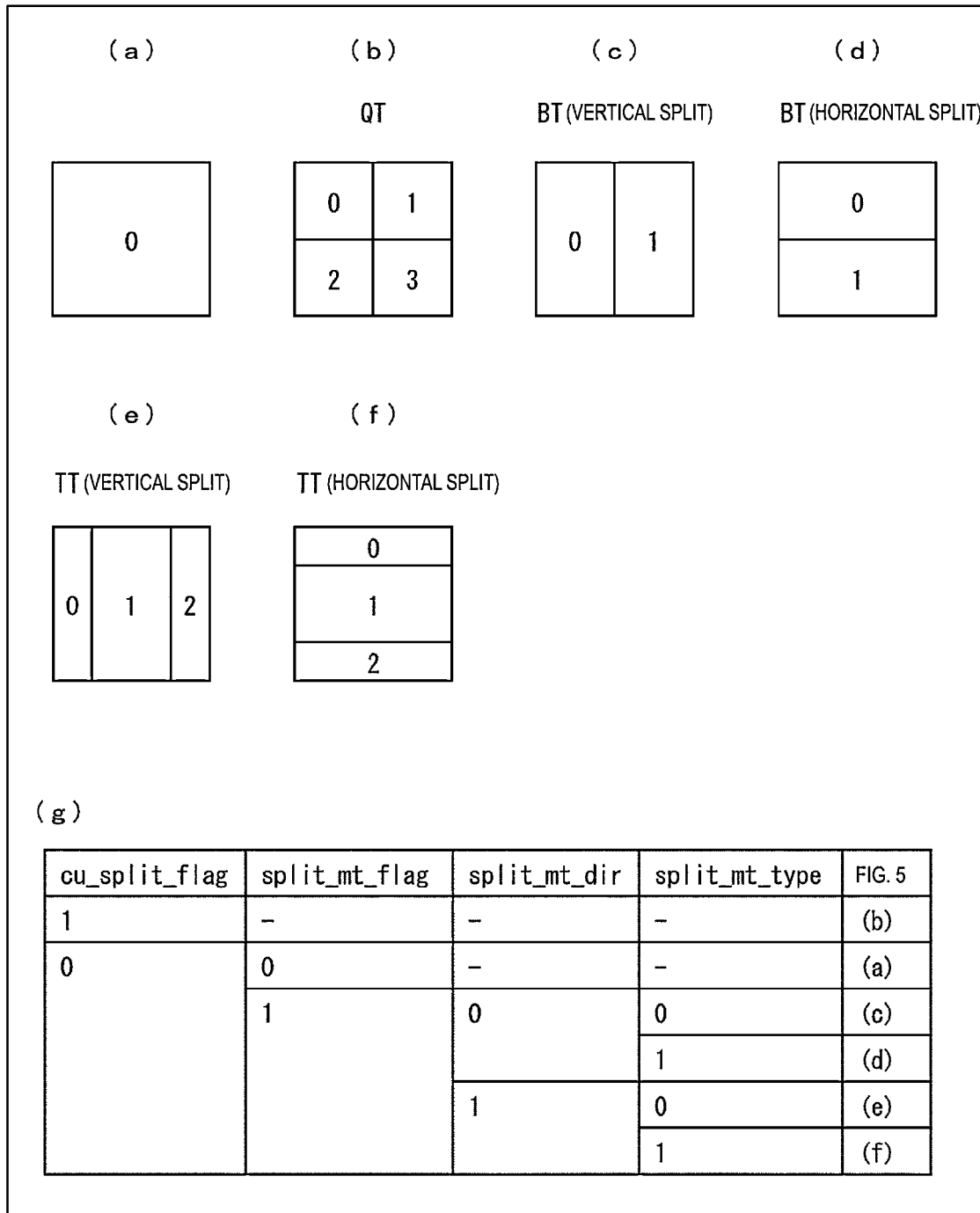
FIG. 5 is a diagram illustrating a split example of a CTU.

In a case that cu_split_flag is 1, the coding node is split into four coding nodes (FIG. 5(b)).

In a case that cu_split_flag is 0, in a case that split_mt_flag is 0, the coding node is not split and has one CU as a node (FIG. 5(a)). The CU is an end node of the coding nodes and is not split any further. The CU is a basic unit of coding processing.

In a case that split_mt_flag is 1, the coding node is subjected to the MT split as described below. In a case that split_mt_type is 0, the coding node is horizontally split into two coding nodes (FIG. 5(d)) in a case that split_mt_dir is 1, and the coding node is vertically split into two coding nodes (FIG. 5(c)) in a case that split_mt_dir is 0. Furthermore, in a case that split_mt_type is 1, the coding node is horizontally split into three coding nodes (FIG. 5(f)) in a case that split_mt_dir is 1, and the coding node is vertically split into three coding nodes (FIG. 5(e)) in a case that split_mt_dir is 0. These are illustrated in FIG. 5(g).

Furthermore, in a case that a size of the CTU is 64×64 pixels, a size of the CU may take any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in FIG. 4(f), a set of data referred to by the video decoding apparatus 31 to decode the coding unit to be processed is defined. Specifically, the CU is constituted of a CU header CUH, a prediction parameter, a transform parameter, a quantization transform coefficient, and the like. In the CU header, a prediction mode and the like are defined.

There are cases that the prediction processing is performed in units of CU or performed in units of sub-CU in which the CU is further split. In a case that the sizes of the CU and the sub-CU are equal to each other, the number of sub-CUs in the CU is one. In a case that the CU is larger in size than the sub-CU, the CU is split into sub-CUs. For example, in a case that the CU has a size of 8×8, and the sub-CU has a size of 4×4, the CU is split into four sub-CUs which include two horizontal splits and two vertical splits.

There are two types of predictions (prediction modes), which are intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in units of CU, but the quantization transform coefficient may be subjected to entropy coding in units of subblock such as 4×4.

Prediction Parameter

A prediction image is derived by a prediction parameter accompanying a block. The prediction parameter includes prediction parameters of the intra prediction and the inter prediction.

The prediction parameter of the inter prediction will be described below. The inter prediction parameter is constituted by prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive inter prediction parameters include a merge flag merge_flag, a merge index merge_idx, an inter prediction indicator inter_pred_idc, a reference picture index refIdxLX, a prediction vector index mvp_LX_idx, and a difference vector mvdLX.

Reference Picture List

Figure 6:
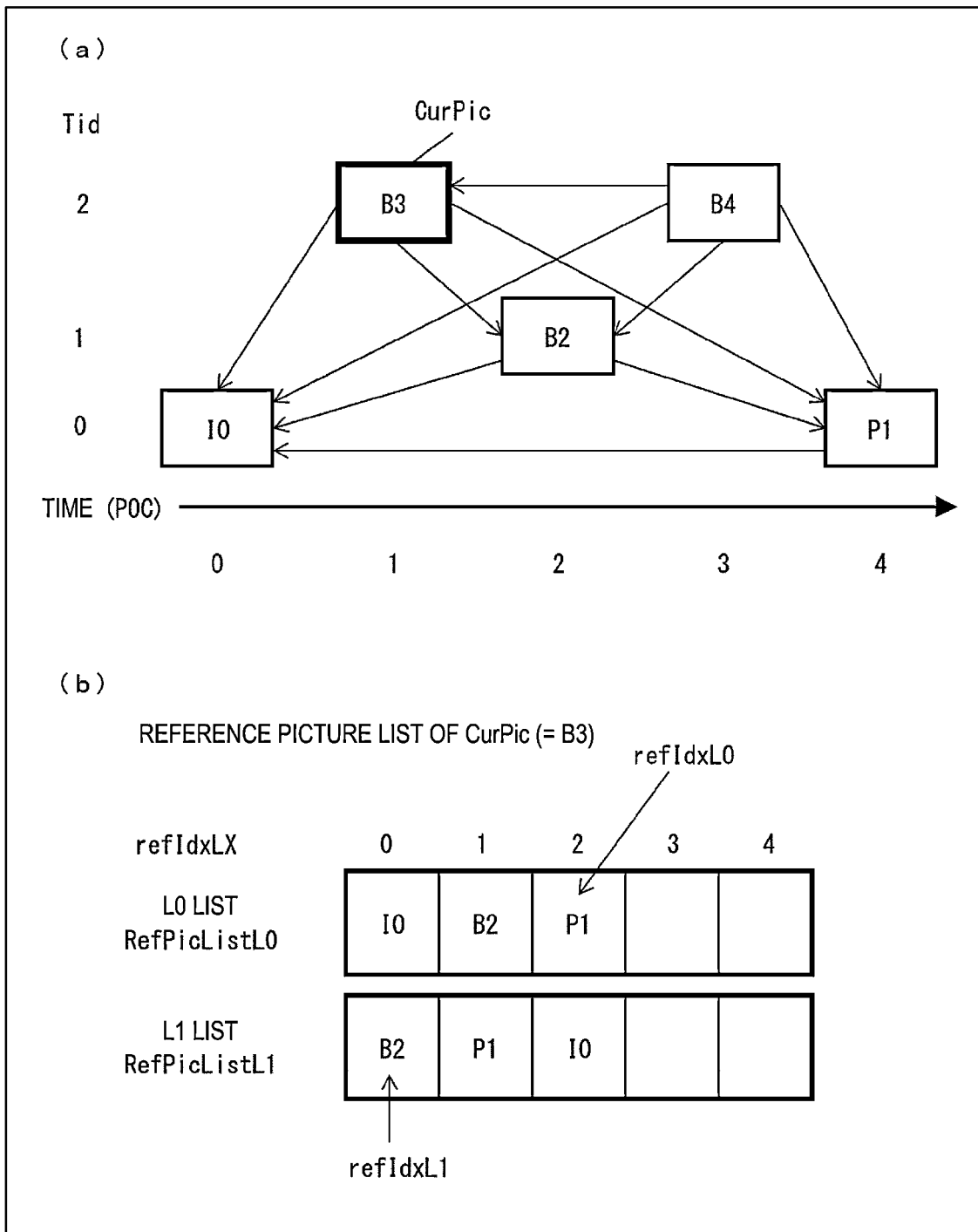
FIG. 6 is a conceptual diagram illustrating an example of reference pictures and reference picture lists.

A reference picture list is a list constituted by reference pictures stored in a reference picture memory 306. FIG. 6 is a conceptual diagram illustrating an example of reference pictures and reference picture lists. In FIG. 6(a), a rectangle indicates a picture, an arrow indicates a reference relationship of a picture, a horizontal axis indicates time, each of I, P, and B in a rectangle indicates an intra-picture, a uni-prediction picture, a bi-prediction picture, and a number in a rectangle indicates a decoding order. As illustrated, the decoding order of the pictures is I0, P1, B2, B3, and B4, and the display order is I0, B3, B2, B4, and P1. FIG. 6(b) illustrates an example of reference picture lists of the picture B3 (target picture). The reference picture list is a list to represent a candidate of a reference picture, and one picture (slice) may include one or more reference picture lists. In the illustrated example, the target picture B3 includes two reference picture lists, i.e., an L0 list RefPicList0 and an L1 list RefPicList1. For an individual CU, which picture in a reference picture list RefPicListX (X=0 or 1) is actually referred to is specified with the reference picture index refIdxLX. The diagram illustrates an example of refIdxL0=2, refIdxL1=0. Note that LX is a description method used in a case of not distinguishing an L0 prediction and an L1 prediction, and in the following description, distinguishes parameters for the L0 list and parameters for the L1 list by replacing LX with L0 and L1.

Merge Prediction and AMVP Prediction

Decoding (coding) methods of prediction parameters include a merge prediction (merge) mode and an Adaptive Motion Vector Prediction (AMVP) mode, and the merge flag merge_flag is a flag to identify these. The merge prediction mode is a mode to use to derive from prediction parameters of neighboring blocks already processed without including a prediction list utilization flag predFlagLX (or inter prediction indicator inter_pred_idc), the reference picture index refIdxLX, and a motion vector mvLX in coded data. The AMVP mode is a mode in which the inter prediction indicator inter_pred_idc, the reference picture index refIdxLX, and the motion vector mvLX are included in coded data. Note that, the motion vector mvLX is coded as the prediction vector index mvp_LX_idx identifying a prediction vector mvpLX and the difference vector mvdLX. Furthermore, in addition to the merge prediction mode, there may be an affine prediction mode identified by an affine flag affine_flag and a matching prediction mode identified by a matching flag fruc_flag.

The inter prediction indicator inter_pred_idc is a value indicating types and the number of reference pictures, and takes any value of PRED_L0, PRED_L1, and PRED_BI. PRED_L0 and PRED_L1 indicate uni-predictions which use one reference picture managed in the L0 list and one reference picture managed in the L1 list, respectively. PRED_BI indicates a bi-prediction BiPred which uses two reference pictures managed in the L0 list and the L1 list.

The merge index merge_idx is an index to indicate which prediction parameter is used as a prediction parameter of a target block among prediction parameter candidates (merge candidates) derived from blocks of which the processing is completed.

Motion Vector

The motion vector mvLX indicates a shift amount between blocks in two different pictures. A prediction vector and a difference vector related to the motion vector mvLX is referred to as a prediction vector mvpLX and a difference vector mvdLX respectively.

Inter Prediction Indicator Inter_Pred_Idc and Prediction List Utilization Flag predFlagLX A relationship between the inter prediction indicator inter_pred_idc and prediction list utilization flags predFlagL0 and predFlagL1 are as follows, and those can be converted mutually.

$$\text{inter\_pred\_idc} = (predFlagL1 \ll 1) + predFlagL0$$

$$predFlagL0 = \text{inter\_pred\_idc} \,\&\, 1$$

$$predFlagL1 = \text{inter\_pred\_idc} \gg 1$$

Note that the inter prediction parameter may use the prediction list utilization flag or may use the inter prediction indicator. A determination using the prediction list utilization flag may be replaced with a determination using the inter prediction indicator. On the contrary, a determination using the inter prediction indicator may be replaced with a determination using the prediction list utilization flag.

Determination of Bi-Prediction biPred

A flag biPred of whether or not to be the bi-prediction BiPred can be derived from whether or not two prediction list utilization flags are both 1. For example, the derivation can be performed by the following equation.

$$biPred = (predFlagL0 == 1 \,\&\&\, predFlagL1 == 1)$$

Alternatively, the flag biPred can be also derived from whether the inter prediction indicator is a value indicating to use two prediction lists (reference pictures). For example, the derivation can be performed by the following equation.

$$biPred = (\text{inter\_pred\_idc} == PRED\_BI)\,?\,1:0$$

Conversely, determination of the uni-prediction can be derived by one of the two prediction list utilization flags being 1 and the other being 0. For example, the derivation can be performed by the following equation.

$$uniPred = (predFlagL0 == 1 \&\& predFlagL1 == 0) || (predFlagL0 == 0 \&\&$$

predFlagL1==1) or the determination can be performed as described below.

$$uniPred = \text{inter\_pred\_idc} == 0 || \text{inter\_pred\_idc} == 1$$

Configuration of Video Decoding Apparatus

Figure 7:
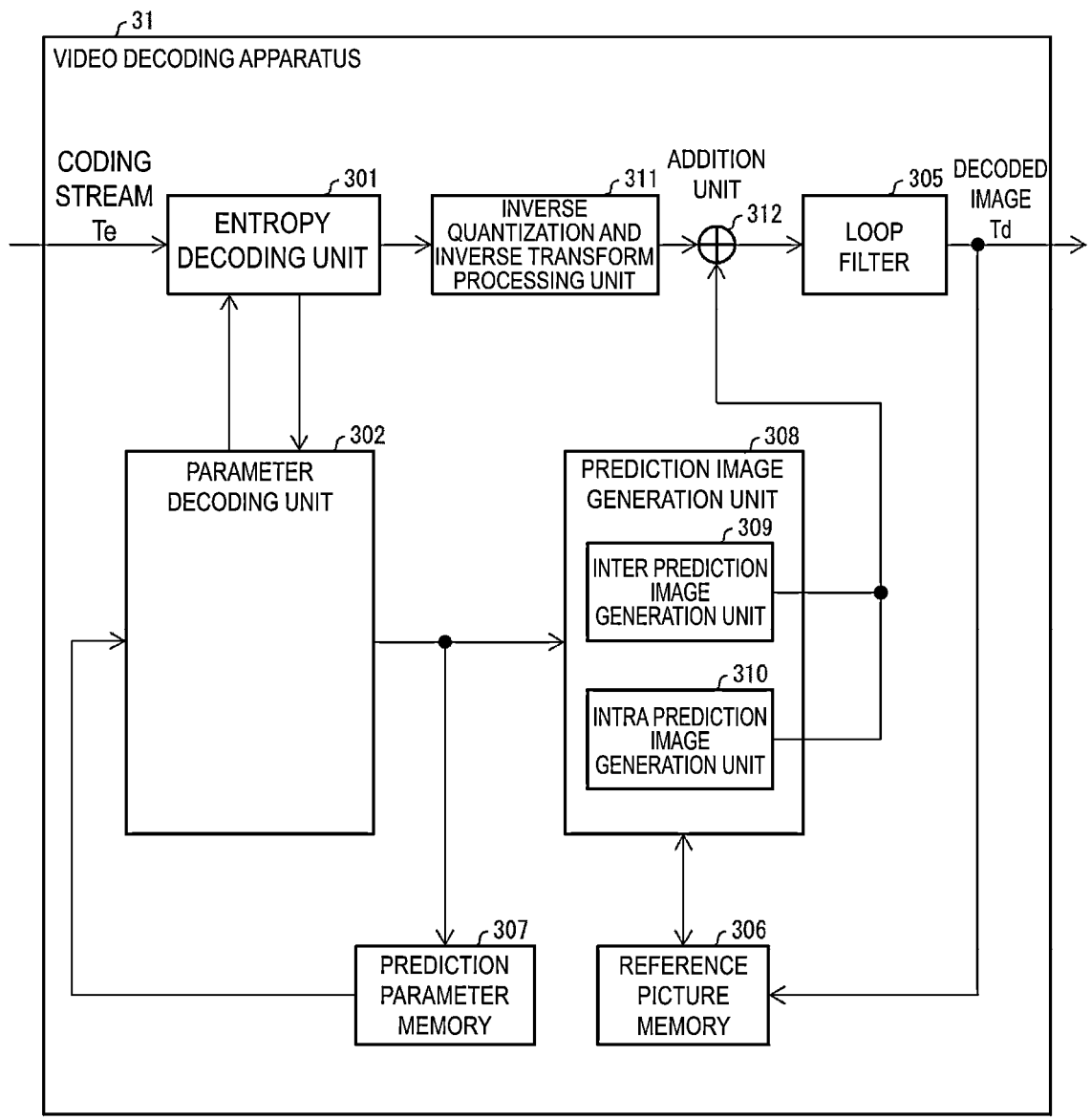
FIG. 7 is a schematic diagram illustrating a configuration of a video decoding apparatus.

The configuration of the video decoding apparatus 31 (FIG. 7) according to the present embodiment will be described.

The video decoding apparatus 31 includes an entropy decoding unit 301, a parameter decoding unit (prediction image decoding apparatus) 302, a loop filter 305, the reference picture memory 306, a prediction parameter memory 307, a prediction image generation unit (prediction image generation apparatus) 308, an inverse quantization and inverse transform processing unit 311, and an addition unit 312. Note that a configuration in which the loop filter 305 is not included in the video decoding apparatus 31 may be used in accordance with the video coding apparatus 11 described later.

The parameter decoding unit 302 further includes a header decoding unit 3020, a CT information decoder 3021, and a CU decoder 3022 (prediction mode decoder), which are not illustrated, and the CU decoder 3022 further includes a TU decoder 3024. These may be collectively referred to as a decoding module. The header decoding unit 3020 decodes, from coded data, parameter set information such as the VPS, the SPS, and the PPS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and quantization prediction error (residual_coding) from coded data.

In addition, the parameter decoding unit 302 includes an inter prediction parameter decoding unit 303 and an intra prediction parameter decoding unit 304 which are not illustrated. The prediction image generation unit 308 includes an inter prediction image generation unit 309 and an intra prediction image generation unit 310.

Furthermore, an example in which a CTU and a CU are used as units of processing is described below, but the processing is not limited to this example, and processing in units of sub-CU may be performed. Alternatively, by replacing the CTU and the CU by a block and replacing the sub-CU by a subblock, and processing by a block or a subblock unit may be performed.

The entropy decoding unit 301 performs entropy decoding on the coding stream Te input from the outside and separates and decodes individual codes (syntax elements). Entropy coding includes a method of performing variable-length coding on a syntax element using a context (probability model) adaptively selected depending on the type of syntax element or the surrounding situation, and a method of performing variable-length coding on a syntax element using a predetermined table or a calculation formula. The former Context Adaptive Binary Arithmetic Coding (CABAC) stores in memory the updated probability model for each coded or decoded picture (slice). Additionally, as an initial state of a context of a P picture or a B picture, a probability model of a picture using a quantization parameters of the same slice type and the same slice level is configured from among the probability models stored in the memory. This initial state is used for coding and decoding processing. The separated codes include prediction information to generate a prediction image, a prediction error to generate a difference image, and the like.

The entropy decoding unit 301 outputs the separated codes to the parameter decoding unit 302. For example, the separated codes include a prediction mode predMode, the merge flag merge_flag, the merge index merge_idx, the inter prediction indicator inter_pred_idc, the reference picture index refIdxLX, the prediction vector index mvp_LX_idx, the difference vector mvdLX, and the like. Which code is to be decoded is controlled based on an indication of the parameter decoding unit 302.

Configuration of Inter Prediction Parameter Decoding Unit

The inter prediction parameter decoding unit 303 decodes an inter prediction parameter with reference to a prediction parameter stored in the prediction parameter memory 307, based on a code input from the entropy decoding unit 301. Furthermore, the inter prediction parameter decoding unit 303 outputs the decoded inter prediction parameter to the prediction image generation unit 308, and stores the decoded inter prediction parameter in the prediction parameter memory 307.

Figure 8:
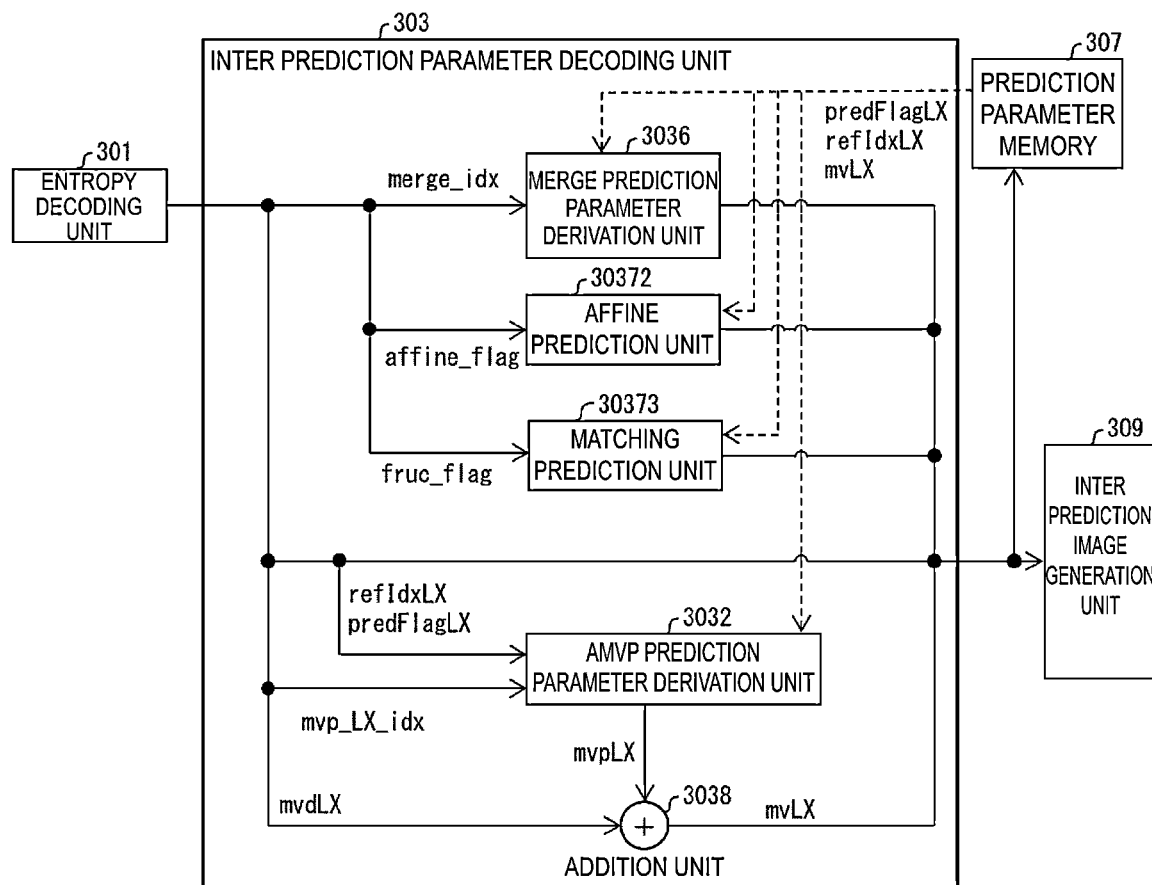
FIG. 8 is a schematic diagram illustrating a configuration of an inter prediction parameter decoding unit.

FIG. 8(a) is a schematic diagram illustrating a configuration of the inter prediction parameter decoding unit 303 according to the present embodiment. The inter prediction parameter decoding unit 303 includes an AMVP prediction parameter derivation unit 3032, an addition unit 3038, a merge prediction parameter derivation unit 3036, an affine prediction unit 30372, and a matching prediction unit 30373. The AMVP prediction parameter derivation unit 3032, the merge prediction parameter derivation unit 3036, the affine prediction unit 30372, and the matching prediction unit 30373 are common means for the coding apparatus and the decoding apparatus, and thus may be collectively referred to as a motion vector derivation unit (motion vector derivation apparatus).

The inter prediction parameter decoding unit 303 indicates to the entropy decoding unit 301 to decode syntax elements related to the inter prediction, and extracts syntax elements included in coded data, for example, the affine flag affine_flag, the matching flag fruc_flag, the merge flag merge_flag, the merge index merge_idx, the inter prediction indicator inter_pred_idc, the reference picture index refIdxLX, the prediction vector index mvp_LX_idx, and the difference vector mvdLX.

In a case that the affine flag affine_flag is 1, that is, indicates the affine prediction mode, the affine prediction unit 30372 derives the inter prediction parameter of a subblock.

In a case that the matching flag fruc_flag is 1, that is, indicates the matching prediction mode, the matching prediction unit 30373 derives the inter prediction parameter of a subblock.

In a case that the merge flag merge_flag is 1, that is, indicates the merge prediction mode, the merge index merge_idx is decoded and output to the merge prediction parameter derivation unit 3036.

In a case that the merge flag merge_flag is 0, that is, indicates an AMVP prediction mode, as the AMVP prediction parameter, for example, the inter prediction indicator inter_pred_idc, the reference picture index refIdxLX, the prediction vector index mvp_LX_idx, and the difference vector mvdLX are decoded. The AMVP prediction parameter derivation unit 3032 derives the prediction vector mvpLX from the prediction vector index mvp_LX_idx. In the addition unit 3038, the derived prediction vector mvpLX and the difference vector mvdLX are added, and the motion vector mvLX is derived.

Affine Prediction Unit

The affine prediction unit 30372 derives an affine prediction parameter of a target block. In the present embodiment, as the affine prediction parameter, motion vectors (mv0_x, mv0_y) and (mv1_x, mv1_y) of the two control points (V0, V1) of the target block are derived. Specifically, the motion vector of each control point may be derived by prediction from a motion vector of an adjacent block of the target block, or the motion vector of each control point may be derived by the sum of the prediction vector derived as the motion vector of the control point and the difference vector derived from coded data.

Merge Prediction

Figure 9:
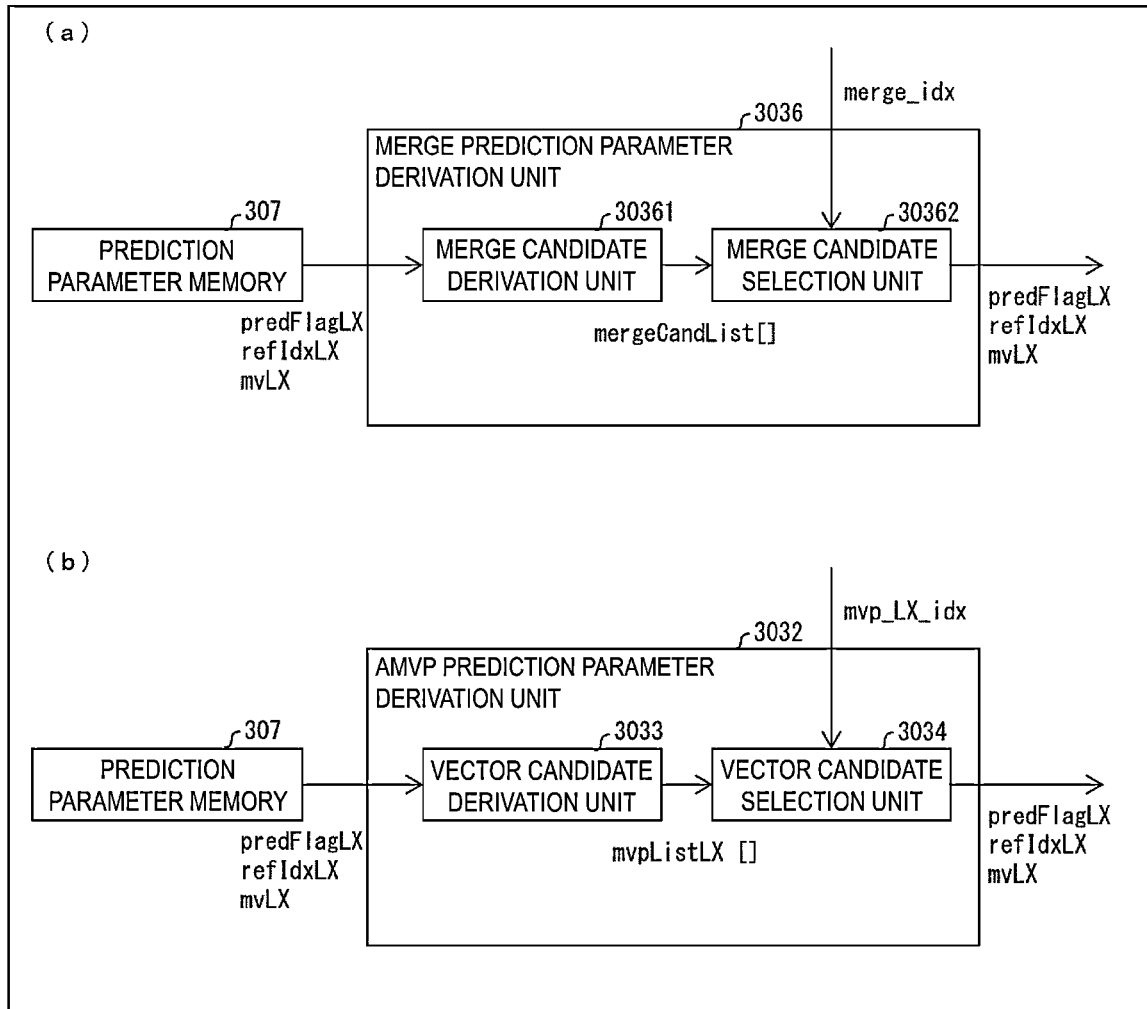
FIG. 9 is a schematic diagram illustrating configurations of a merge prediction parameter derivation unit and an AMVP prediction parameter derivation unit.

FIG. 9(a) is a schematic diagram illustrating the configuration of the merge prediction parameter derivation unit 3036 according to the present embodiment. The merge prediction parameter derivation unit 3036 includes a merge candidate derivation unit 30361 and a merge candidate selection unit 30362. Note that the merge candidates include the prediction list utilization flag predFlagLX, the motion vector mvLX, and the reference picture index refIdxLX, and is stored in the merge candidate list. The merge candidate stored in the merge candidate list is assigned an index in accordance with a prescribed rule.

The merge candidate derivation unit 30361 derives the merge candidate using a motion vector of a decoded adjacent block and the reference picture index refIdxLX as is. In addition thereto, the merge candidate derivation unit 30361 may apply spatial merge candidate derivation processing, temporal merge candidate derivation processing, combined merge candidate derivation processing, and zero merge candidate derivation processing and the spatial-temporal merge candidate derivation processing described later.

Spatial Merge Candidate Derivation Processing

As spatial merge candidate derivation processing, the merge candidate derivation unit 30361 reads, in accordance with a prescribed rule, the prediction parameters (prediction list utilization flag predFlagLX, motion vector mvLX, and reference picture index refIdxLX) stored in the prediction parameter memory 307, and configures them as the merge candidates. A reference picture specification method is, for example, prediction parameters according to respective adjacent blocks (for example, all or some of blocks respectively adjoining a left end L, a lower left end BL, an upper left end AL, an upper end A, and an upper right end AR of the target block) that are within a predetermined range from the target block. Merge candidates are referred to as L, BL, AL, A, AR, respectively.

Temporal Merge Candidate Derivation Processing

As the temporal merge derivation processing, the merge candidate derivation unit 30361 reads, from the prediction parameter memory 307, a prediction parameter of a lower right CBR of the target block or a block C in the reference image including the center coordinate as a merge candidate, and stores the result in a merge candidate list mergeCandList[ ].

Combined Merge Candidate Derivation Processing

The merge candidate derivation unit 30361 derives a combined merge candidate by combining the motion vectors and the reference picture indexes of two different merge candidates stored in the merge candidate list as motion vectors of L0 and L1, respectively. The combined merge candidate is referred to as COMB.

Zero Merge Candidate Derivation Processing

The merge candidate derivation unit 30361 derives zero merge candidates Z0, . . . , ZM the reference picture indexes refIdxLX of which are 0, . . . , M and the X component and the Y component of each of the motion vectors mvLX are both 0, and stores the result in the merge candidate list.

The storing order in the merge candidate list mergeCandList[ ] is, for example, the spatial merge candidate, the temporal merge candidate, the combined merge candidate, and the zero merge candidate, that is, {L, A, AR, BL, A, COL, COMB0, . . . , COMBM, Z0, Z1, . . . , ZM}. Note that a reference block that is not available (intra prediction block, or the like) is not stored in the merge candidate list.

The merge candidate selection unit 30362 selects the merge candidate mergeCandList[merge_idx] to which the merge index merge_idx is assigned among the merge candidates included in the merge candidate list, as the inter prediction parameter of the target block. The merge candidate selection unit 30362 stores the selected merge candidate in the prediction parameter memory 307 and outputs it to the prediction image generation unit 308.

Spatial-Temporal Merge Candidate Derivation Processing

The merge candidate derivation unit 30361 derives, from a motion vector of a block on a reference image temporally adjacent to the target block (for example, an immediately preceding picture) or a motion vector of a block spatially adjacent to the target block, a motion vector of a subblock obtained by splitting the target block.

AMVP Prediction

FIG. 9(b) is a schematic diagram illustrating the configuration of the AMVP prediction parameter derivation unit 3032 according to the present embodiment. The AMVP prediction parameter derivation unit 3032 includes a vector candidate derivation unit 3033 and a vector candidate selection unit 3034. The vector candidate derivation unit 3033 derives a prediction vector candidate from a motion vector mvLX of a decoded adjacent block stored in the prediction parameter memory 307 based on the reference picture index refIdxLX, and stores the result in a prediction vector candidate list mvpListLX[ ].

The vector candidate selection unit 3034 selects, among the prediction vector candidates of the prediction vector candidate list mvpListLX[ ], a motion vector mvpListLX [mvp_LX_idx] indicated by the prediction vector index mvp_LX_idx, as a prediction vector mvpLX. The vector candidate selection unit 3034 outputs the selected prediction vector mvpLX to the addition unit 3038.

The addition unit 3038 adds the prediction vector mvpLX input from the AMVP prediction parameter derivation unit 3032 and the decoded difference vector mvdLX, and calculates the motion vector mvLX. The addition unit 3038 outputs the calculated motion vector mvLX to the prediction image generation unit 308 and the prediction parameter memory 307.

$$mvLX[0] = mvpLX[0] + mvdLX[0]$$

$$mvLX[1] = mvpLX[1] + mvdLX[1]$$

Matching Prediction Unit 30373

The matching prediction unit 30373 derives a motion vector spMvLX of the subblock by performing matching processing of either bilateral matching or template matching.

Figure 10:
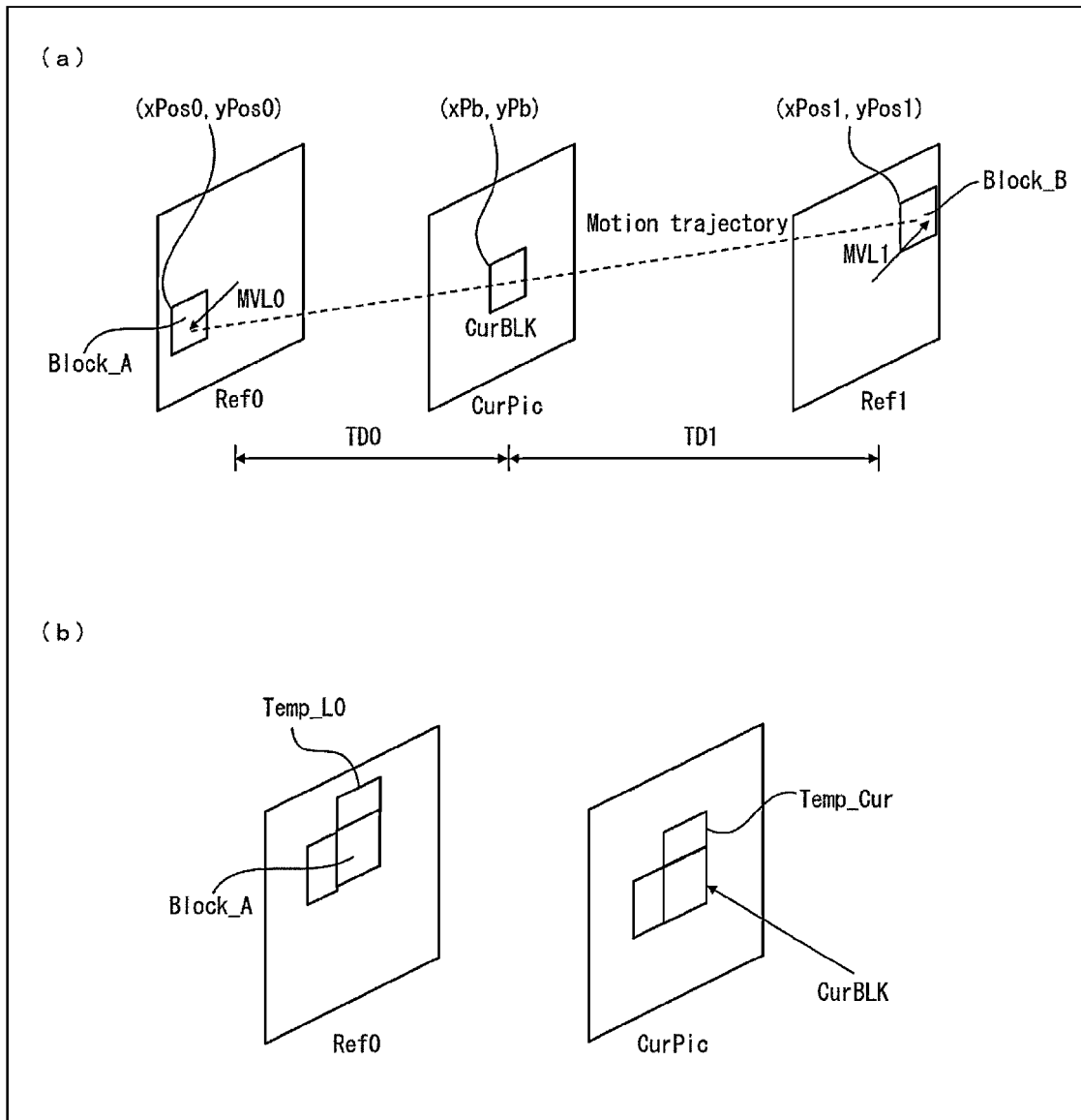
FIG. 10 is a diagram in which (a) illustrates bilateral matching and (b) illustrates template matching.

FIG. 10 is a diagram for illustrating (a) the bilateral matching and (b) the template matching. The matching prediction mode is selected as one of the merge candidates (matching candidate).

As illustrated in FIG. 10(a), in the bilateral matching, in order to derive a motion vector of a subblock CurBLK in a target picture CurPic, two reference images Ref0 and Ref1 are referred to. Specifically, first, in a case that the upper left coordinates of the subblock CurBLK are expressed as (xPb, yPb), Block_A which is a region in the reference image Ref0 specified by the reference picture index refIdxL0, and which has upper left coordinates (xPos0, yPos0) identified by $$(xPos0, yPos0) = (xPb + mvL0[0], yPb + mvL0[1]),$$

and Block_B which is a region in the reference image Ref1 specified by, for example, a reference picture index refIdxL1 and which has upper left coordinates (xPos1, yPos1) identified by a motion vector (mvL1[0], mvL1[1]) are configured. A motion vector mvL1[ ] of L1 may be derived by scaling of an L0 vector mvL0[ ].

$$(xPos1, yPos1) = (xPb + mvL1[0], yPb + mvL1[1])$$

Here, $$mvL1[0] = MvScale(mvL0[1], CurPic, Ref0, CurPic, Ref1)$$

$$mvL1[1] = MvScale(mvL1[1], CurPic, Ref0, CurPic, Ref1)$$

Additionally, a motion vector spMvL0 is derived for each subblock based on (MV0_x, MV0_y) derived such that a matching cost between Block_A and Block_B is minimized.

In the matching prediction, an initial vector of the target block is derived (initial vector search). Next, a local region with the initial vector as the center is further searched, and a vector having the minimum matching cost is taken as the final motion vector of the target block of the block level (local search).

Subsequently, an initial vector of each subblock is derived (initial vector search). Next, in a local region with the initial vector of the subblock as the center, a step search or the like is performed, and a vector having the minimum matching cost is derived as a motion vector of the subblock (local search).

On the other hand, FIG. 10(b) is a diagram for illustrating the template matching. In the template matching, a motion vector is derived by matching of an adjacent region Temp_Cur (template) of the target block and an adjacent region Temp_L0 of the reference block on the reference picture.

More specifically, for example, a reference block Block_A which is a region in the reference image Ref specified by the reference picture index refIdxL0, and which takes $$(xPos0, yPos0) = (xPb + mvL0[0], yPb + mvL0[1])$$

as upper left coordinates (xPos0, yPos0) is configured. Next, the template region Temp_Cur adjacent to the target block CurBLK in the target picture CurPic and the template region Temp_L0 adjacent to Block_A in the reference picture Ref0 are configured. In the diagram, the template region Temp_Cur includes regions adjacent to the upper side and the left side of the target block CurBLK. Furthermore, the template region Temp_L0 includes regions adjacent to the upper side and the left side of Block_A.

This template is used to set a vector having the minimum matching cost as an initial vector, from among initial vector candidates in the target block at the block level. Next, a local region with the initial vector as the center is further searched, and a vector having the minimum matching cost is taken as the final motion vector of the target block (local search).

Subsequently, the template of each subblock is acquired, and an initial vector is derived from the initial vector candidates of each subblock (initial vector search). Next, in a local region with the initial vector of the subblock as the center, a step search or the like is performed. Then, the matching costs of the vector candidates in the vicinity of the initial vector of the subblock are derived, and a vector having the minimum result is derived as a motion vector of the subblock (local search).

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores a parameter decoded by the parameter decoding unit 302, the prediction mode predMode separated by the entropy decoding unit 301, and the like.

To the prediction image generation unit 308, the prediction mode predMode, the prediction parameter, and the like are input. In addition, the prediction image generation unit 308 reads a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referred to for generating a prediction image.

Inter Prediction Image Generation Unit 309

In a case that the prediction mode predMode indicates an inter prediction mode, the inter prediction image generation unit 309 generates a prediction image of a block or a subblock using an inter prediction by using the inter prediction parameter input from the inter prediction parameter decoding unit 303 and the read reference picture.

Figure 11:
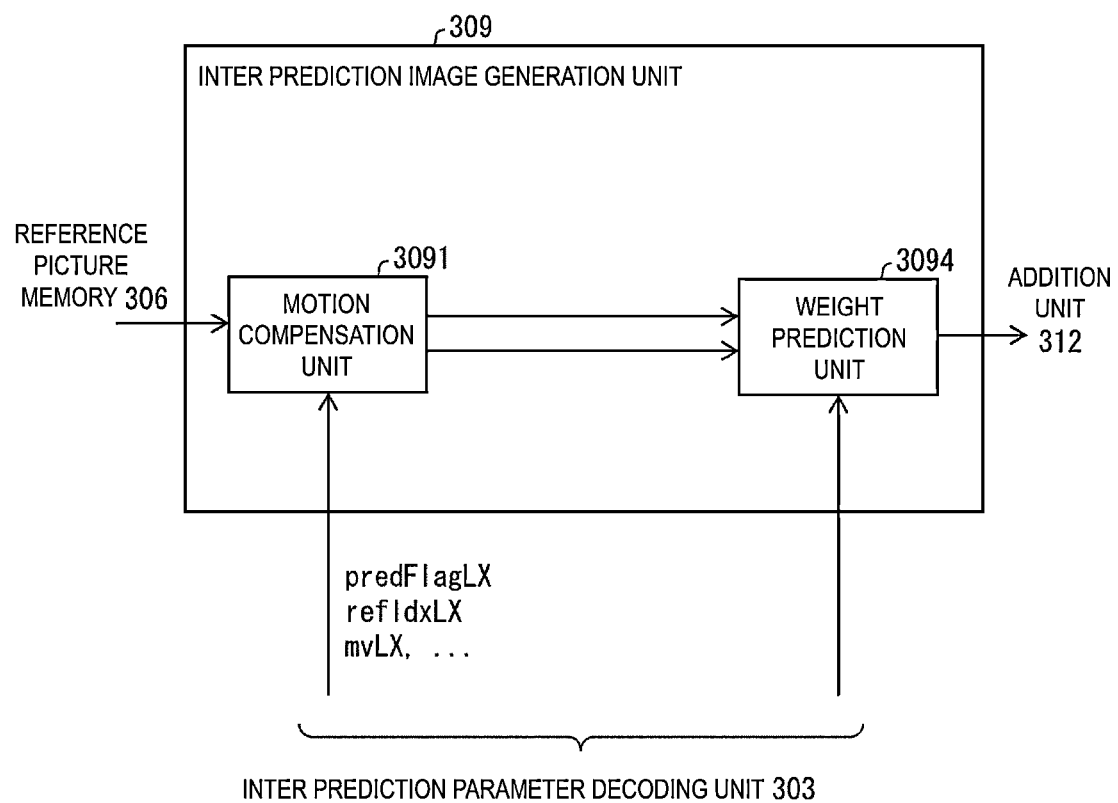
FIG. 11 is a schematic diagram illustrating a configuration of an inter prediction image generation unit.

FIG. 11 is a schematic diagram illustrating the configuration of the inter prediction image generation unit 309 included in the prediction image generation unit 308 according to the present embodiment. The inter prediction image generation unit 309 includes a motion compensation unit (prediction image generation apparatus) 3091 and a weighted prediction unit 3094.

Motion Compensation

The motion compensation unit 3091 (interpolation image generation unit 3091) generates an interpolation image (motion compensation image), based on the inter prediction parameters (prediction list utilization flag predFlagLX, reference picture index refIdxLX, motion vector mvLX) input from the inter prediction parameter decoding unit 303, by reading, from the reference picture memory 306, a block at a position shifted by the motion vector mvLX while taking the position of the target block in a reference picture RefPicLX specified by the reference picture index refIdxLX as the starting point. Here, in a case that the accuracy of the motion vector mvLX is not an integer accuracy, by applying a filter for generating a pixel of a fractional position called a motion compensation filter, the interpolation image is generated.

The motion compensation unit 3091 first derives an integer position (xInt, yInt) and a phase (xFrac, yFrac) corresponding to in-prediction block coordinates (x, y) by the following equation.

$$xInt = xPb + (mvLX[0] \gg (\log2(MVBIT))) + x$$

$$xFrac = mvLX[0] \ \& \ (MVBIT - 1)$$

$$yInt = yPb + (mvLX[1] \gg (\log2(MVBIT))) + y$$

$$yFrac = mvLX[1] \ \& \ (MVBIT - 1)$$

Here, (xPb, yPb) indicates the upper left coordinates, x=0, . . . , bW−1, y=0, . . . , bH−1, of a block having bW*bH size, and MVBIT indicates the accuracy of motion vector mvLX (1/MVBIT pixel accuracy).

The motion compensation unit 3091 derives a temporary image temp[ ][ ] by performing horizontal interpolation processing on a reference picture refImg using an interpolation filter. In the following equation, Σ is the sum related to k of k=0, . . . , NTAP−1, shift1 is a normalization parameter for adjusting a value range, and offset1=1<<(shift1−1).

$$temp[x][y] = (\Sigma mcFilter[xFrac][k] *$$

$$refImg[xInt + k - NTAP/2 + 1][yInt] + offset1) \gg shift1$$

Subsequently, the motion compensation unit 3091 derives an interpolation image Pred[ ][ ] by performing vertical interpolation processing on the temporary image temp[ ][ ]. In the following equation, Σ is the sum related to k of k=0, . . . , NTAP−1, shift2 is a normalization parameter for adjusting a value range, and offset2=1<<(shift2−1).

$$Pred[x][y] =$$

$$(\Sigma mcFilter[yFrac][k] * temp[x][y + k - NTAP/2 + 1] + offset2) \gg shift2,$$

note that in a case of the bi-prediction, Pred[ ][ ] in the above is derived for each of the L0 list and the L1 list, (referred to as interpolation images PredL0[ ][ ] and PredL1[ ][ ]), and the interpolation image Pred[ ][ ] is generated from the interpolation image PredL0[ ][ ] and the interpolation image PredL1[ ][ ].

Weighted Prediction (WP) Prediction

The weighted prediction unit 3094 generates a prediction image of a block by multiplying the interpolation image PredLX by a weight coefficient. In the present specification, the "weight coefficient" is also expressed as a "weight". In a case that one of the prediction list utilization flags (predFlagL0 or predFlagL1) is 1 (uni-prediction) and no weighted prediction is used, processing by the following equation in which the interpolation image PredLX (LX is L0 or L1) is matched with the number of pixel bits bitDepth is performed.

$$Pred[x][y] = \text{Clip3}(0, (1 \ll bitDepth) - 1, (PredLX[x][y] + offset1) \gg shift1)$$

Here, shift1 = Max(2, 14 − bitDepth), offset1 = 1<<(shift1 − 1) are set.

Furthermore, in a case that both reference list utilization flags (predFlagL0 and predFlagL1) are 1 (bi-prediction BiPred) and no weighted prediction is used, processing by the following equation in which the interpolation images PredL0 and PredL1 are averaged to be matched with the number of pixel bits is performed.

$$Pred[x][y] = \text{Clip3}(0, (1 \ll bitDepth) - 1,$$

$$(PredL0[x][y] + PredL1[x][y] + offset2) \gg shift2)$$

Here, shift2 = shift1 + 1, offset2 = 1<<(shift2 − 1) are set.

Furthermore, in a case that the uni-prediction and the weighted prediction are performed, the weighted prediction unit 3094 derives a weighted prediction coefficient w0 and an offset o0 from coded data, and performs processing by the following equation.

$$Pred[x][y] = \text{Clip3}(0, (1 \ll bitDepth) - 1,$$

$$((PredLX[x][y] * w0 + 1 \ll (\log2Wd - 1)) \gg \log2Wd) + o0)$$

Here, log 2Wd is a variable indicating a prescribed shift amount.

Furthermore, in a case that the bi-prediction BiPred and the weighted prediction are performed, the weighted prediction unit 3094 derives weight coefficients w0, w1, o0, and o1 from coded data, and performs processing by the following equation.

$$Pred[x][y] =$$

$$\text{Clip } 3\big(0, (1 \ll bitDepth) - 1, (PredL0[x][y] * w0 + PredL1[x][y] * w1 +$$

$$((o0 + o1 + 1) \ll \log2Wd)) \gg (\log2Wd + 1)\big)$$

The inter prediction image generation unit 309 outputs the generated prediction image of the block to the addition unit 312.

The inverse quantization and inverse transform processing unit 311 performs inverse quantization on a quantization transform coefficient input from the entropy decoding unit 301 to calculate a transform coefficient. This quantization transform coefficient is a coefficient obtained by performing a frequency transform such as a Discrete Cosine Transform (DCT), a Discrete Sine Transform (DST), or a Karyhnen Loeve Transform (KLT) on prediction errors to quantize them in coding processing. The inverse quantization and inverse transform processing unit 311 performs an inverse frequency transform such as an inverse DCT, an inverse DST, or an inverse KLT on the calculated transform coefficient to calculate a prediction error. The inverse quantization and inverse transform processing unit 311 outputs the calculated prediction error to the addition unit 312.

The addition unit 312 adds the prediction image of the block input from the prediction image generation unit 308 and the prediction error input from the inverse quantization and inverse transform processing unit 311 to each other for each pixel, and generates a decoded image of the block. The addition unit 312 stores the decoded image of the block in the reference picture memory 306, and also outputs it to the loop filter 305.

Example of Generating Prediction Image by Multiplying Interpolation Image by Weight Coefficient In the above-described "Weighted Prediction (WP) Prediction", the example of multiplying the interpolation image by the weight coefficient to generate the prediction image has been described. Here, details of processing for generating the prediction image using the WP prediction and another example of generating the prediction image by multiplying the interpolation image by the weight coefficient will be described.

using the weights w0 and w1 and offsets o0 and o1 designated by each reference picture (hereinafter, the WP prediction is also referred to as a weighted prediction or a variable weighted prediction).

In the WP prediction, first, the inter prediction parameter decoding unit 303 decodes, from coded data, an accuracy of the weight coefficient luma_log 2_weight_denom, a difference value of the weight coefficient delta_luma_weight_l0, and an offset luma_offset_l0.

Next, the weighted prediction unit 3094 determines whether or not the WP prediction is the L0 prediction (predFlagL0=1) (S210). In a case that the WP prediction is the L0 prediction (YES in S210), the weighted prediction unit 3094 generates the prediction image using the following equation (S211).

$$pred[x][y] = \text{Clip3}(0, (1 << bitDepth)-1,$$
$$((predL0[x][y]*w0 + 1 << (\log2Wd - 1)) >> \log2Wd) + o0)$$

Note that the weighted prediction unit 3094 derives the weight coefficients (w0, w1) and offsets (o0, o1) used in equations indicating the prediction image by the WP prediction described above or below, from the following equations.

$$LumaWeightL0[i] = (1 << \text{luma\_log2\_weight\_denom}) + \text{delta\_luma\_weight\_l0}[i]$$

$$LumaWeightL1[i] = (1 << \text{luma\_log2\_weight\_denom}) + \text{delta\_luma\_weight\_l1}[i]$$

$$\log2Wd = \text{luma\_log2\_weight\_denom} + shift1$$

$$WpOffsetBdShiftY = BitDepthY - 8$$

$$w0 = LumaWeightL0[refId \times L0]$$

$$w1 = LumaWeightL1[refId \times L1]$$

$$o0 = \text{luma\_offset\_l0}[refId \times L0] << WpOffsetBdShiftY$$

$$o1 = \text{luma\_offset\_l1}[refId \times L1] << WpOffsetBdShiftY$$

Processing for Generating Prediction Image Using WP Prediction

In a case of generating a prediction image using the WP prediction, the video coding apparatus 11 sends, to the video decoding apparatus 31, weights and offsets for each reference picture in units of slice.

Figure 12:
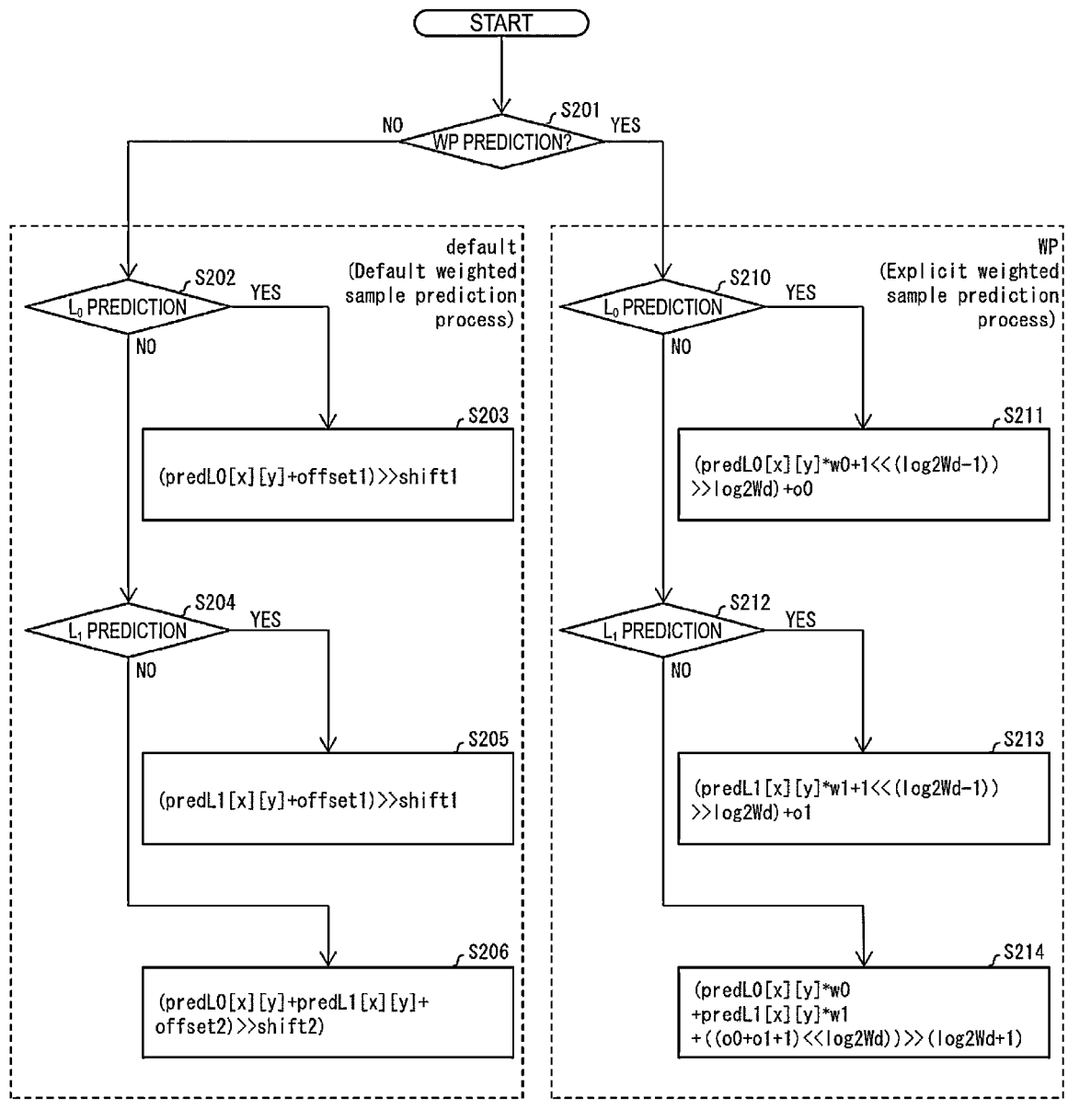
FIG. 12 is a flowchart illustrating an example of a flow of processing in which a weighted prediction unit according to the present embodiment generates a prediction image using a WP prediction.

FIG. 12 is a flowchart illustrating an example of a flow of processing in which the weighted prediction unit 3094 of the video decoding apparatus 31 generates a prediction image using the WP prediction.

As illustrated in FIG. 12, the weighted prediction unit 3094 determines whether or not the WP prediction is configured to on in a slice (S201). Whether or not the WP prediction is configured to on is determined by whether or not flags (weighted_pred_flag, weighted_bipred_flag) which indicate application of the prediction with weight signalled by the picture parameter set PPS are 1 (indicating the prediction with weight is enabled). Note that weighted_pred_flag is a flag indicating the application of the weighted prediction in the P slice, and weighted_bipred_flag is a flag indicating the application of the weighted prediction in the B slice. In a case that the WP prediction is configured to on (YES in S201), the weighted prediction unit 3094 generates a prediction image through the WP prediction In a case that the WP prediction is not the L0 prediction (NO in S210), the weighted prediction unit 3094 determines whether or not the WP prediction is the L1 prediction (predFlagL1=1) (S212). In a case that the WP prediction is the L1 prediction (YES in S212), the weighted prediction unit 3094 generates the prediction image using the following equation (S213).

$$pred[x][y] = \text{Clip3}(0, (1 << bitDepth)-1,$$
$$((predL1[x][y]*w1 + 1 << (\log2Wd-1)) >> \log2Wd) + o1)$$

In a case that the WP prediction is not the L1 prediction (NO in S212), the WP prediction is a bi-prediction weighted prediction, and the weighted prediction unit 3094 generates the prediction image using the following equation (S214).

$$pred[x][y] =$$
$$\text{Clip3}(0, (1 << bitDepth)-1, (predL0[x][y]*w0 + predL1[x][y]*w1 +$$
$$((o0 + o1 + 1) << \log2Wd)) >> (\log2Wd + 1))$$

Furthermore, in a case that the WP prediction is configured to off in a slice (NO in S201), the weighted prediction unit 3094 generates the prediction image using a default weight coefficient (hereinafter, the generation of the prediction image using the default weight coefficient is also referred to as a fixed weighted prediction). In the fixed weighted prediction, first, the weighted prediction unit 3094 determines whether or not the prediction is the L0 prediction (S202). In a case that the prediction is the L0 prediction (YES in S202), the weighted prediction unit 3094 generates the prediction image using the following equation (S203).

$$pred[x][y] = (predL0[x][y] + \text{offset}1) >> \text{shift}1$$

In a case that the prediction is not the L0 prediction (NO in S202), the weighted prediction unit 3094 determines whether or not the prediction is the L1 prediction (S204). In a case that the prediction is the L1 prediction (YES in S204), the weighted prediction unit 3094 generates the prediction image using the following equation (S205).

$$pred[x][y] = (predL1[x][y] + \text{offset}1) >> \text{shift}1$$

In a case that the prediction is not the L1 prediction (NO in S204), the prediction is the bi-prediction weighted prediction, and the weighted prediction unit 3094 generates the prediction image using the following equation (S206).

$$pred[x][y] = (predL0[x][y] + predL1[x][y] + \text{offset}2) >> \text{shift}2$$

Note that shift1, shift2, offset1, and offset2 are represented by the following equations.

$$\text{shift}1 = \text{Max}(2, 14-bitDepth)$$
$$\text{shift}2 = \text{Max}(3, 15-bitDepth) = \text{shift}1 + 1$$
$$\text{offset}1 = 1 << (\text{shift}1-1)$$
$$\text{offset}2 = 1 << \text{shift}1$$

The derived prediction image pred[ ][ ] is output from the weighted prediction unit 3094.

Processing for Generating Prediction Image Using Generalized Bi-Prediction (GBI Prediction)

Next, as another example of generating a prediction image by multiplying an interpolation image by a weight coefficient, processing for generating a prediction image using the GBI prediction will be described. In the GBI prediction, the weighted prediction unit 3094 multiplies the L0 interpolation image predL0 and the L1 interpolation image predL1 in the bi-prediction by weight coefficients (gbw0, gbw1), and generates the prediction image Pred. The generation of the prediction image Pred can be represented by the following equations.

$$Pred = (gbw0 * predL0 + gbw1 * predL1 + roundGbi) >> \log2Gbi2$$

$$\log2Gbi2 = \log2Gbi + \text{shift}1 - 1$$

Furthermore, in a case of generating the prediction image using the GBI prediction, the weighted prediction unit 3094 switches the weight coefficients in units of coding unit. In other words, a weighted prediction unit 10112 of the video coding apparatus 11 configures the weight coefficients for each coding unit. In the GBI prediction, a plurality of weight coefficient candidates are defined beforehand, and gbiIndex indicates a specific weight coefficient candidate among the plurality of weight coefficient candidates included in a table.

For example, the weighted prediction unit 3094 selects the weight coefficient gbw1 indicated by gbiIndex as the weight coefficient gbw1 from a table gbwTable[ ] as indicated by the following equation, and derives gbw0 by gbw0=1−gbw1.

$$gbw1 = gbwTable[gbiIndex]$$

Note that there may be a plurality of tables gbwTable[ ] having a different combination of weight coefficients, and the weighted prediction unit 3094 may switch the table used to select the weight coefficient depending on whether or not the picture structure is LowDelay (LB).

FIG. 13 is a diagram illustrating an example of the table gbwTable[ ] including a plurality of weight coefficient candidates used in the GBI prediction. FIG. 13(a) illustrates an example of gbwTable[ ] used in a case that the picture structure is LowDelay (LB). gbwTable[ ] illustrated in FIG. 13(a) can be represented by the following equation.

$$gbwTable[] = \{-2, 3, 4, 5, 10\}$$

Furthermore, in gbwTable[ ] illustrated in FIG. 13(a), gbiIndex takes a value of 0 to 4, and is represented as "0000", "001", "1", "01", "0001" in the binary representation (Binarization of gbiIndex). The values 0 to 4 correspond to −1/4, 3/8, 1/2, 5/8, 5/4 of the weight coefficient candidates, respectively.

The priority order of the weight coefficient candidates is 4/8, 5/8, 3/8, 10/8, and −2/8, and includes a negative weight coefficient candidate. The value of gbiIndex with the highest priority here is indicated by defaultGbiIndex. In a case of the above-described table, defaultGbiIndex=2 is set.

Note that as described below, gbwTable[ ] may be arranged in the order of the priority order. In this case, defaultGbiIndex=0 is set.

$$gbwTable[] = \{4, 5, 3, 10, -2\}$$

FIG. 13(b) illustrates an example of gbwTable[ ] used in a case that the picture structure is other than LowDelay (RA). gbwTable[ ] illustrated in FIG. 13(b) can be represented by the following equation. defaultGbiIndex=1 is set.

$$gbwTable[] = \{3, 4, 5\}$$

Note that as described below, gbwTable[ ] may be arranged in the order of the priority order. In this case, defaultGbiIndex=0 is set.

$$gbwTable[] = \{4, 5, 3\}$$

Furthermore, in gbwTable[ ] illustrated in FIG. 13(b), gbiIndex takes a value of 0 to 2, and is represented as "00", "1", "01" in the binary representation (Binarization of gbiIndex). The values 0 to 2 correspond to 3/8, 1/2, 5/8 of the weight coefficient candidates, respectively.

The priority order of the weight coefficient candidates is 4/8, 5/8, and 3/8, but 5/8 and 3/8 have the same number of bits in the binary representation and are different only in ctx, and therefore have the same priority order.

In a case that the GBI prediction is used in the AMVP prediction mode, the video coding apparatus 11 sends gbiIndex coded in units of coding unit to the video decoding apparatus 31. Furthermore, in a case that the GBI prediction is used in the merge prediction mode, the inter prediction parameter decoding unit 303 decodes the merge index merge_idx, and the weighted prediction unit 3094 derives gbiIndex in units of coding unit. That is, in the merge mode, for the weight coefficient in the target block, the weight coefficients of the merge candidates are inherited. Note that in the derivation of the weight coefficient of the target block in the merge mode, the weight coefficient of the merge candidate specified by the merge index merge_idx is configured.

Selection of Prediction Mode

Figure 14:
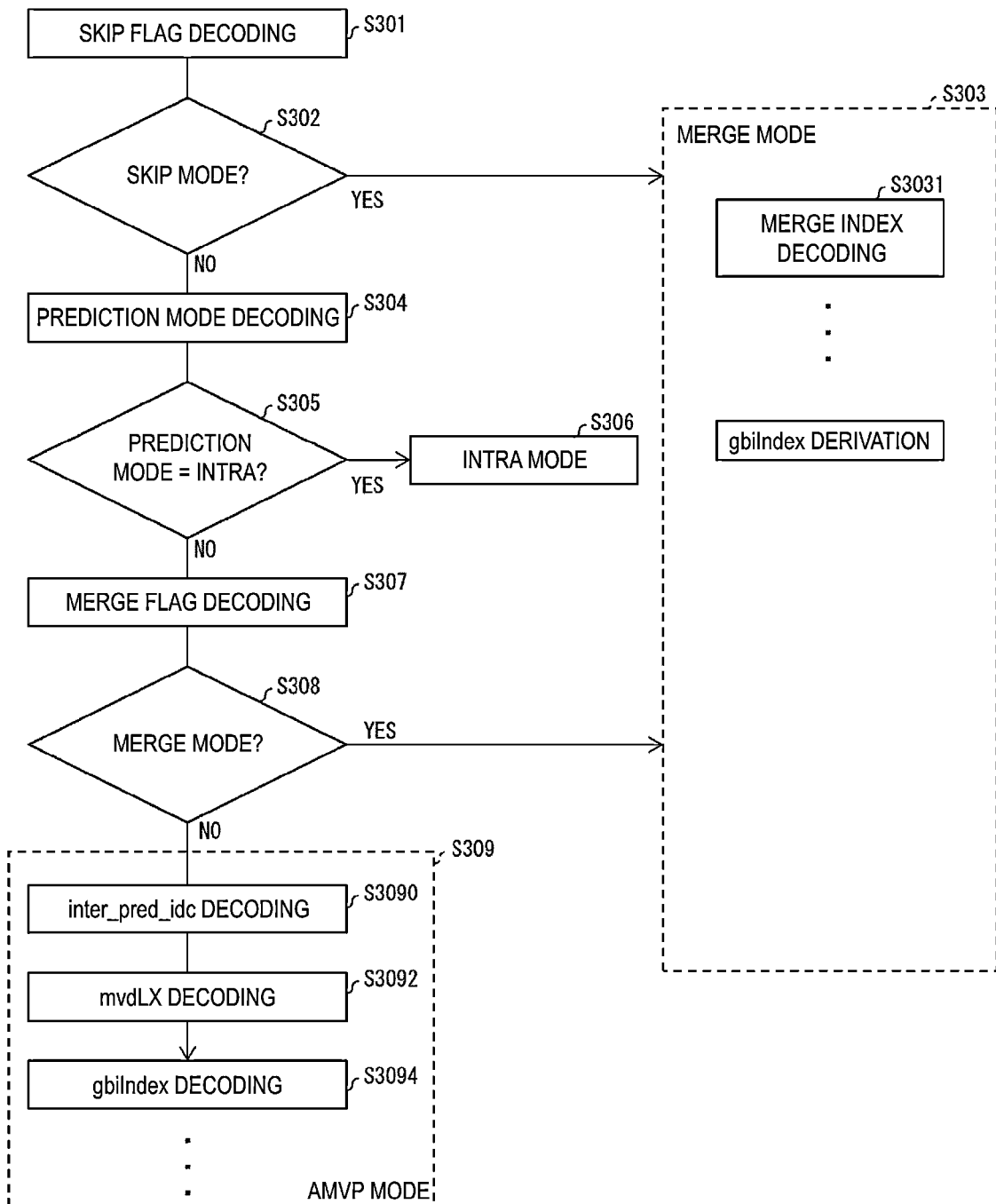
FIG. 14 is a flowchart illustrating a flow of selection processing of a prediction mode in the video decoding apparatus according to the present embodiment.

Next, referring to FIG. 14, selection processing of a prediction mode using the GBI prediction in the video decoding apparatus 31 will be described. FIG. 14 is a flowchart illustrating a flow of selection processing of a prediction mode in the video decoding apparatus 31.

As illustrated in FIG. 14, the prediction parameter decoding unit 302 first decodes a skip flag (S301). In a case that the skip flag is indicating to be a skip mode (YES in S302), the prediction mode becomes the merge mode (S303), the prediction parameter decoding unit 302 decodes the merge index (S3031), and the weighted prediction unit 3094 derives the weight coefficients used for the GBI prediction.

In a case that the skip flag is not indicating to be the skip mode (NO in S302), the prediction parameter decoding unit 302 decodes a prediction mode flag (S304). In a case that the prediction mode flag is indicating to be an intra prediction mode (YES in S305), the prediction mode becomes the intra prediction mode (S306).

In a case that the prediction mode flag is not indicating to be the intra prediction mode (NO in S305), the prediction parameter decoding unit 302 decodes the merge flag (S307). In a case that the merge flag is indicating to be the merge mode (YES in S308), the prediction mode becomes the merge mode (S303), the prediction parameter decoding unit 302 decodes the merge index (S3031).

In a case that the merge flag is not indicating to be the merge mode (NO in S308), the prediction mode becomes the AMVP mode (S309).

In the AMVP mode, the prediction parameter decoding unit 302 decodes the inter prediction indicator inter_pred_idc (S3090). Subsequently, the prediction parameter decoding unit 302 decodes the difference vector mvdLX (S3092). Next, the prediction parameter decoding unit 302 decodes gbiIndex (S3094), and the weighted prediction unit 3094 selects the weight coefficients used for the GBI prediction from the weight coefficient candidates of gbwTable[ ].

Figure 15:
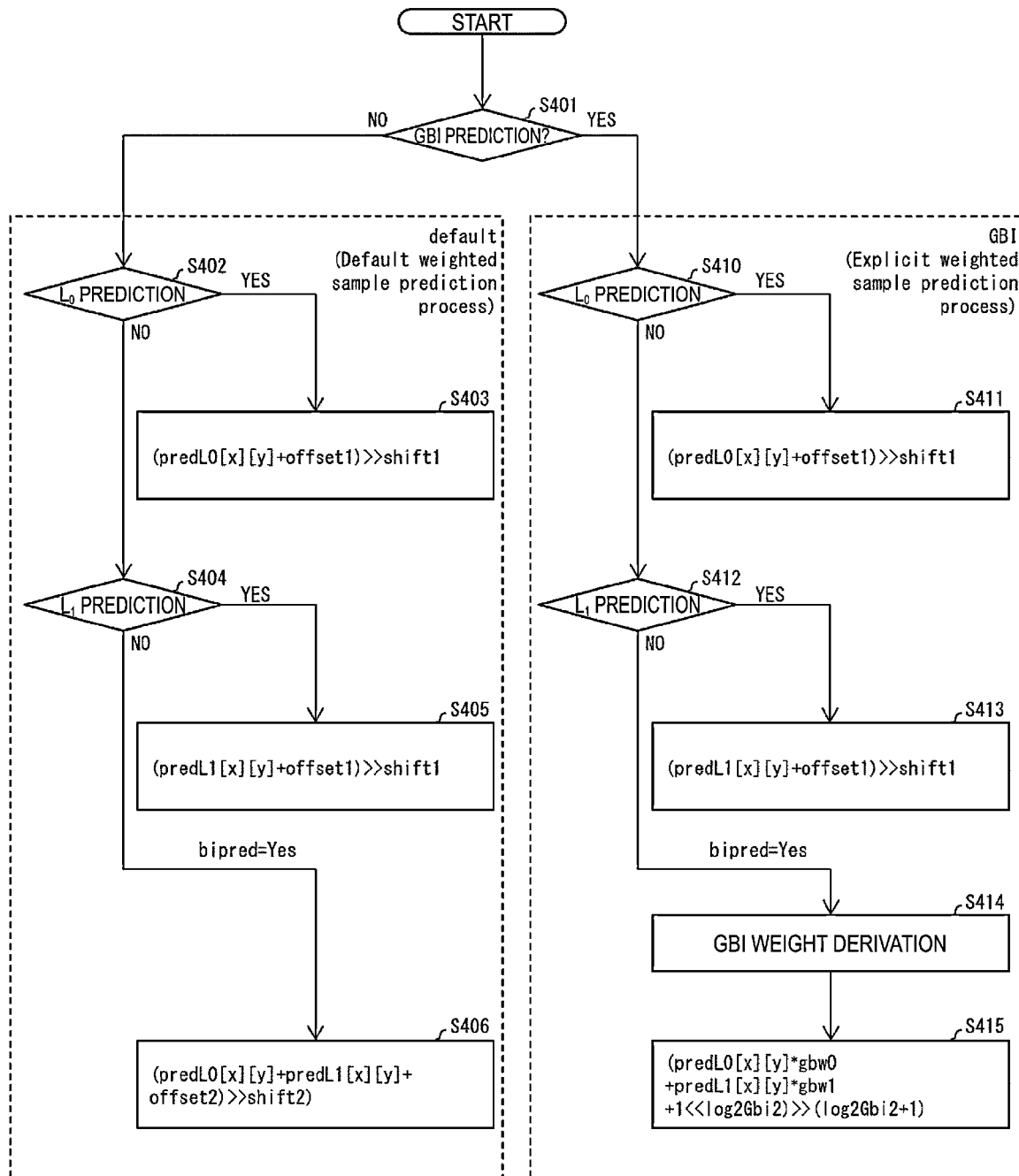
FIG. 15 is a flowchart illustrating an example of a flow of processing in which the weighted prediction unit according to the present embodiment generates a prediction image using the GBI prediction.

Next, processing in which the weighted prediction unit 3094 generates a prediction image using the GBI prediction will be described. FIG. 15 is a flowchart illustrating an example of a flow of processing in which the weighted prediction unit 3094 generates a prediction image using the GBI prediction.

As illustrated in FIG. 15, the weighted prediction unit 3094 determines whether or not the GBI prediction is configured to on in a target coding unit (S401). Whether or not the GBI prediction is configured to on is determined by whether or not gbiIndex decoded by the prediction parameter decoding unit 302 is 2 (=defaultGbiIndex). In a case that gbiIndex is 2, as illustrated in (a) of FIG. 13, the weight coefficient is 1/2 and is the same as that of a normal weighted prediction. Accordingly, it is determined that the GBI prediction is off in a case that gbiIndex is 2, and that the GBI prediction is on otherwise. In a case that the GBI prediction is configured to on in the target coding unit (YES in S401), the weighted prediction unit 3094 determines whether or not the prediction is the L0 prediction (S410). In a case that the prediction is the L0 prediction (YES in S410), the weighted prediction unit 3094 generates the prediction image using the following equation (S411).

$$pred[x][y] = (predL0[x][y] + \text{offset1}) >> \text{shift1}$$

In a case that the prediction is not the L0 prediction (NO in S410), the weighted prediction unit 3094 determines whether or not the prediction is the L1 prediction (S412). In a case that the prediction is the L1 prediction (YES in S412), the weighted prediction unit 3094 generates the prediction image using the following equation (S413).

$$pred[x][y] = (predL1[x][y] + \text{offset1}) >> \text{shift1}$$

In a case that the prediction is not the L1 prediction (NO in S412), the prediction is the bi-prediction (bipred), the weighted prediction unit 3094 derives the weight coefficients used for the GBI prediction (S414), and generates the prediction image using the GBI prediction, using the following equations (S415).

$$pred[x][y] =$$
$$(predL0[x][y] * gbw0 + pred1[x][y] * gbw1 + 1 << \log2Gbi2) >>$$
$$(\log2Gbi2 + 1)$$
$$\log2Gbi2 = \log2Gbi2 + \text{shift1} - 1$$

Note that shift1 is expressed by the following equation.

$$\text{shift1} = \text{Max}(2, 14 - \text{bit Depth})$$

Furthermore, in a case that the GBI prediction is configured to off in the target coding unit (NO in S401), the weighted prediction unit 3094 generates the prediction image using the default weight coefficient. First, the weighted prediction unit 3094 determines whether or not the prediction is the L0 prediction (S402). In a case that the prediction is the L0 prediction (YES in S402), the weighted prediction unit 3094 generates the prediction image using the following equation (S403).

$$pred[x][y] = (predL0[x][y] + \text{offset1}) >> \text{shift1}$$

In a case that the prediction is not the L0 prediction (NO in S402), the weighted prediction unit 3094 determines whether or not the prediction is the L1 prediction (S404). In a case that the prediction is the L1 prediction (YES in S404), the weighted prediction unit 3094 generates the prediction image using the following equation (S405).

$$pred[x][y] = (predL1[x][y] + \text{offset1}) >> \text{shift1}$$

In a case that the prediction is not the L1 prediction (NO in S404), the prediction is the bi-prediction weighted prediction (bipred), the weighted prediction unit 3094 generates the prediction image using the following equation (S406).

$$pred[x][y] = (predL0[x][y] + predL1[x][y] + \text{offset2}) >> \text{shift2}$$

Note that shift1 and shift2 are expressed by the following equations.

$$\text{shift1} = \text{Max}(2, 14 - \text{bit Depth})$$
$$\text{shift2} = \text{Max}(3, 15 - \text{bit Depth}) = \text{shift1} + 1$$

Example of Using WP Prediction and GBI Prediction in Combination

As described above, each of the predictions respectively using the WP prediction and the GBI prediction has weight coefficients. Therefore, in terms of which weight coefficient is used, it may be difficult to use the WP prediction and the GBI prediction simply in combination. For example, in a case that prediction using the GBI prediction is performed on the prediction image generated by the WP prediction, a problem that a calculation amount increases may arise.

An example of a configuration for generating a prediction image by using the WP prediction and the GBI prediction in combination will be described below. Examples described below can also be expressed as follows. The weighted prediction unit 3094 generates a prediction image using at least one of the following weight coefficients and offsets.

(1) At least one of weight coefficients and offsets applied to each pixel value included in one or a plurality of reference images used for the WP prediction, which are first weight coefficients and offsets sent from the video coding apparatus 11 in units of slice and configured for each reference image (first unit region).

(2) Second weight coefficients which are used for the GBI prediction and configured for each second unit region (in units of coding unit) different from the above-described first unit region.

According to the above-described configuration, the weighted prediction and the GBI prediction can be adaptively used in combination.

Example of Using WP Prediction and GBI Prediction in Combination by Exclusively Operating In the present example, the weighted prediction unit 3094 uses the WP prediction and the GBI prediction in combination by exclusively operating them.

Example of Selecting Either WP Prediction or GBI Prediction in Accordance with Value Indicated by gbiIndex In the present example, in accordance with a value indicated by gbiIndex (a value of syntax decoded from coded data), the weighted prediction unit 3094 selects either the WP prediction or the GBI prediction.

According to the above-described configuration, the weighted prediction unit 3094 selects either a first prediction mode (primary mode, WP prediction) or a second prediction mode (secondary mode, GBI prediction), in accordance with the value of syntax. Accordingly, it is possible to exclusively operate the WP prediction and the GBI prediction.

Figure 16:
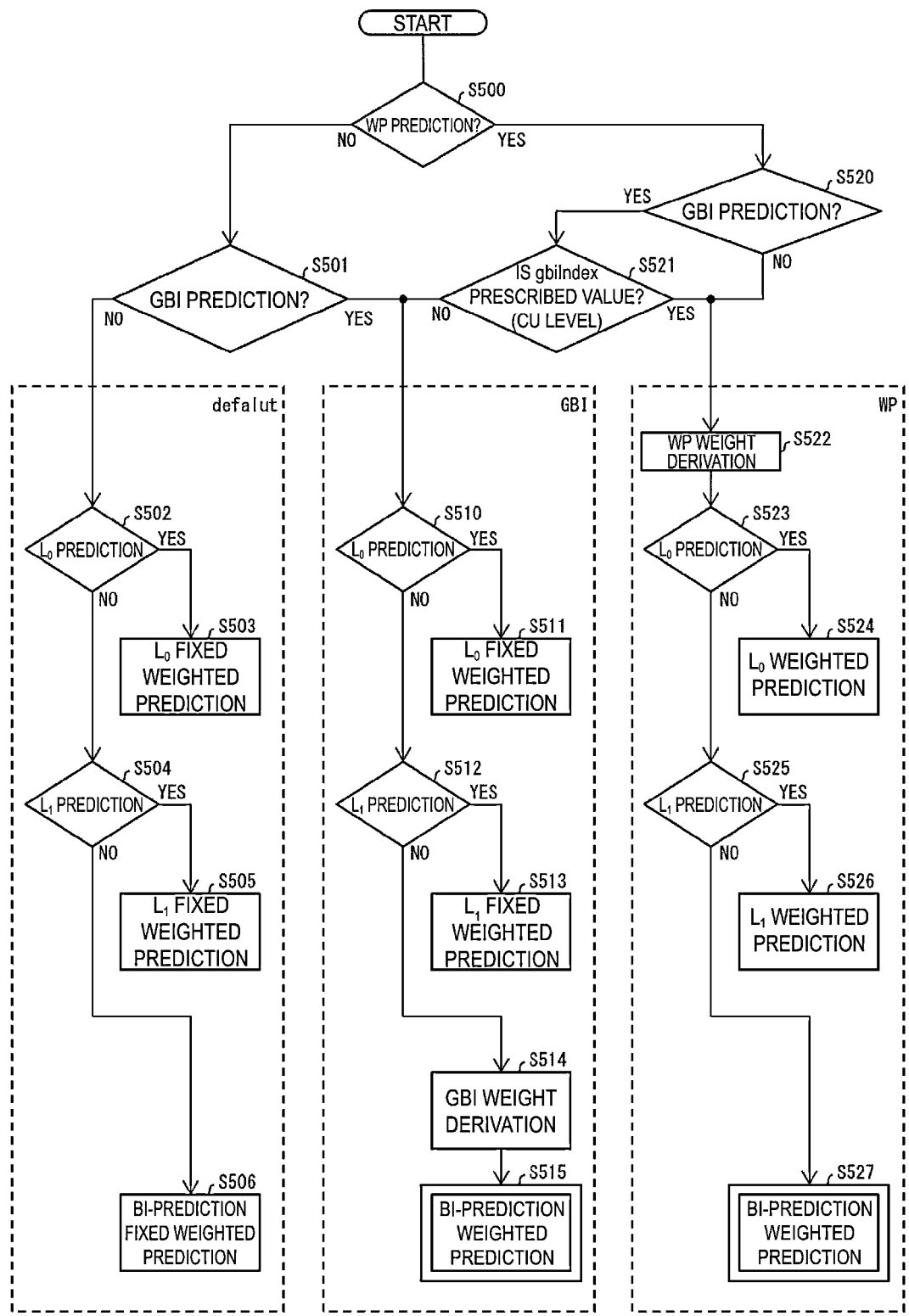
FIG. 16 is a flowchart illustrating an example of a flow of processing in which the weighted prediction unit according to the present embodiment generates a prediction image using the WP prediction, the GBI prediction, or a fixed weighted prediction.

FIG. 16 is a flowchart illustrating an example of a flow of processing in which the weighted prediction unit 3094 generates a prediction image using the WP prediction, the GBI prediction, or the fixed weighted prediction.

As illustrated in FIG. 16, the weighted prediction unit 3094 determines whether or not the WP prediction is configured to on in a slice (S500). The determination method in S500 is the same as that in S201. In a case that the WP prediction is configured to on in the slice (YES in S500), the weighted prediction unit 3094 determines whether or not the GBI prediction is configured to on in a slice header (S520). Whether or not the GBI prediction is configured to on is determined by whether or not gbiPriFlag signalled by the slice header is 0. gbiPriFlag will be described later. In a case that the GBI prediction is configured to off in the slice header (NO in S520), or in a case that the GBI prediction is on but gbiIndex is a prescribed value defaultGbiIndex (YES in S521), the weighted prediction unit 3094 derives the weight coefficients and the offsets used for the WP prediction (S522). Then, the processing proceeds to S523, and the weighted prediction unit 3094 generates the prediction image using the WP prediction. The processing from S523 to S527 illustrated in FIG. 16 is the same as the processing from S210 to S214 described in "Processing for Generating Prediction Image Using WP Prediction" described above, and thus the description is not repeated here.

Figure 17:
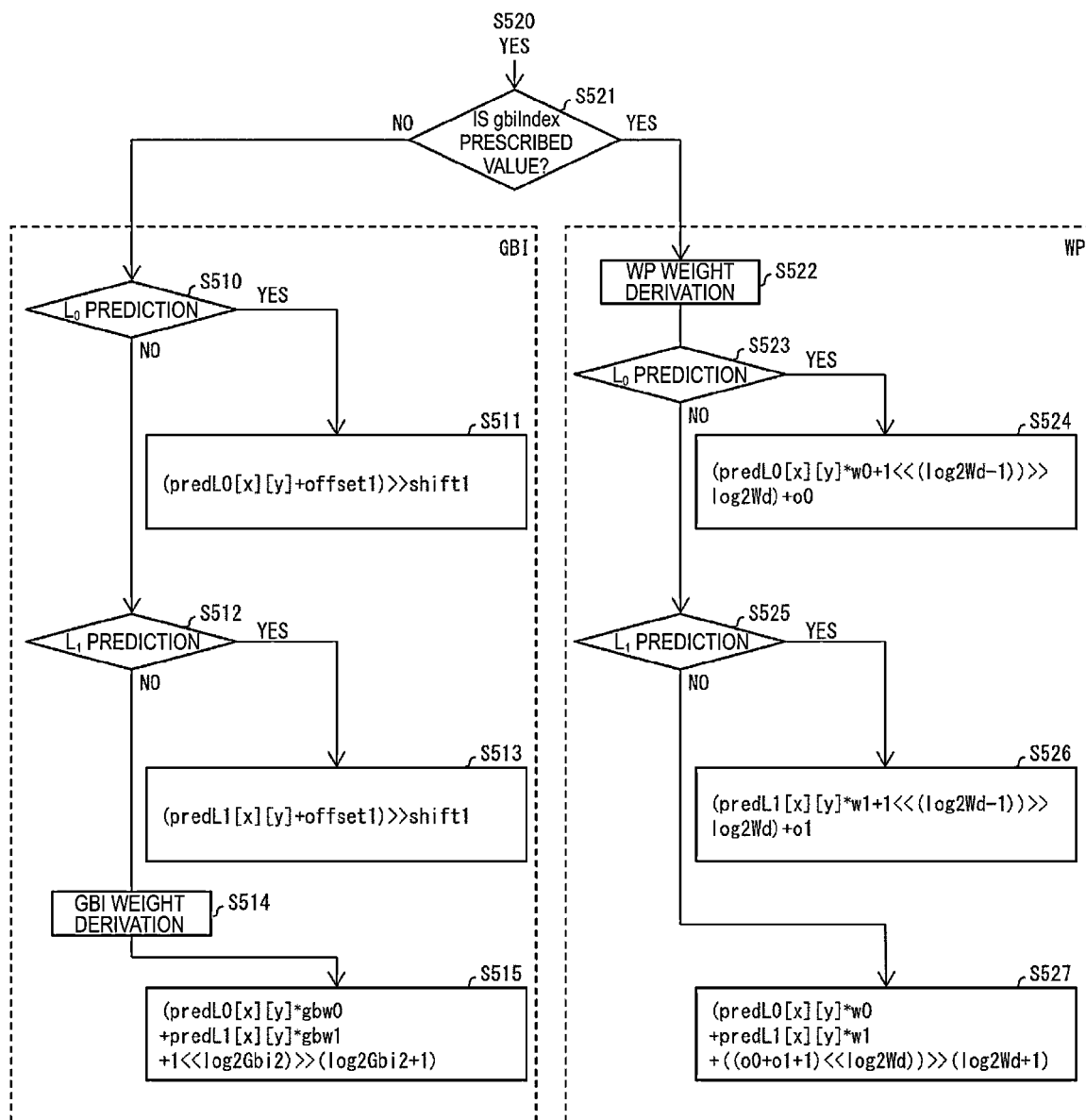
FIG. 17 is a flowchart illustrating a flow of processing in a case that the weighted prediction unit according to the present embodiment configures the GBI prediction to on, in a slice header.

FIG. 17 is a flowchart illustrating a flow of processing in a case that the GBI prediction is configured to on in the slice header. The weighted prediction unit 3094 determines whether or not the GBI prediction is configured to on in a target coding unit. The determination of whether or not the GBI prediction is configured to on is the same as that in S401. In other words, in accordance with the value indicated by gbiIndex decoded by the prediction parameter decoding unit 302, the weighted prediction unit 3094 selects either the WP prediction (GBI prediction off) or the GBI prediction (S521). For example, the weighted prediction unit 3094 may determine whether or not gbiIndex indicates defaultGbiIndex. FIG. 17 illustrates details of processing that follows the case of YES in S520 in FIG. 16.

In a case that gbiIndex indicates the prescribed value defaultGbiIndex (YES in S521), the processing proceeds to S522. In other words, the weighted prediction unit 3094 derives the weight coefficients and the offsets used for the WP prediction (S522), and generates the prediction image using the WP prediction.

In a case that gbiIndex does not indicate the prescribed value defaultGbiIndex (NO in S521), the processing proceeds to S510. In other words, the weighted prediction unit 3094 derives the weight coefficients and the offsets used for the GBI prediction (S514), and generates the prediction image using the GBI prediction. The processing from S510 to S515 illustrated in FIG. 16 and FIG. 17 is the same as the processing from S410 to S415 described in "Processing for Generating Prediction Image Using Generalized Bi-Prediction (GBI Prediction)" described above, and thus the description is not repeated here.

Note that in a case that the weighted prediction unit 3094 generates the prediction image of the GBI prediction using the WP prediction (the same processing as that in the WP prediction), the weight coefficients may be configured as described below.

$$\log2Wd = \log2Gbi2$$
$$w0 = gbw0$$
$$w1 = gbw1$$
$$o0 = o1 = 0$$

Furthermore, as illustrated in FIG. 16, in a case that the WP prediction is configured to off in the slice (NO in S500), the weighted prediction unit 3094 determines whether or not the GBI prediction is configured to on in the target coding unit (S501). The determination of whether or not the GBI prediction is configured to on is the same as that in S401. In a case that the GBI prediction is configured to on in the target coding unit (Yes in S501), the processing proceeds to S510. In a case that the GBI prediction is configured to off in the target coding unit (NO in S501), the processing proceeds to S502, the weighted prediction unit 3094 generates the prediction image using the default weight coefficient. The processing from S502 to S506 illustrated in FIG. 16 is the same as the processing from S402 to S406 described in "Processing for Generating Prediction Image Using Generalized Bi-Prediction (GBI Prediction)" described above, and thus the description is not repeated here.

Figure 18:
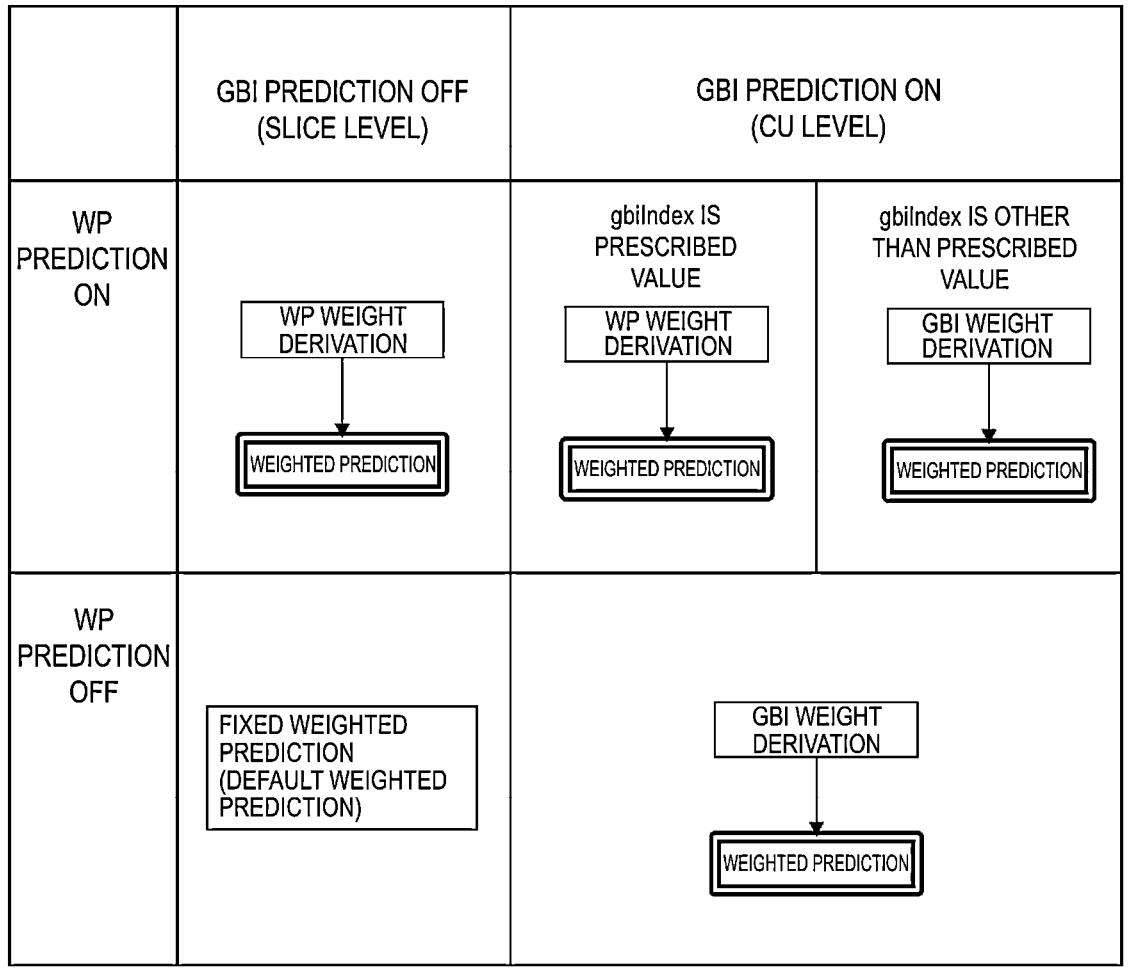
FIG. 18 is a diagram illustrating an example of a correspondence relationship between an on/off configuration of the WP prediction in a slice and an on/off configuration of the GBI prediction in a target coding unit and the type of bi-prediction processing, according to the present embodiment.

FIG. 18 is a diagram illustrating a correspondence relationship between an on/off configuration of the WP prediction in the slice and an on/off configuration of the GBI prediction in the target coding unit and the type of bi-prediction processing, in the present example.

As illustrated in FIG. 18, in a case that the WP prediction is on and the GBI prediction of the slice level is off, the weighted prediction unit 3094 derives the weight coefficients used for the WP prediction, and performs the bi-prediction processing using the WP prediction.

Furthermore, in a case that the WP prediction is on and the GBI prediction of the slice level is configured to on, and gbiIndex of a CU level indicates a prescribed value, the weighted prediction unit 3094 derives the weight coefficients used for the WP prediction, and performs the bi-prediction processing using the WP prediction.

Furthermore, in a case that the WP prediction is on and the GBI prediction of the slice level is configured to on, and gbiIndex of the CU level indicates a value other than the prescribed value, the weighted prediction unit 3094 derives the weight coefficients used for the GBI prediction, and performs the bi-prediction processing using the GBI prediction.

Furthermore, in a case that the WP prediction is off and the GBI prediction of the CU level is off, the weighted prediction unit 3094 performs the bi-prediction processing using the fixed weighted prediction.

Furthermore, in a case that the WP prediction is off and the GBI prediction of the CU level is on, the weighted prediction unit 3094 derives the weight coefficients used for the GBI prediction, and performs the bi-prediction processing using the GBI prediction.

Figure 19:
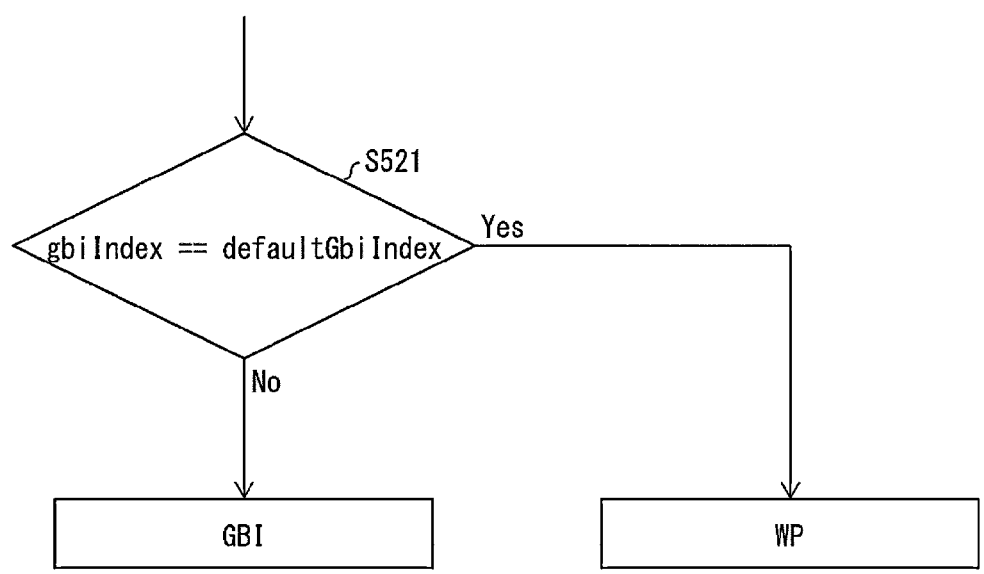
FIG. 19 is a diagram illustrating an example of determination of whether or not gbiIndex indicates a prescribed value, performed by the weighted prediction unit according to the present embodiment.

FIG. 19 illustrates an example of determination of whether or not gbiIndex indicates the prescribed value, performed by the weighted prediction unit 3094. In other words, FIG. 19 is a diagram illustrating an example of the determination in S521 illustrated in FIG. 16 and FIG. 17. In the example illustrated in FIG. 19, the weighted prediction unit 3094 determines whether or not gbiIndex indicates a value of defaultGbiIndex (for example, 2). As described above, defaultGbiIndex may be 0, and in this case, it is determined whether or not gbiIndex is 0.

Figure 20:
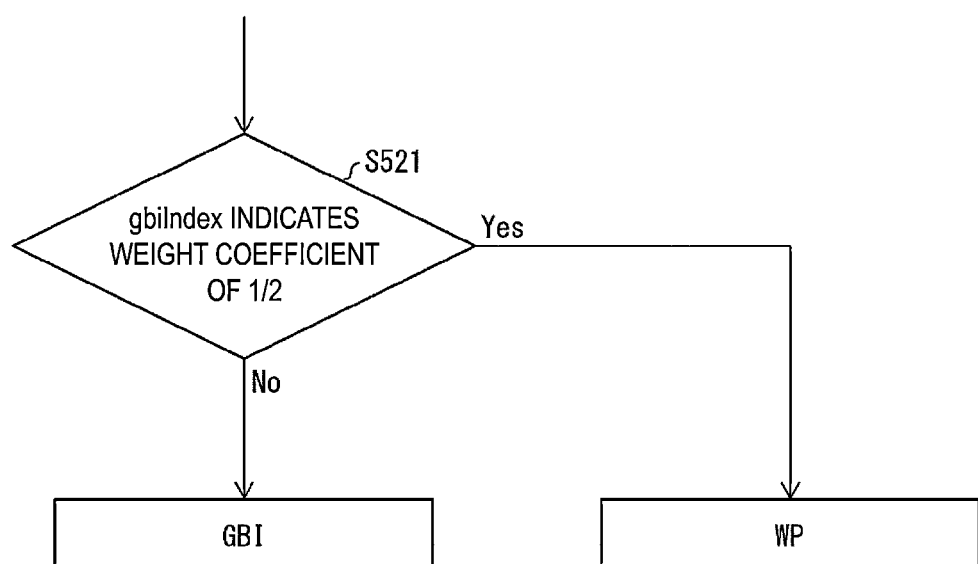
FIG. 20 is a diagram illustrating another example of determination of whether or not gbiIndex indicates a prescribed value, performed by the weighted prediction unit according to the present embodiment.

Furthermore, FIG. 20 illustrates another example of determination of whether or not gbiIndex indicates the prescribed value, performed by the weighted prediction unit 3094. In the example illustrated in FIG. 20, the weighted prediction unit 3094 determines whether or not the value indicated by gbiIndex is a value indicating the weight coefficient of ½.

Example of Selecting Either WP Prediction or GBI Prediction in Accordance with Value Indicated by gbiPriFlag In the present example, in accordance with a value indicated by gbiPriFlag (a value of syntax decoded from coded data (slice header)), the weighted prediction unit 3094 selects either the WP prediction or the GBI prediction.

Figure 21:
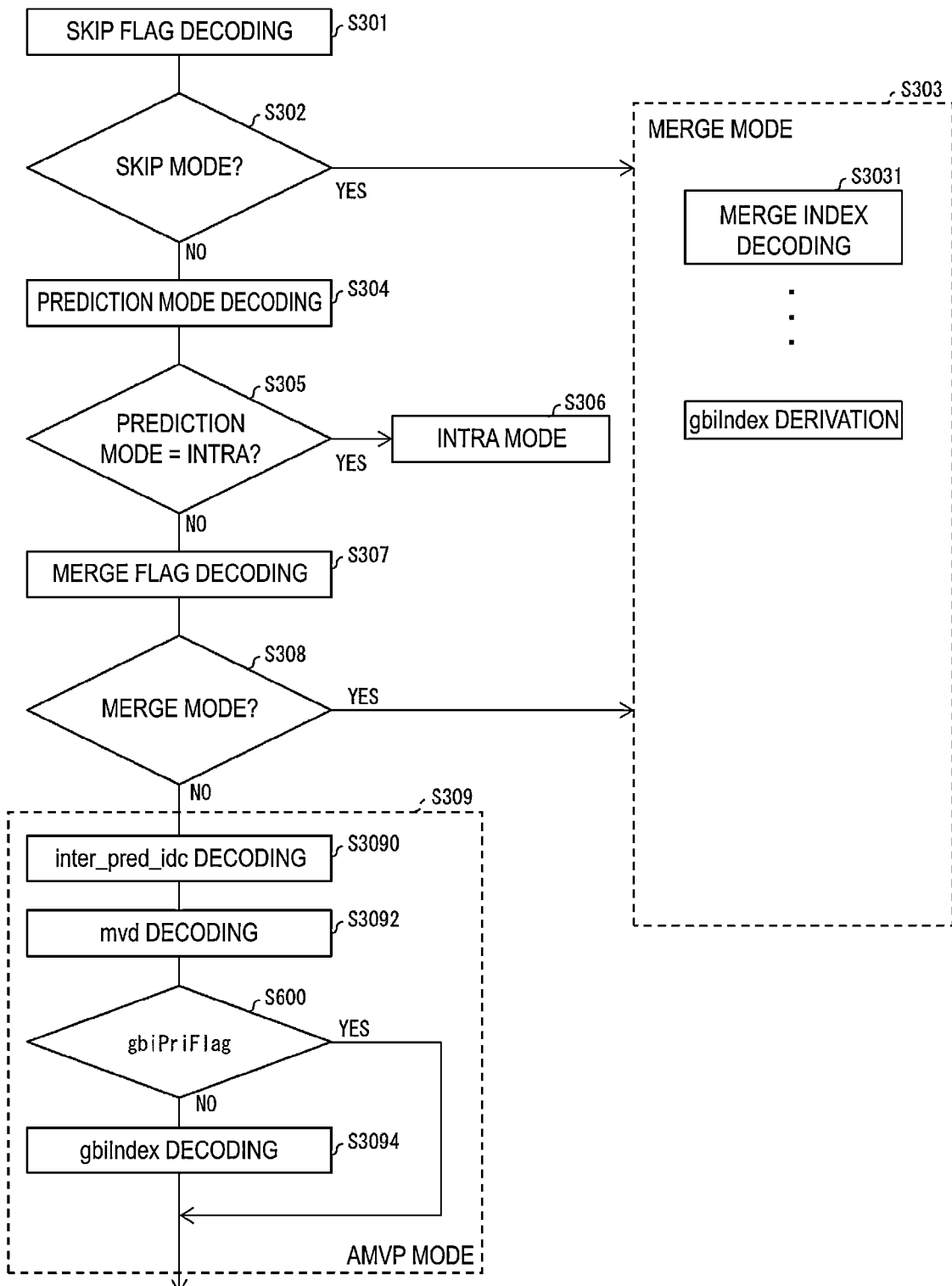
FIG. 21 is a flowchart illustrating a flow of selection processing of a prediction mode in the video decoding apparatus according to the present embodiment.

First, referring to FIG. 21, selection processing of the WP prediction and the GBI prediction in the video decoding apparatus 31 will be described. FIG. 21 is a flowchart illustrating a flow of selection processing of a prediction mode in the video decoding apparatus 31. The processing from S301 to S308 illustrated in FIG. 21 is the same as the processing described in "Selection of Prediction Mode" of "Processing for Generating Prediction Image Using Generalized Bi-Prediction (GBI Prediction)" described above, and thus the description is not repeated here.

In a case that the merge flag is not indicating to be the merge mode (NO in S308), the prediction mode becomes the AMVP mode (S309).

In the AMVP mode, the prediction parameter decoding unit 302 decodes the inter prediction indicator inter_pred_idc (S3090). Subsequently, the prediction parameter decoding unit 302 decodes the difference vector mvdLX (S3092). Subsequently, the weighted prediction unit 3094 determines whether a value indicated by gbiPriFlag signalled by the slice header is 0 or 1 (S600).

In a case that the value indicated by gbiPriFlag is 0 (NO in S600), the prediction parameter decoding unit 302 decodes gbiIndex (S3094), and the weighted prediction unit 3094 selects the weight coefficients used for the GBI prediction from the weight coefficient candidates of gbwTable[ ].

In a case that the value indicated by gbiPriFlag is 1 (YES in S600), the prediction parameter decoding unit 302 generates the prediction image using the WP prediction. Note that the prediction in a case that the value of gbiPriFlag is 1 is also referred to as a primary mode.

Figure 22:
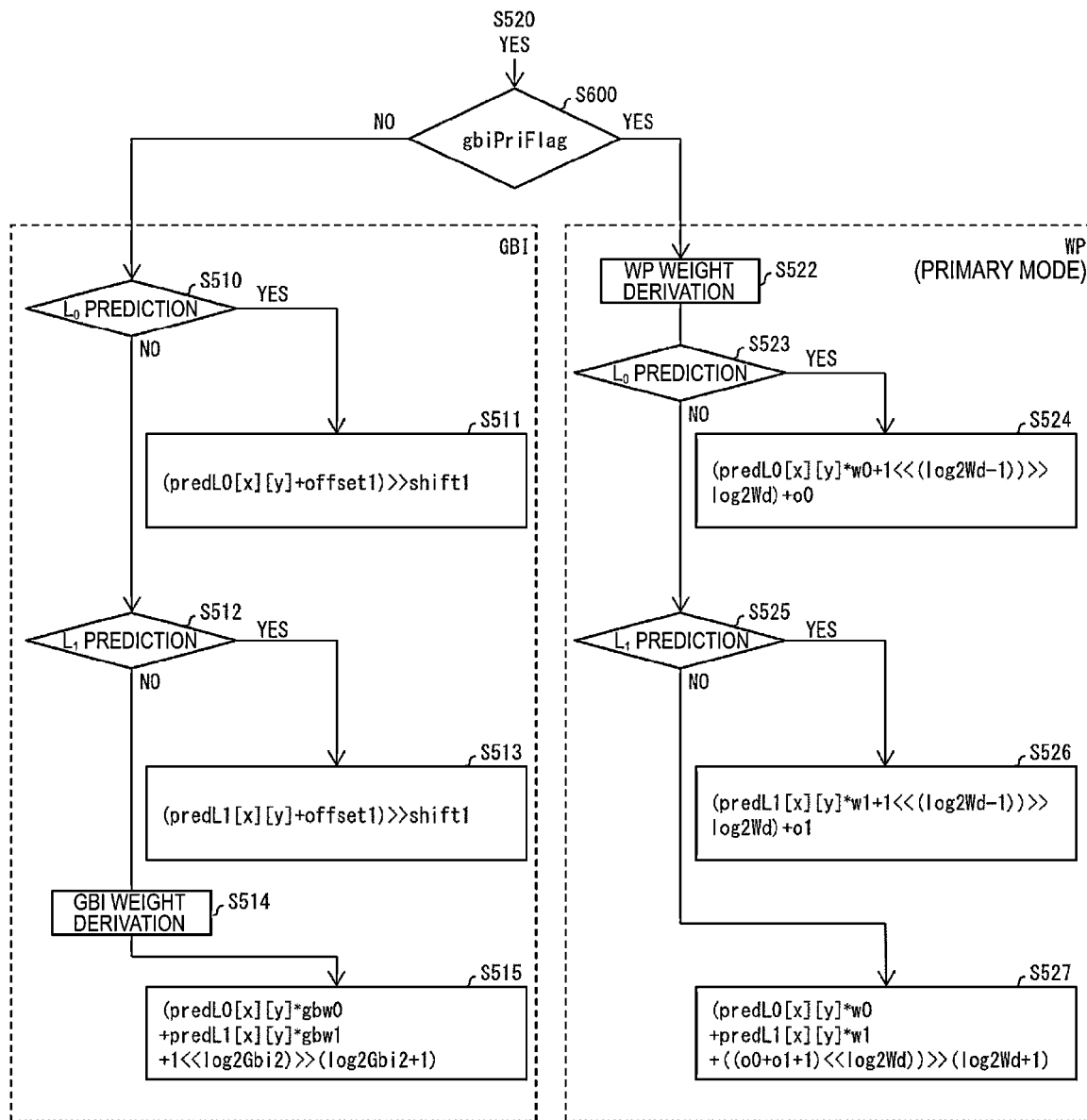
FIG. 22 is a flowchart illustrating an example of a flow of processing in which the weighted prediction unit according to the present embodiment selects either the WP prediction or the GBI prediction in accordance with a value indicated by gbiPriFlag.

Details of S600 described above and subsequent processing will be described. FIG. 22 is a flowchart illustrating a flow of processing in which the weighted prediction unit 3094 selects either the WP prediction or the GBI prediction in accordance with the value indicated by gbiPriFlag. FIG. 22 illustrates details of processing that follows the processing of S600 in FIG. 21.

The prediction parameter decoding unit 302 decodes gbiPriFlag, and as illustrated in FIG. 22, the weighted prediction unit 3094 determines whether the value indicated by gbiPriFlag is 0 or 1 (S600).

In a case that gbiPriFlag indicates the value of 1 (YES in S600), the processing proceeds to S522. In other words, the weighted prediction unit 3094 derives the weight coefficients and the offsets (S522), the processing proceeds to S523, and the weighted prediction unit 3094 generates the prediction image using the WP prediction. The processing from S523 to S527 illustrated in FIG. 22 is the same as the processing from S210 to S214 described in "Processing for Generating Prediction Image Using WP Prediction" described above, and thus the description is not repeated here.

In a case that gbiPriFlag indicates the value of 0 (NO in S600), the prediction parameter decoding unit 302 decodes gbiIndex and the processing proceeds to S510. The processing from S510 to S515 illustrated in FIG. 22 is the same as the processing from S410 to S415 described in "Processing for Generating Prediction Image Using Generalized Bi-Prediction (GBI Prediction)" described above, and thus the description is not repeated here. In a case that the prediction becomes the bi-prediction, the weighted prediction unit 3094 generates the prediction image using the GBI prediction.

Figure 23:
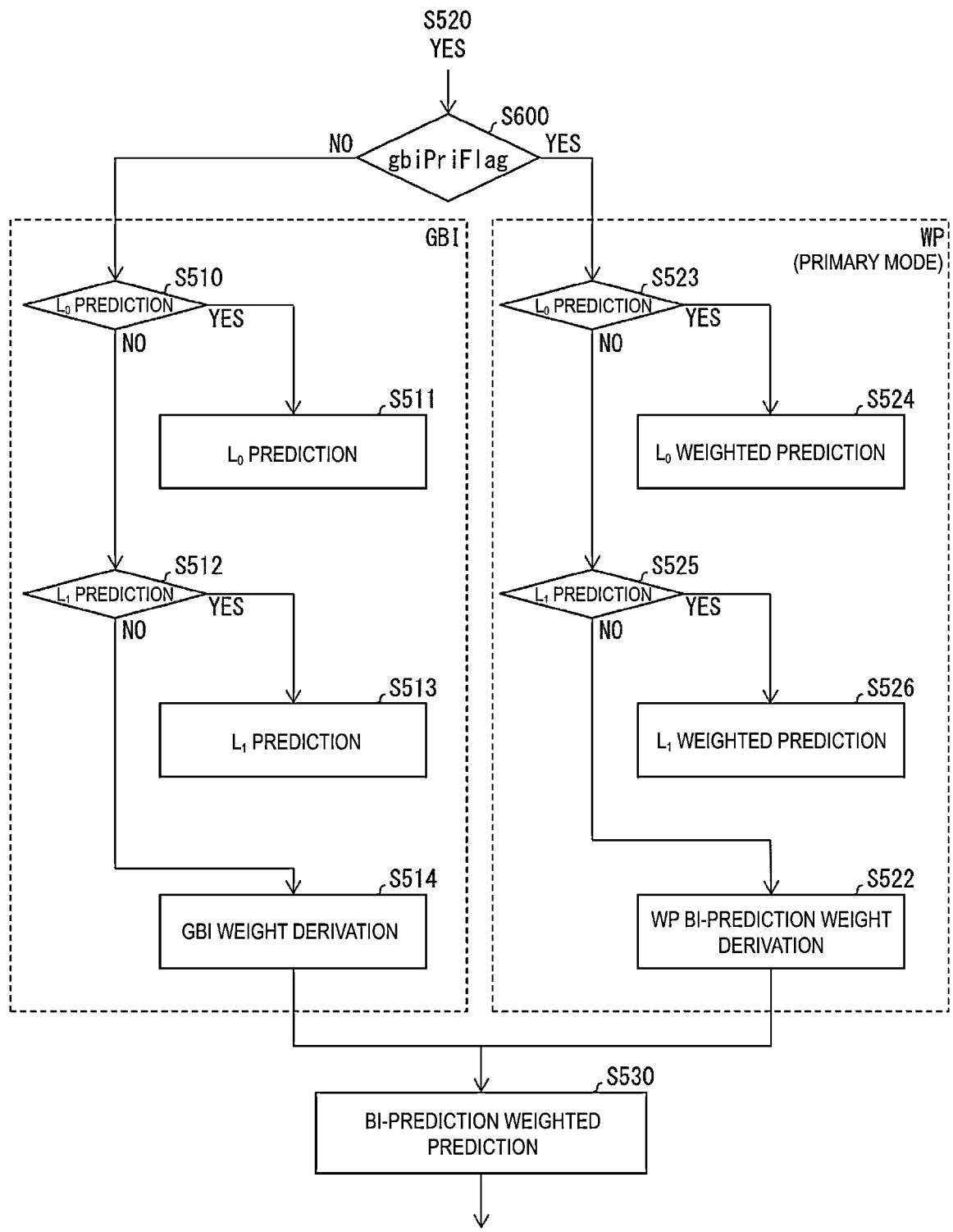
FIG. 23 is a flowchart illustrating another example of a flow of processing in which the weighted prediction unit according to the present embodiment selects either the WP prediction or the GBI prediction in accordance with a value indicated by gbiPriFlag.

Furthermore, FIG. 23 is a flowchart illustrating another example of a flow of processing in which the weighted prediction unit 3094 selects either the WP prediction or the GBI prediction in accordance with the value indicated by gbiPriFlag.

In processing illustrated in FIG. 22, the weighted prediction unit 3094 may include a GBI prediction unit that performs the GBI prediction and a WP prediction unit that performs the WP prediction, and each unit of the GBI prediction unit and the WP prediction unit may perform processing until generation of the prediction image. On the other hand, as illustrated in FIG. 23, the weighted prediction unit 3094 may include, in the uni-prediction, a GBI prediction unit that performs the GBI prediction and a WP prediction unit that performs the WP prediction, and in the bi-prediction, the GBI prediction unit and the WP prediction unit may perform processing until derivation of the weight coefficients used for the GBI prediction (S514) and derivation of the weight coefficients used for the bi-prediction by the WP prediction (S522). The prediction image generation in the bi-prediction (S530) may be performed, regardless of the GBI prediction and the WP prediction, by a common bi-prediction image generation unit, using the derived weight coefficients described above.

Example of Deriving Integrated Weight Coefficient from Weight Coefficient Used for WP Prediction and GBI Prediction In the present example, the weighted prediction unit 3094 derives an integrated weight coefficient with reference to the weight coefficient used for the WP prediction and the weight coefficient used for the GBI prediction. The weight coefficient and the offset used for the WP prediction are a weight coefficient and an offset for each reference picture configured for each slice as the first unit region. Furthermore, the weight coefficient used for the GBI prediction is a weight coefficient derived for each coding unit as the second unit region. The weighted prediction unit 3094 generates a prediction image using the derived integrated weight coefficient.

According to the above-described configuration, the weighted prediction unit 3094 derives the integrated weight coefficient, and generates the prediction image using the integrated weight coefficient. In other words, the weighted prediction unit 3094 can generate the prediction image reflecting both predictions of the WP prediction and the GBI prediction. Accordingly, a highly accurate prediction can be generated.

Figure 24:
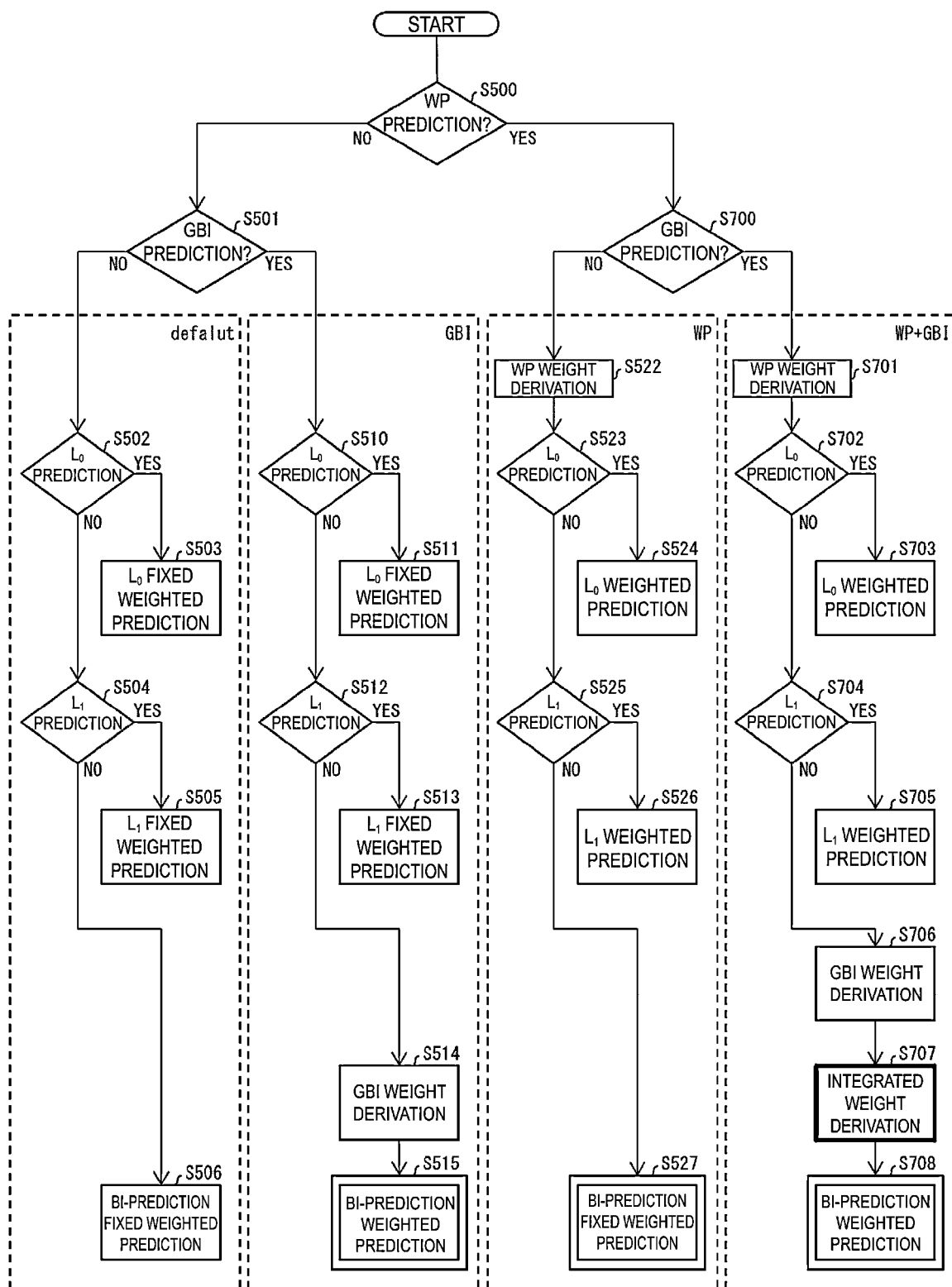
FIG. 24 is a flowchart illustrating an example of a flow of processing in which the weighted prediction unit according to the present embodiment generates a prediction image using a prediction reflecting both the WP prediction and the GBI prediction, the WP prediction, the GBI prediction, or the fixed weighted prediction.

FIG. 24 is a flowchart illustrating an example of a flow of processing in which the weighted prediction unit 3094 generates a prediction image using a prediction reflecting both the WP prediction and the GBI prediction (WP+GBI), the WP prediction, the GBI prediction, or the fixed weighted prediction.

As illustrated in FIG. 24, the weighted prediction unit 3094 determines whether or not the WP prediction is configured to on in a slice (S500). In a case that the WP prediction is configured to on in the slice (YES in S500), the weighted prediction unit 3094 determines whether or not the GBI prediction is configured to on in a coding unit (S700).

In a case that the GBI prediction is configured to on in the coding unit (YES in S700), the weighted prediction unit 3094 derives the weight coefficients and the offsets used for the WP prediction (S701).

Next, the weighted prediction unit 3094 determines whether or not the WP prediction is the L0 prediction (S702). In a case that the WP prediction is the L0 prediction (YES in S702), the weighted prediction unit 3094 generates the prediction image using the L0 prediction (S703). The generation of the prediction image using the L0 prediction in S703 is similar to that in S211 illustrated in FIG. 12 described above, and thus the description thereof is not repeated here.

In a case that the WP prediction is not the L0 prediction (NO in S702), the weighted prediction unit 3094 determines whether or not the WP prediction is the L1 prediction (S704). In a case that the WP prediction is the L1 prediction (YES in S704), the weighted prediction unit 3094 generates the prediction image using the L1 prediction (S705). The generation of the prediction image using the L1 prediction in S705 is similar to that in S213 illustrated in FIG. 12 described above, and thus the description thereof is not repeated here.

In a case that the WP prediction is not the L1 prediction (NO in S704), the WP prediction is the bi-prediction weighted prediction, and the weighted prediction unit 3094 derives the weight coefficients used for the GBI prediction (S706). Next, the weighted prediction unit 3094 derives integrated weight coefficients from the weight coefficients used for the WP prediction and the GBI prediction (S707). Subsequently, the weighted prediction unit 3094 generates the prediction image by the bi-prediction weighted prediction using the derived integrated weight coefficients (S708).

Furthermore, in a case that the GBI prediction is configured to off (NO in S700), the weighted prediction unit 3094 derives the weight coefficients and the offsets used for the WP prediction (S522). Then, the processing proceeds to S523, and the weighted prediction unit 3094 generates the prediction image using the WP prediction. The processing from S523 to S527 illustrated in FIG. 24 is the same as the processing from S210 to S214 described in "Processing for Generating Prediction Image Using WP Prediction" described above, and thus the description is not repeated here.

Furthermore, in a case that the WP prediction is configured to off in the slice (NO in S500), the weighted prediction unit 3094 determines whether or not the GBI prediction is configured to on in the coding unit (S501). In a case that the GBI prediction is configured to off in the coding unit (NO in S501), the processing proceeds to S502, and the weighted prediction unit 3094 generates the prediction image using the fixed weighted prediction. The processing from S502 to S506 is the same as the processing described in "Example of Selecting Either WP Prediction or GBI Prediction in Accordance with Value Indicated by gbiIndex" described above, and thus the description is not repeated here.

Furthermore, in a case that the GBI prediction is configured to on in the coding unit (YES in S501), the processing proceeds to S510. The processing from S510 to S515 is the same as the processing described in "Example of Selecting Either WP Prediction or GBI Prediction in Accordance with Value Indicated by gbiIndex" described above, and thus the description is not repeated here.

Figure 25:
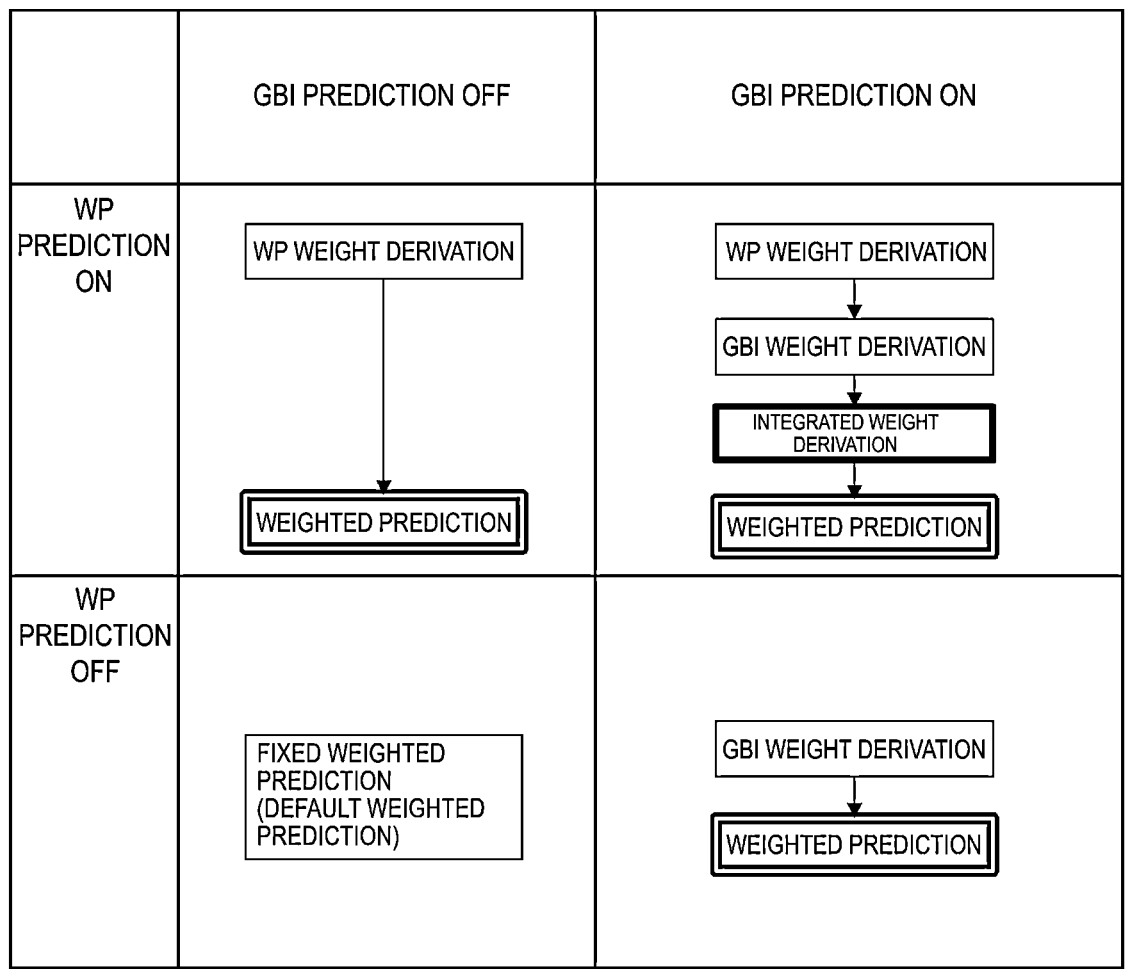
FIG. 25 is a diagram illustrating another example of a correspondence relationship between an on/off configuration of the WP prediction in the slice and an on/off configuration of the GBI prediction in a target coding unit and the type of bi-prediction processing, according to the present embodiment.

FIG. 25 is a diagram illustrating a correspondence relationship between an on/off configuration of the WP prediction in the slice and an on/off configuration of the GBI prediction in the target coding unit and the type of bi-prediction processing, in the present example.

As illustrated in FIG. 25, in a case that the WP prediction in the slice level is on and the GBI prediction of the coding unit level is off, the weighted prediction unit 3094 derives the weight coefficients used for the WP prediction, and performs the bi-prediction weighted prediction using the WP prediction.

Furthermore, in a case that the WP prediction in the slice level is on and the GBI prediction of the coding unit level is configured to on, the weighted prediction unit 3094 derives the weight coefficients used for the WP prediction and the GBI prediction. Then, the weighted prediction unit 3094 derives integrated weight coefficients from the weight coefficients used for the WP prediction and the weight coefficients used for the GBI prediction. The weighted prediction unit 3094 performs the bi-prediction weighted prediction using the derived integrated weight coefficients.

Furthermore, in a case that the WP prediction is off and the GBI prediction of the coding unit level is off, the weighted prediction unit 3094 performs the bi-prediction weighted prediction using the fixed weighted prediction.

Furthermore, in a case that the WP prediction is off and the GBI prediction of the coding unit level is on, the weighted prediction unit 3094 derives the weight coefficients used for the GBI prediction, and performs the bi-prediction weighted prediction using the GBI prediction.

Figure 26:
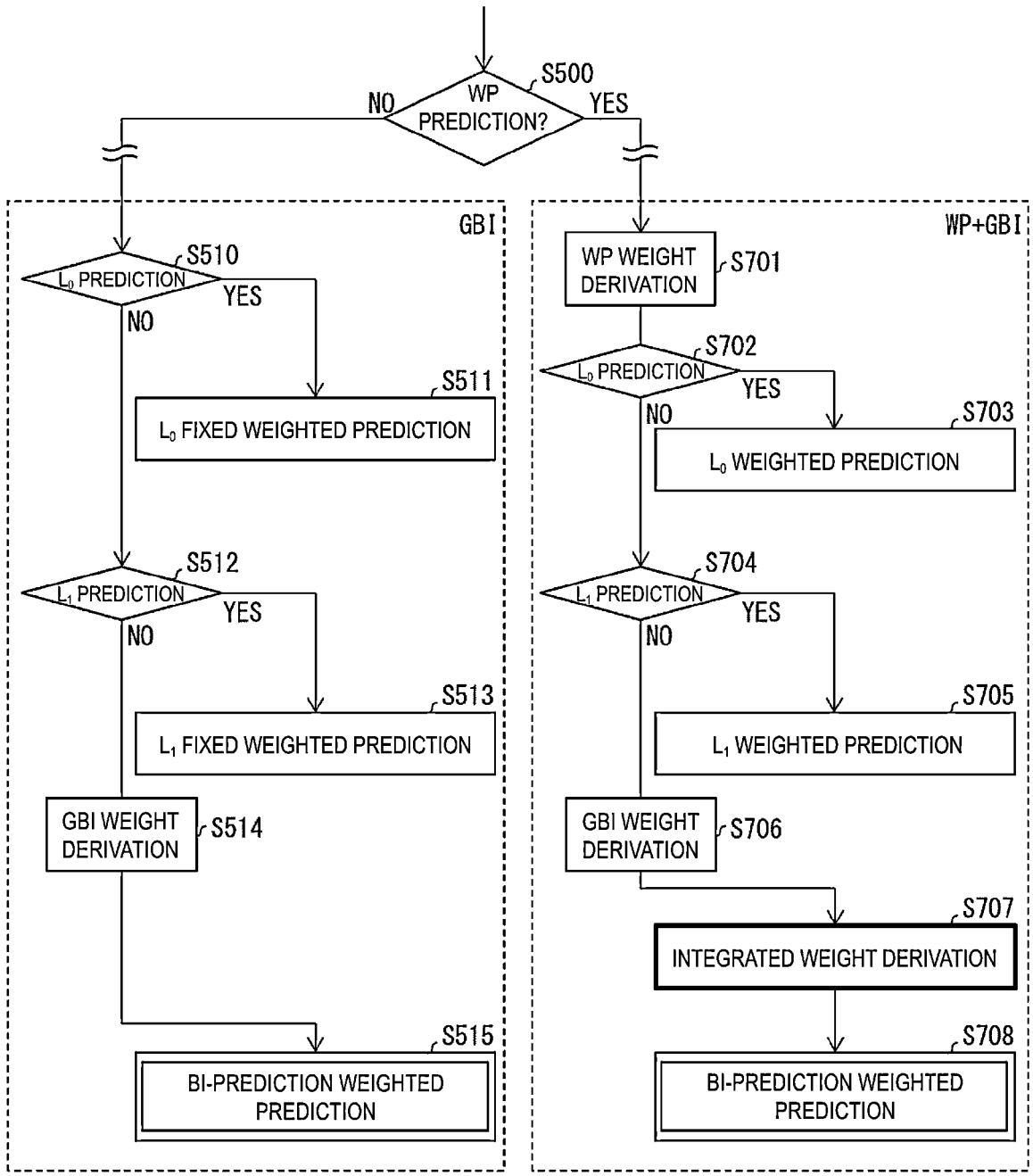
FIG. 26 is a diagram illustrating part of processing according to the present embodiment.

Furthermore, FIG. 26 is a diagram illustrating part of the processing in FIG. 24. For example, the weighted prediction unit 3094 may include a GBI prediction unit that performs the GBI prediction and a WP+GBI prediction unit that performs the WP+GBI prediction, and each unit of the GBI prediction unit and the WP+GBI prediction unit may perform processing of the prediction image generation using each prediction.

Figure 27:
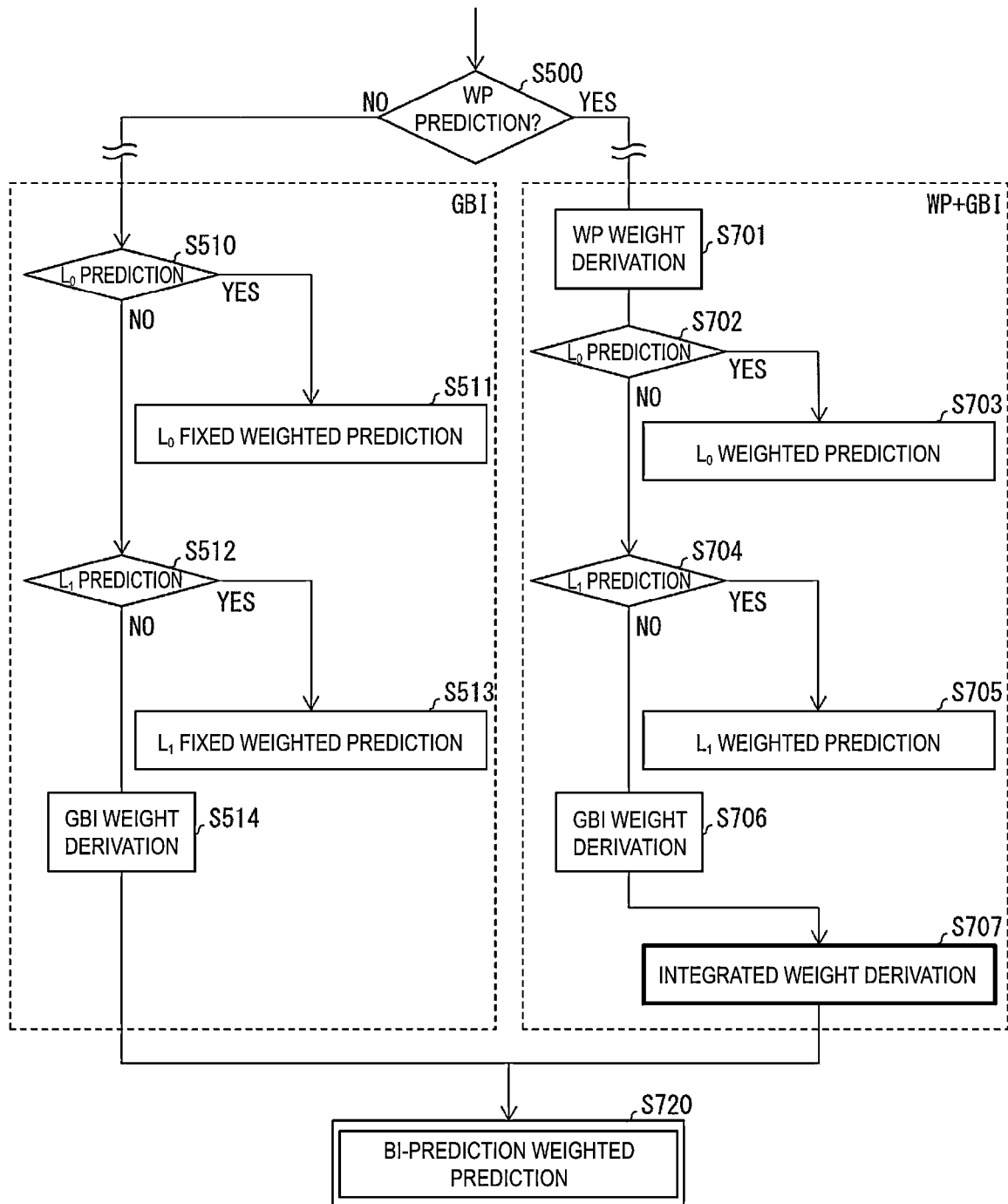
FIG. 27 is a flowchart illustrating another example of a flow of processing of the weighted prediction unit according to the present embodiment.

Furthermore, FIG. 27 is a flowchart illustrating another example of a flow of processing in which the weighted prediction unit 3094 selects either the WP+GBI prediction or the GBI prediction. The weighted prediction unit 3094 may include a GBI weight coefficient derivation unit that derives the weight coefficients used for the GBI prediction, and a WP+GBI weight coefficient derivation unit that derives the weight coefficients used for the WP+GBI prediction. Each unit of the GBI weight coefficient derivation unit and the WP+GBI weight coefficient derivation unit may perform processing until derivation of the weight coefficients used for GBI prediction (S514) and derivation of the weight coefficients used for the bi-prediction by the WP+GBI prediction (S707). The prediction image generation in the bi-prediction (S720) may be performed, regardless of the GBI prediction and the WP+GBI prediction, by a common bi-prediction prediction image generation unit, using the derived weight coefficients described above.

Example of Deriving Integrated Weight Coefficients by Adding Weight Coefficients Used for WP Prediction and GBI Prediction Next, an example of derivation of the integrated weight coefficient will be described. In the present example, the weighted prediction unit 3094 uniformizes the accuracy of the weight coefficients used for the WP prediction or the weight coefficients used for the GBI prediction by performing shift processing thereon and then adds them (corresponding to the arithmetic mean) to derive the integrated weight coefficients.

To describe in detail, the weight coefficients used for the WP prediction or the weight coefficients used for the GBI prediction are subjected to the shift processing so as to be adjusted to the higher accuracy of the accuracy of the weight coefficients used for the WP prediction and the accuracy of the weight coefficients used for the GBI prediction.

FIG. 28 is a diagram illustrating an example of derivation of the integrated weight coefficients by the weighted prediction unit 3094.

As illustrated in FIG. 28, a shift amount luma_log 2_weight_denom+1 of the WP prediction and a shift amount (here, 3+1) of the GBI prediction are compared with each other, in a case that a shift value log 2Wd of the WP prediction is greater than a shift value 3 of the GBI prediction, the weights of the GBI prediction are shifted by the difference value (shift=luma_log 2_weight_denom−3) (gbw0<<shift), w1=w1+ (gbw1<<shift), and added to the weights w0, w1 of the WP prediction, respectively. The final shift amount is luma_log 2_weight_denom+shift1+1.

$$w0 = w0 + (gbw0 << \text{shift})$$
$$w1 = w1 + (gbw1 << \text{shift})$$
$$\log 2Wd = \log 2Wd + 1$$

In contrast, in a case that the shift amount log 2Wd+1 of the WP prediction is smaller than the shift amount 3+1 of the GBI prediction, the weights of the WP prediction are shifted by the difference value (shift=3-luma_log 2_weight_denom) (gbw0<<shift), w1=w1+ (gbw1<<shift), and added to weights gw0, gw1 of the GBI prediction, respectively. The final shift amount is 4.

Note that in another configuration, the offset may be shifted in the same manner.

```
if (luma_log2_weight_denom > 3) { // here, log2Gbi = 3
  shift = luma_log2_weight_denom − 3
  w0 = w0 + (gbw0 << shift)
  w1 = w1 + (gbw1 << shift)
  o0 = o0 << 1, o1 = o1 << 1
  log2Wd = luma_log2_weight_denom + shift1 + 1
} else {
  shift = 3− luma_log2_weight_denom (= log2Gbi −
  luma_log2_weight_denom)
  w0 = (w0 << shift) + gbw0, w1 = (w1 << shift) + gbw 1
  o0 = (o0 << (shift + 1)), o1 = (o1 << (shift + 1))
  log2Wd = 4 (=log2Gbi + 1)
}
```

Note that in the example illustrated in FIG. 28, the shift amount of the shift processing with respect to the weight coefficients used for the WP prediction is taken as log 2Wd+1 (log 2Wd is luma_log 2_weight_denom+shift1), and the shift amount (log 2Gbi) of the shift processing with respect to the weight coefficients used for the GBI prediction is taken as 4. In order to average the weight of the shift processing with respect to the weight coefficients used for the GBI prediction and the weight of the shift processing with respect to the weight coefficients used for the WP prediction, 1 is added to luma_log 2_weight_denom+shift1. Note that the shift amount of the shift processing with respect to the weight coefficients used for the GBI prediction is not limited to 4, and may be log 2Gbi or the like.

Note that in a configuration in which it is obvious beforehand that the shift amount of the WP prediction is equal to or greater than the shift amount of the GBI prediction, only processing of $$\text{shift} = \text{luma\_log2\_weight\_demon} - \log2Gbi$$
$$w0 = w0 + (gbw0 << \text{shift})$$
$$w1 = w1 + (gbw1 << \text{shift})$$
$$o0 = o0 << 1, o1 = o1 << 1$$
$$\log2Wd = \text{luma\_log2\_weight\_demon} + \text{shift1} + 1$$

may be performed.

Furthermore, in a configuration in which it is obvious beforehand that the shift amount of the WP prediction is equal to or smaller than the shift amount of the GBI prediction, only processing of $$\text{shift} = \log2Gbi - \text{luma\_log2\_weight\_demon}$$
$$w0 = (w0 << \text{shift}) + gbw0, w1 = (w1 << \text{shift}) + gbw1$$
$$o0 = (o0 << (\text{shift} + 1)), o1 = (o1 << (\text{shift} + 1))$$
$$\log2Wd = \log2Gbi + 1$$

may be performed.

FIG. 29 is a diagram illustrating an example of a WP bi-prediction weighted prediction using the derived integrated weight coefficients by the weighted prediction unit 3094.

(a) of FIG. 29 is a diagram illustrating an example of derivation of weight coefficients (w0, w1) and offsets (o0, o1) used for the WP prediction by the weighted prediction unit 3094.

(b) of FIG. 29 is a diagram illustrating an example of derivation of weight coefficients (gbw0, gbw1) used for the GBI prediction by the weighted prediction unit 3094.

(c) of FIG. 29 is a diagram illustrating an example of derivation of integrated weight coefficients (w0, w1) and offsets (o0, o1) by the weighted prediction unit 3094.

As illustrated in (c) of FIG. 29, a shift amount log 2Wd of the WP prediction and a shift amount log 2Gbi2 of the GBI prediction are compared with each other, in a case that the shift amount log 2Wd of the WP prediction is greater than the shift amount log 2Gbi2 of the GBI prediction, the weights of the GBI prediction are shifted by the difference value (shift=log 2Wd-log 2Gbi2) (gbw0<<shift), w1=w1+ (gbw1<<shift), and added to the weights w0, w1 of the WP prediction, respectively. The final shift amount is the larger shift amount+1.

$$w0 = w0 + (gbw0 << \text{shift})$$
$$w1 = w1 + (gbw1 << \text{shift})$$
$$\log2Wd = \log2Wd + 1$$

In contrast, in a case that the shift amount log 2Wd of the WP prediction is smaller than the shift amount log 2Gbi2 of the GBI prediction, the weights of the WP prediction are shifted by the difference value (shift=log 2Gbi2-log 2Wd) (gbw0<<shift), w1=w1+ (gbw1<<shift), and added to the weights gw0, gw1 of the GBI prediction, respectively. The final shift amount is the larger shift amount+1.

$$w0 = (w0 << \text{shift}) + gbw0, w1 = (w1 << \text{shift}) + gbw1$$
$$\log2Wd = \log2Gbi + 1$$

Furthermore, the offsets of the WP prediction may be subjected to left shifting by the same shift amount.

$$o0 = (o0 << \text{shift}), o1 = (o1 << \text{shift})$$

Note that in another configuration, the shift amount of the offset may be further incremented by +1. This configuration preserves the magnitude of the offset even in a case that the final shift amount is incremented by +1 for the average value.

```
if (log2Wd > log2Gbi) {
    shift = log2Gbi2 - log2Wd
    w0 = w0 + (gbw0 << shift)
    w1 = w1 + (gbw1 << shift)
    o0 = o0 << 1, o1 = o1 << 1
    log2Wd = log2Wd + 1
} else {
    shift = log2Wd - log2Gbi2
    w0 = (w0 << shift) + gbw0, w1 = (w1 << shift) + gbw1
    o0 = (o0 << (shift + 1)), o1 = (o1 << (shift + 1))
    log2Wd = log2Gbi + 1
}
```

(d) of FIG. 29 is a diagram illustrating an example in which the weighted prediction unit 3094 generates the prediction image in the WP bi-prediction weighted prediction using the integrated weight coefficients (w0, w1).

The weighted prediction unit 3094 generates the prediction image using the WP bi-prediction weighted prediction by the equations illustrated in (a) to (d) of FIG. 29.

Furthermore, FIG. 30 to FIG. 32 are diagrams illustrating detailed examples of derivation of the integrated weight coefficients (w0, w1) and the offsets (o0, o1) by the weighted prediction unit 3094.

In the examples illustrated in FIG. 30 and FIG. 31, log 2Wd=luma_log 2_weight_denom+shift1 and log 2Gbi2=log 2Gbi+shift1-1 are substituted into the equations illustrated in (c) of FIG. 29, and the integrated weight coefficients (w0, w1) and the offset (o0, o1) are derived. In a case that the expression of shift1 is eliminated from the equations illustrated in FIG. 30, the equations illustrated in FIG. 31 are obtained.

The equations illustrated in FIG. 32 illustrates the equations for deriving the integrated weight coefficients (w0, w1)

and the offsets (o0, o1) in a case of log 2Gbi=4 in the equations illustrated in FIG. 31.

Example of Deriving Integrated Weight Coefficients by Multiplying Weight Coefficients Used for WP Prediction and GBI Prediction Next, another example of derivation of the integrated weight coefficients will be described. In the present example, the weighted prediction unit 3094 derives integrated weight coefficients by multiplying the weighted coefficients used for the WP prediction and the weight coefficients used for the GBI prediction (corresponding to geometric mean).

For example, the weighted prediction unit 3094 may generate uni-prediction images PredL0 and PredL1 of the WP and multiply the images by gbw0 and gbw1, respectively.

FIG. 33 is a diagram illustrating an example of the WP bi-prediction weighted prediction using the derived integrated weight coefficients by the weighted prediction unit 3094.

- (a) of FIG. 33 is a diagram illustrating an example of derivation of the weight coefficients (w0, w1) and the offsets (o0, o1) used for the WP prediction by the weighted prediction unit 3094.
- (b) of FIG. 33 is a diagram illustrating an example of derivation of the weight coefficients (gbw0, gbw1) used for the GBI prediction by the weighted prediction unit 3094.
- (c) of FIG. 33 is a diagram illustrating an example of derivation of the integrated weight coefficients (w0, w1) and the offsets (o0, o1) by the weighted prediction unit 3094.

As illustrated in (c) of FIG. 33, log 2Wd=log 2Gbi−1 is set. The equation represents that the shift amount used in the shift processing in the prediction image generation of the bi-prediction weighted prediction is determined from the sum of the shift amount used in the shift processing in the prediction image generation of the WP prediction and the shift amount used in the shift processing in the prediction image generation of the GBI prediction.

- (d) of FIG. 33 is a diagram illustrating an example in which the weighted prediction unit 3094 generates the prediction image in the bi-prediction weighted prediction using the integrated weight coefficients (w0, w1).

The weighted prediction unit 3094 generates the prediction image using the bi-prediction weighted prediction by the equations illustrated in (a) to (d) of FIG. 33.

Example of Prediction Image Generation in Primary Mode

In the present example, in a primary mode (a case that the value of gbiPriFlag is 1), the prediction parameter decoding unit 302 decodes a primary weight coefficient gbw_pri and an offset dw coded in units of slice. Furthermore, the weighted prediction unit 3094 derives the weight coefficients w1 and w0 from the primary weight coefficient gbw_pri and the offset dw in the primary mode. In a mode other than the primary mode, the weight coefficients gbw1 and gbw0 are derived in accordance with the value indicated by gbiIndex. The weighted prediction unit 3094 generates the prediction image using at least one the weight coefficients gbw1 and gbw0.

For example, in the weight prediction unit 3094, in a case that the value indicated by gbiIndex is a prescribed value (for example, 0), the weighted prediction unit 3094 uses the primary weight coefficient gbw_pri as the weight coefficient (w1), and generates the prediction image by the bi-prediction weighted prediction.

Furthermore, in a case that the value indicated by gbiIndex is other than a prescribed value (for example, other than 0), the weighted prediction unit 3094 derives the weight coefficient (gbw1) corresponding to the value indicated by gbiIndex, and generates the prediction image by the bi-prediction weighted prediction using the derived weight coefficient.

According to the above-described configuration, an explicit weight coefficient can be indicated by the primary weight coefficient, and thus it is possible to extend the function of the GBI prediction by including the function of the WP prediction therein. Accordingly, for example, in the generation of the prediction image by the GBI prediction, in a case that a prediction image with fade, resolve, or the like is generated, it is possible to obtain the same effect as that in the generation of the prediction image by the WP prediction. Furthermore, the primary weight coefficient may be a weight coefficient configured for each reference image.

Figure 34:
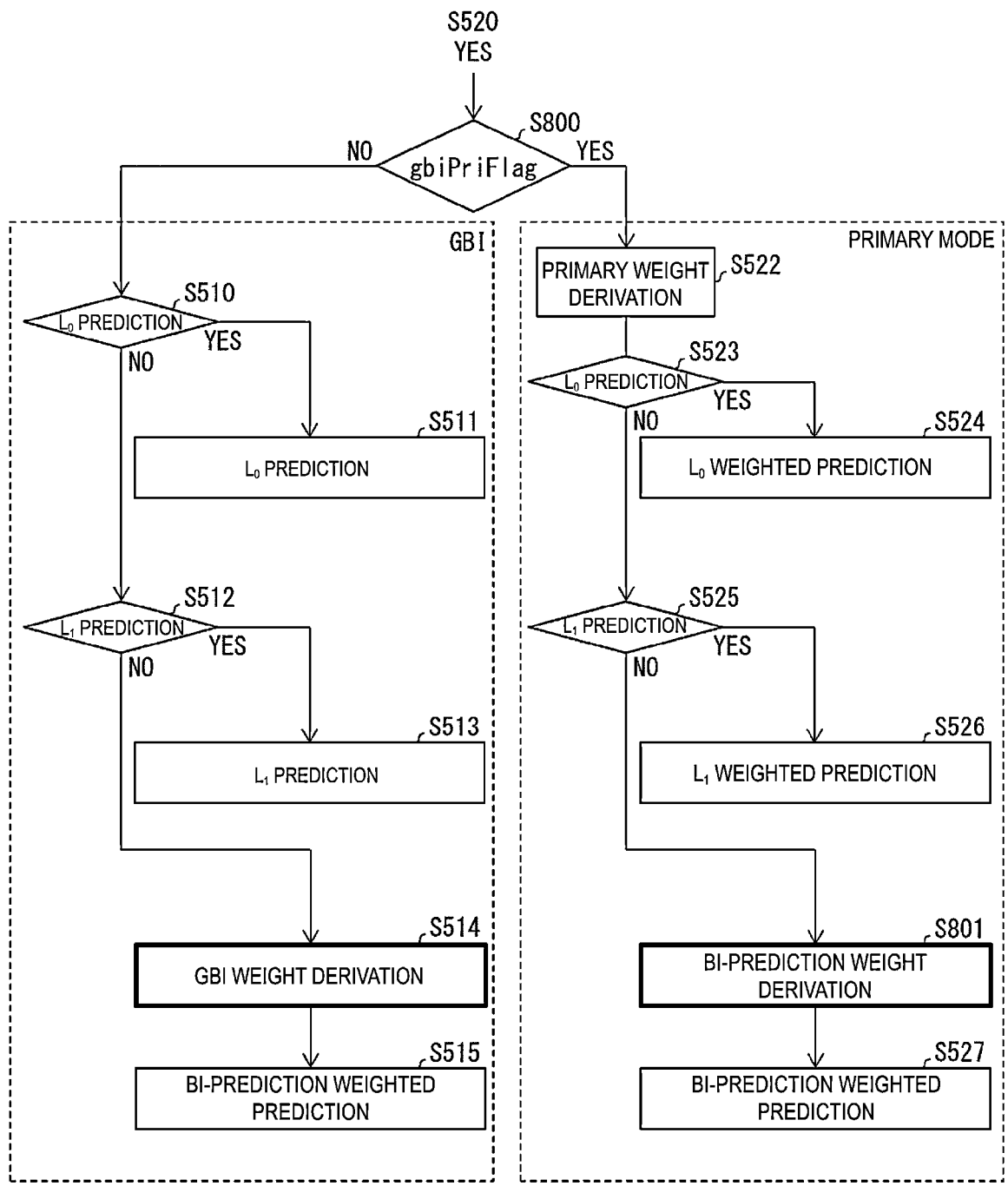
FIG. 34 is a flowchart illustrating another example of a flow of processing of the weighted prediction unit according to the present embodiment.

FIG. 34 is a flowchart illustrating a flow of processing in which the weighted prediction unit 3094 selects either the GBI prediction or a primary mode prediction in accordance with whether or not to be the primary mode. The flow of processing illustrated in FIG. 34 is a modification of the flow of processing that follows the case that the GBI prediction is configured to on in the slice header in FIG. 16 (YES in S520).

The prediction parameter decoding unit 302 decodes gbiPriFlag, and as illustrated in FIG. 34, the weighted prediction unit 3094 determines whether the value indicated by gbiPriFlag is 0 or 1 (S800).

In a case that gbiPriFlag indicates a value of 1 (YES in S800), the processing proceeds to S522. In other words, the weighted prediction unit 3094 derives the weight coefficients from the primary weight coefficient gbw_pri and the offset (S522), the processing proceeds to S523. In the processing from S523 to S526 illustrated in FIG. 34, the primary weight coefficient gbw_pri is configured to the weight coefficient w1 and (1<<(log 2Wd+1))−w1 is configured to the weight coefficient w0 in the processing from S210 to S213 described in "Processing for Generating Prediction Image Using WP Prediction" described above, and processing is performed in the same manner.

In a case that the prediction is not the L1 prediction (NO in S525), the weighted prediction unit 3094 derives a weight coefficient used for the bi-prediction (S801), and generates the prediction image using the derived bi-prediction weight coefficient (S527).

In a case that gbiPriFlag indicates a value of 0 (NO in S800), the processing proceeds to S510. The processing from S510 to S515 illustrated in FIG. 34 is the same as the processing from S410 to S415 described in "Processing for Generating Prediction Image Using Generalized Bi-Prediction (GBI Prediction)" described above, and thus the description is not repeated here. In a case that the prediction becomes the bi-prediction, the weighted prediction unit 3094 generates the prediction image using the GBI prediction.

Figure 35:
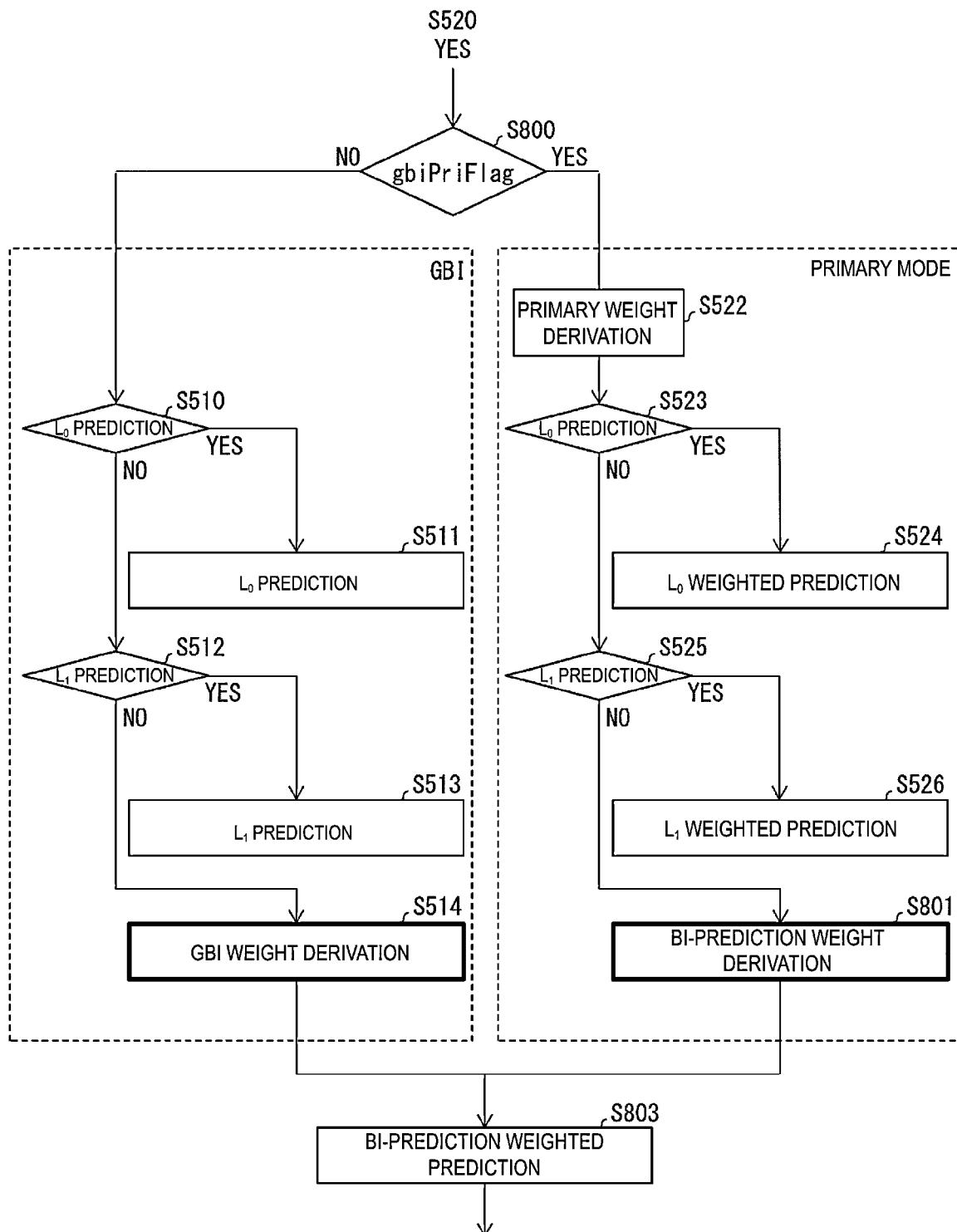
FIG. 35 is a flowchart illustrating another example of a flow of processing of the weighted prediction unit according to the present embodiment.

Furthermore, FIG. 35 is a flowchart illustrating another example of a flow of processing in which the weighted prediction unit 3094 selects either the GBI prediction or the primary mode prediction in accordance with the value indicated by gbiPriFlag. In processing illustrated in FIG. 34, the weighted prediction unit 3094 may include, in uni-prediction, a GBI prediction unit that performs the GBI prediction and a primary mode prediction unit that performs the prediction by the primary mode, and each unit of the GBI prediction unit and the primary mode prediction may perform processing until generation of the prediction image. Furthermore, in processing illustrated in FIG. 35, the weighted prediction unit 3094 may include, in bi-prediction, a GBI weight coefficient derivation unit that derives the weight coefficients used for the GBI prediction, and a WP weight coefficient derivation unit that derives the weight coefficients used for the WP prediction. Each unit of the GBI weight coefficient derivation unit and a WP weight coefficient derivation unit may perform processing until derivation of the weight coefficients used for GBI prediction (S514) and derivation of the weight coefficients used for the bi-prediction by the WP prediction (S522). The prediction image generation in the bi-prediction (S530) may be performed, regardless of the GBI prediction and the WP prediction, by a common bi-prediction prediction image generation unit, using the derived weight coefficients described above.

Figure 36:
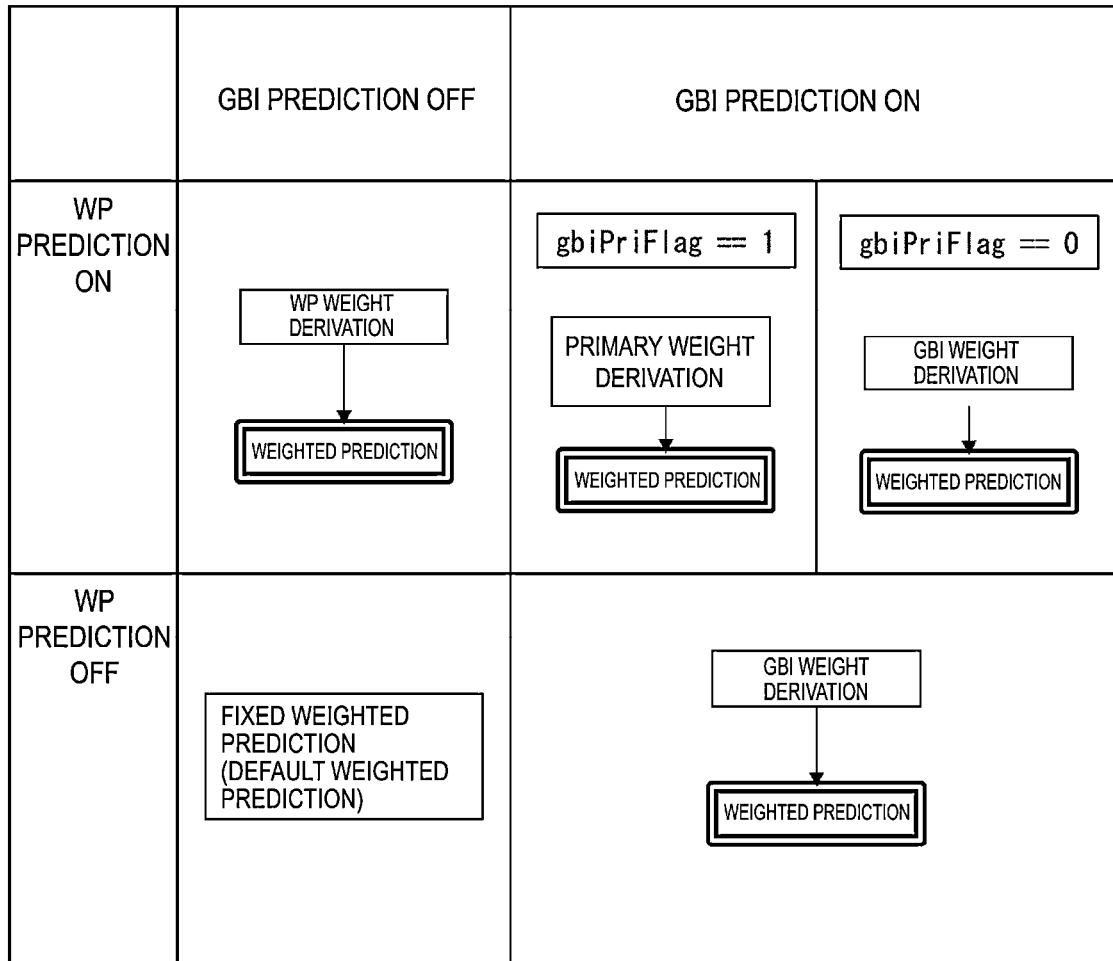
FIG. 36 is a diagram illustrating another example of a correspondence relationship between an on/off configuration of the WP prediction in a slice and an on/off configuration of the GBI prediction in a target coding unit and the type of bi-prediction processing, according to the present embodiment.

FIG. 36 is a diagram illustrating a correspondence relationship between an on/off configuration of the WP prediction in the slice and an on/off configuration of the GBI prediction in the target coding unit and the type of bi-prediction processing, in the present example.

As illustrated in FIG. 36, in a case that the WP prediction of the slice level is on and the GBI prediction is off, the weighted prediction unit 3094 derives the weight coefficients used for the WP prediction, and performs the bi-prediction processing using the WP prediction.

Furthermore, in a case that the WP prediction of the slice level is on and gbiPriFlag indicates a prescribed value (for example, 1), the weighted prediction unit 3094 derives the primary weight coefficient and performs the bi-prediction processing.

Furthermore, in a case that the WP prediction is on and gbiPriFlag indicates a value other than the prescribed value (for example, other than 1), the weighted prediction unit 3094 derives the GBI weight coefficients and performs the bi-prediction processing.

Furthermore, in a case that the WP prediction is off and the GBI prediction of the coding unit level is off, the weighted prediction unit 3094 performs the bi-prediction processing using the fixed weighted prediction.

Furthermore, in a case that the WP prediction is off and the GBI prediction of the coding unit level is on, the weighted prediction unit 3094 derives the weight coefficients used for the GBI prediction, and performs the bi-prediction processing using the GBI prediction.

Derivation Example 1 of Weight Coefficients Used for Bi-Prediction of Primary Mode In the primary mode, the weighted prediction unit 3094 derives the bi-prediction weight coefficients using gbw_pri in accordance with the value indicated by gbiIndex.

For example, in a case of the primary mode (gbiPriFlag=1), the weighted prediction unit 3094 selects the weight coefficient gbw1 indicated by gbiIndex from the table gbwTable[ ] as indicated by the following equations, and derives gbw0 by $$gbw0 = (1 << (\log 2Wd + 1)) - gbw1.$$

$$gbw1 = gbwTable[gbiIndex]$$

$$gbwTable[] = \{gbw\_pri, 1 << (\log 2Gbi - 1)\}$$

In the example described above, in a case that the value indicated by gbiIndex is defaultGbiIndex (0 in this example), the weight coefficient gbw1 becomes gbw_pri. In other words, the primary weight coefficient gbw_pri is used as a partial element (for example, the first element) of the table. Furthermore, in a case that the value indicated by gbiIndex is other than defaultGbiIndex (1 in this example), a value (1<<(log 2Wd)) which indicates 1:1 is used for the weight coefficient gbw1.

Note that in a case of the GBI prediction (gbiPriFlag=0), the weighted prediction unit 3094 selects the weight coefficient gbw1 indicated by gbiIndex from the table gbwTable[ ] as indicated by the following equations, and derives gbw0 by $$gbw0 = (1 << (\log 2Wd + 1)) - gbw1.$$

$$gbw1 = gbwTable[gbiIndex]$$

$$gbwTable[] = \{1 << (\log 2Gbi - 1), 5, 3\}$$

As described above, gbwTable[ ] switches depending on whether or not to be the primary mode.

Derivation Example 2 of Weight Coefficients Used for Bi-Prediction of Primary Mode Next, another example of the bi-prediction weight coefficients derived by the weighted prediction unit 3094 in the primary mode will be described.

For example, in a case of gbiPriFlag=1 and gbw_pri>= (1<<(log 2Gbi-1)), the weighted prediction unit 3094 selects the weight coefficient gbw1 indicated by gbiIndex from the table gbwTable[ ] indicated below as indicated by the following equations, and derives gbw0 by gbw0=(1<<(log 2Wd))−gbw1.

$$gbw1 = gbwTable[gbiIndex]$$

$$gbwTable[] = \{gbw\_pri, 1 << (\log 2Gbi - 1), gbw\_pri - dw\}$$

Furthermore, in a case of gbiPriFlag=1 and gbw_pri< (1<<(log 2Gbi−1)), the weighted prediction unit 3094 selects the weight coefficient gbw1 indicated by gbiIndex from the table gbwTable[ ] indicated below as indicated by the following equations, and derives gbw0 by gbw0=(1<< (log 2Wd))−gbw1.

$$gbw1 = gbwTable[gbiIndex]$$

$$gbwTable[] = \{gbw\_pri, 1 << (\log 2Gbi - 1), gbw\_pri - dw\}$$

In other words, in a case that the value indicated by gbiIndex is 0, the weight coefficient gbw1 becomes gbw_pri. Furthermore, in a case that the value indicated by gbiIndex is 1, the weight coefficient gbw1 becomes (1<<(log 2Wd−1)). Furthermore, in a case that the value indicated by gbiIndex is 2, in accordance with whether or not gbw_pri is equal to or smaller than (1<<(log 2Wd−1)), a value obtained by adding or a value obtained by subtracting the offset dw to or from gbw_pri serves as the weight coefficient gbw1. Note that the above-described offset (difference) dw is a value decoded from the coded data.

Note that in the present example, gbw_pri may be derived from the following equations.

$$gbw\_pri = (w1 * (1 << \log2Gbi))/(w0 + w1)$$

$$\log2Gbi2 = \log2Wd$$

Additionally, as indicated by the following equations, table processing may be used for deriving gbw_pri instead of the division described above.

$$gbw\_pri = (w1 * (1 << \log2Gbi)) * invTable[(w0 + w1)] >> shiftDiv$$

$$invTable[x] = ((1 << shiftDiv) + (x >> 1))/x$$

Derivation Example 3 of Weight Coefficients Used for Bi-Prediction of Primary Mode Next, more another example of the bi-prediction weight coefficients derived by the weighted prediction unit 3094 in the primary mode will be described.

For example, in a case of gbiPriFlag=1, the weighted prediction unit 3094 selects the weight coefficient gbw1 indicated by gbiIndex from the table gbwTable[ ] indicated below as indicated by the following equations, and derives gbw0 by gbw0=(1<<(log 2Wd))–gbw1.

$$gbw1 = gbwTable[gbiIndex]$$

gwbTable[] =

{gbw_pri, gbw_pri + dw0, gbw_pri − dw0, gbw_pri + dw1, gbw_pri − dw1}

In other words, in the present example, the weight coefficient is derived from any of the following descriptions.
(1) Weight coefficient is the primary weight coefficient gbw_pri
(2) Add the offsets (dw0, dw1) to the primary weight coefficient gbw_pri
(3) Subtract the offsets (dw0, dw1) from the primary weight coefficient gbw_pri Note that each of the above-described offsets dw0 and dw1 is a value decoded from the coded data.

Example of Weight Coefficients Used for WP Prediction in Merge Mode

In the present example, in the WP prediction in the merge mode, the weighted prediction unit 3094 does not inherit the weight coefficient configured to a merge candidate, and generates the prediction image using a weight coefficient configured for each reference picture.

For example, in a block of the merge candidate adjacent above the target block, in a case of gbwTable[ ]={1, 4, 6}/8 and gbiIndex=1, that is, in a case that the weight coefficient is 4, the weight coefficient inherited from the merge candidate causes the weight coefficient of the target block to become 4/8. In the present example, without inheriting the weight coefficient from the merge candidate, the weighted prediction unit 3094 generates the prediction image using the weight coefficient configured for each reference picture. For example, the weight coefficient configured for each reference picture may be the weight coefficient at the head in gbwTable[ ] (here, 1), which is most likely to be selected and is the weight coefficient (the weight coefficient received in the primary mode) used for the WP prediction received as the coded data.

Furthermore, the weighted prediction unit 3094 may perform scaling of the weight coefficients in the same manner as the motion vector mvLX. For example, the weighted prediction unit 3094 may perform scaling of the weight coefficients as indicated below.

In a case that a reference picture distance of L0 is assumed to be d0, and a reference picture distance of L1 is assumed to be d1, $$w0' = (1 - w1) * d0/(d0 + d1)$$

$$w1' = w1 * d1/(d0 + d1)$$

Furthermore, only in a case that the merge candidate is a spatial merge candidate in the WP prediction in the merge mode, the weighted prediction unit 3094 may inherit the weight coefficient configured to the merge candidate and generate the prediction image.

Furthermore, in the WP prediction in the merge mode, also in other than the spatial merge candidate (temporal merge candidate), the weighted prediction unit 3094 may inherit the weight coefficient of the spatial merge candidate and generate the prediction image.

In other words, in a case that the weighted prediction unit 3094 generates the prediction image using the merge prediction, the weighted prediction unit 3094 generates the prediction image using the weight coefficient of the spatial merge candidate.

According to the configuration described above, in a case that the prediction image is generated using the merge prediction, the weighted prediction unit 3094 generates the prediction image using the weight coefficient of the spatial merge candidate. Accordingly, at the time of the merge prediction, it is possible to generate the prediction image always using the weight coefficient of the spatial merge candidate.

Example of Weight Coefficients Used for Uni-Prediction in GBI Prediction

In the present example, the coded data includes an index indicating a weight coefficient used for the uni-prediction of the GBI prediction. In the uni-prediction in the GBI prediction, the prediction parameter decoding unit 302 decodes the index.

Subsequently, the weighted prediction unit 3094 selects a weight coefficient indicated by a value of syntax decoded from the coded data.

The weighted prediction unit 3094 generates the prediction image using the uni-prediction of the GBI prediction by following the equations.

$$Pred = (w0 * PredL0 + roundGbi) >> \log2Gbi$$

$$Pred = (w1 * PredL1 + roundGbi) >> \log2Gbi$$

For example, gbwTable[ ], which is used for the uni-prediction of the GBI prediction may include a weight coefficient 1<<log 2Gbi with which the uni-prediction can be performed, and another weight coefficient capable of handling generation of a fade image, and the like. Furthermore, gbwTable[ ] used for the uni-prediction and gbwTable[ ] used for the bi-prediction are made to be different tables, and the respective tables may include different weight coefficients.

According to the above-described configuration, the generation of the prediction image using the GBI prediction can be performed also in the uni-prediction. Accordingly, it is possible to handle the generation of the fade image or the like.

Derivation Example of Weight Coefficients Used for GBI Prediction: Use Differential Table In weight coefficient candidates included in the table gbwTable[ ] used for deriving the weight coefficient of the GBI prediction, weight coefficients of smaller than 0.5 and weight coefficients greater than 0.5 are symmetrically arranged with a weight coefficient (0.5) of 1:1 as the center. For example, gbwTable[ ]={4/8, 5/8, 3/8, 10/8, −2/8} can be expressed as gbwTable[ ]={4, 4+dw0, 4−dw0, 4+dw1, 4−dw1}.

In the present example, the weighted prediction unit 3094 derives a weight coefficient using an offset from a weight coefficient of a prescribed value indicated by a value of syntax decoded from coded data.

To describe in detail, the video decoding apparatus 31 has an offset table gbwTableDiff[ ] that includes a difference value of the offset as in the example below.

$$gbwTableDiff[] = \{0, dw0, dw1\}$$

For example, in the case of dw0=1 and dw1=6, gbwTableDiff[ ]={0, 1, 6} is set.

In the present example, the value of gbiIndex indicates a difference value of any offset included in gbwTableDiff[ ].

The weighted prediction unit 3094 derives a weight coefficient gw1 by adding a difference value derived from gbiIndex to a weight 1<<(log 2Gbi−1) indicating 1:1, as in the following equation. The index (gbiIndex+1)>>1 of the table of gbwTableDiff[ ] is 0 in a case that gbiIndex is 0, and indicates a value which increases by 1 each time 2 is added thereto. In other words, in a case that gbiIndexes are 0, 1, 2, 3, 4, the indexes are 0, 1, 1, 2, 2, respectively. Furthermore, the product by 1-2*(gbiIndex & 1) indicates the sign, and is configured such that the sign is reversed to +1 or −1 each time 1 is added to gbiIndex. In other words, in a case that gbiIndexes are 0, 1, 2, 3, 4, the indexes become −1, 1, −1, 1, −1, respectively.

$$gw1 = (1<<(\log 2Gbi-1) +$$
$$gbwTableDiff[(gbiIndex+1)>>1]*(1*2*gbiIndex\ \&\ 1)))$$

According to the above-described configuration, one offset can indicate the two weight coefficients, which are the sum of the prescribed weight coefficient and the offset, and the difference obtained by subtracting the offset from the prescribed weight coefficient. Accordingly, as compared to a configuration in which the value of gbiIndex indicates the weight coefficient, the table size included in the video decoding apparatus 31 can be reduced.

Furthermore, as another example of the offset table gbwTableDiff[ ] of the difference value, the table indicated by the following equation may be used.

$$gbwTableDiff[] = \{0, dw0, dw2, dw3\}$$

For example, in a case of dw0=1, dw1=−1, dw2=6, dw3=−6, gbwTableDiff[ ]={0, 1, −1, 6, −6} is obtained.

The weighted prediction unit 3094 derives the weight coefficient gw1 using the following equation.

$$gw1 = 1<<(\log 2Gbi-1) + gbwTableDiff[gbiIndex]$$

According to the above-described configuration, since the range of the size becomes smaller in the table including the offset than a table including the weight coefficient, the table size can be reduced.

Configuration of Video Coding Apparatus

Figure 37:
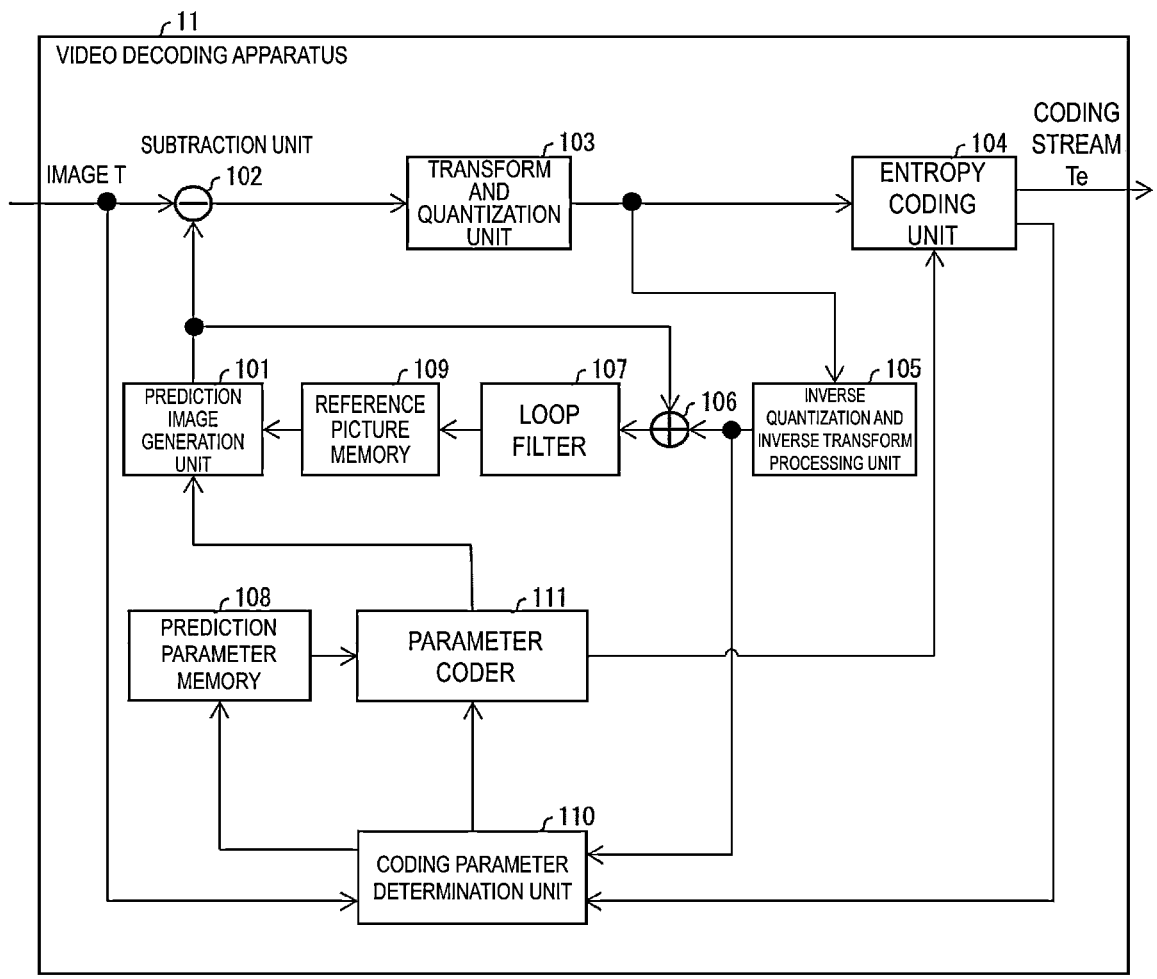
FIG. 37 is a block diagram illustrating a configuration of a video coding apparatus.

Next, a configuration of the video coding apparatus 11 according to the present embodiment will be described. FIG. 37 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, and an entropy coding unit 104.

The prediction image generation unit 101 generates a prediction image for each CU that is a region obtained by splitting each picture of an image T. The operation of the prediction image generation unit 101 is the same as that of the prediction image generation unit 308 already described, and description thereof will be omitted.

Figure 38:
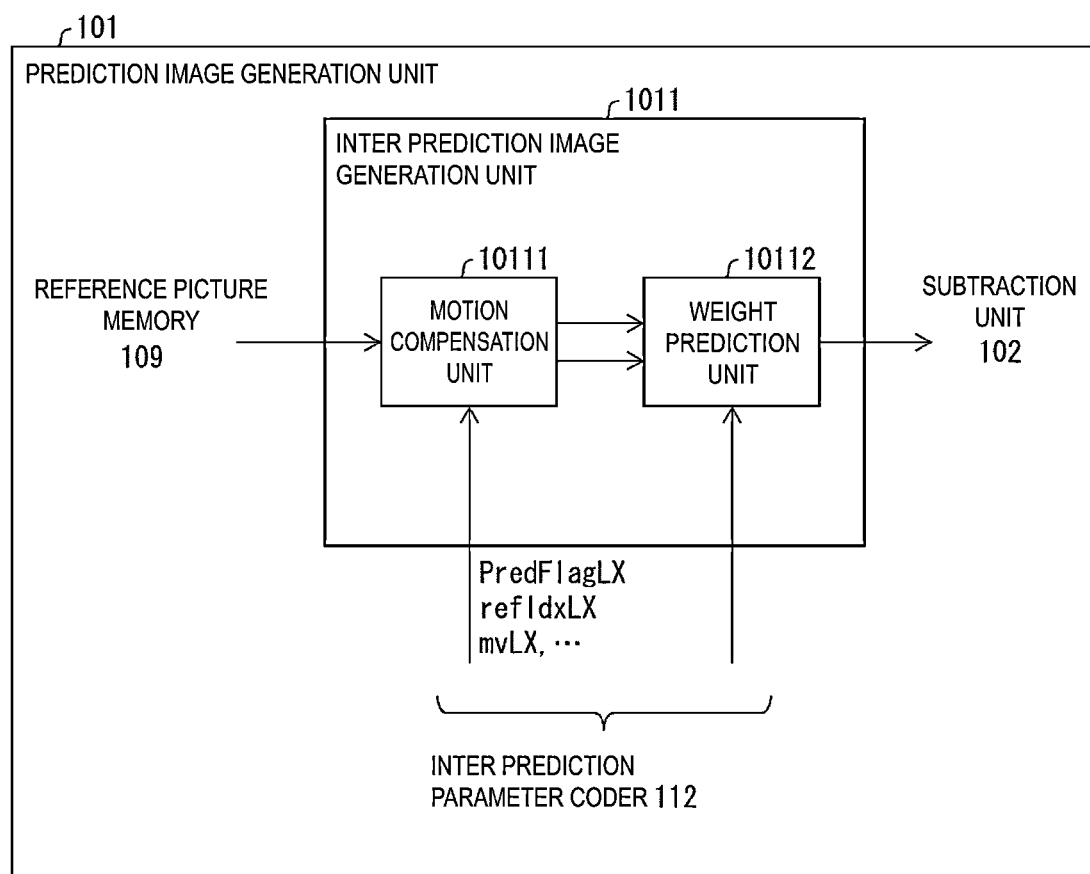
FIG. 38 is a block diagram illustrating a configuration of an inter prediction image generation unit of the video coding apparatus.

For example, FIG. 38 is a schematic diagram illustrating a configuration of an inter prediction image generation unit 1011 included in the prediction image generation unit 101. The inter prediction image generation unit 1011 is configured to include a motion compensation unit 10111 and a weighted prediction unit 10112. Descriptions about the motion compensation unit 10111 and the weighted prediction unit 10112 are omitted since the motion compensation unit 10111 and the weighted prediction unit 10112 have similar configurations of the above-mentioned motion compensation unit 3091 and weighted prediction unit 3094, respectively.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient by quantization. The transform and quantization unit 103 outputs the quantization transform coefficient to the entropy coding unit 104 and the inverse quantization and inverse transform processing unit 105.

The inverse quantization and inverse transform processing unit 105 is the same as the inverse quantization and inverse transform processing unit 311 (FIG. 7) in the video decoding apparatus 31, and descriptions thereof are omitted. The calculated prediction error is output to the addition unit 106.

To the entropy coding unit 104, the quantization transform coefficient is input from the transform and quantization unit 103, and coding parameters are input from the parameter coder 111. For example, coding parameters include codes such as a reference picture index refIdxLX, a prediction vector index mvp_LX_idx, a difference vector mvdLX, a prediction mode predMode, and a merge index merge_idx.

The entropy coding unit 104 performs entropy coding on split information, the prediction parameters, the quantization transform coefficient, and the like to generate and output a coding stream Te.

The parameter coder 111 includes a header coding unit 1110, a CT information coder 1111, a CU coder 1112 (prediction mode coder), and an inter prediction parameter coder 112 and an intra prediction parameter coder 113, which are not illustrated. The CU coder 1112 further includes a TU coder 1114.

Configuration of Inter Prediction Parameter Coder

The inter prediction parameter coder 112 derives inter prediction parameters based on the prediction parameters input from the coding parameter determination unit 110. The inter prediction parameter coder 112 includes a partly identical configuration to a configuration in which the inter prediction parameter decoding unit 303 derives inter prediction parameters.

Figure 39:
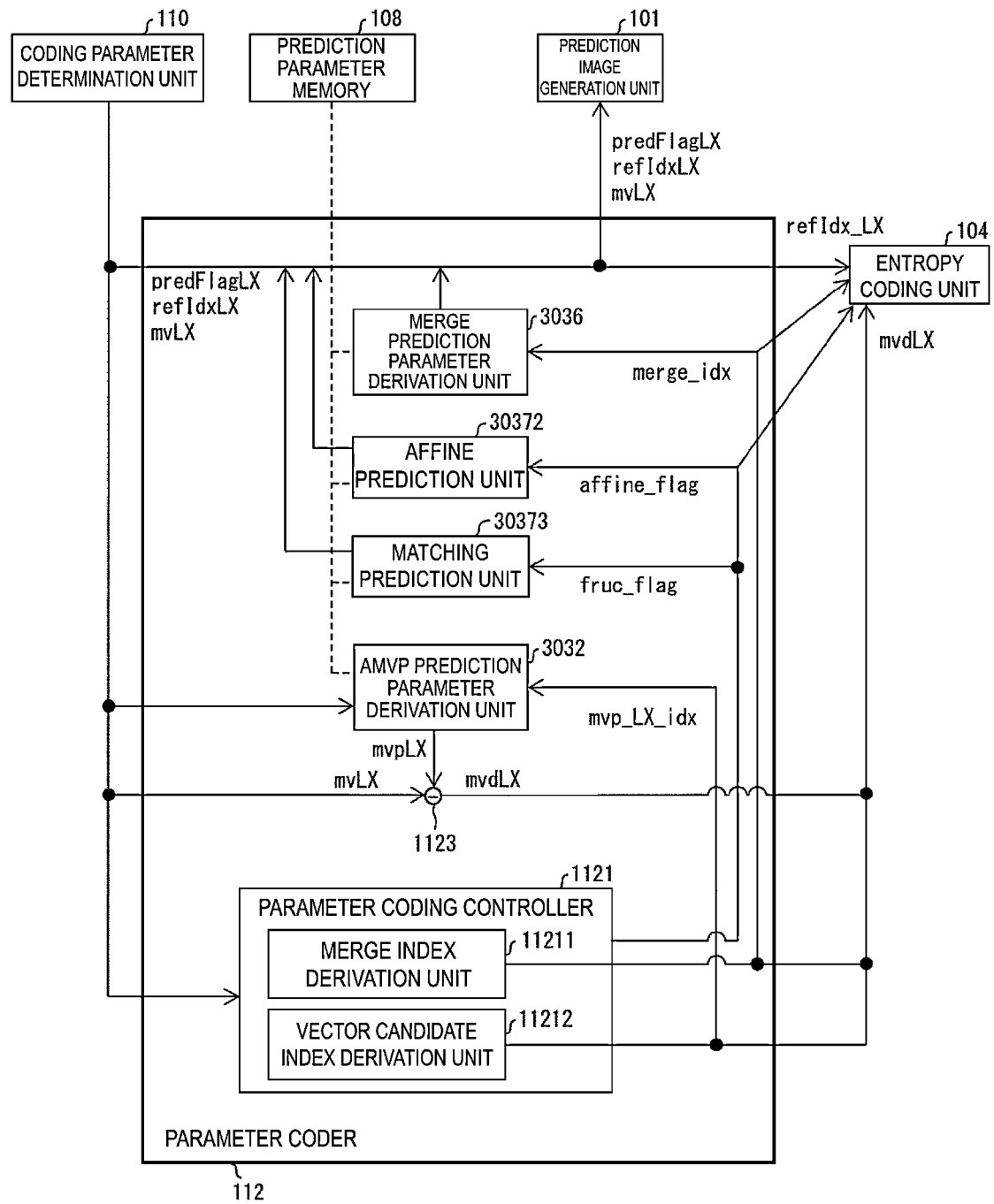
FIG. 39 is a schematic diagram illustrating a configuration of an inter prediction parameter coder.

A configuration of the inter prediction parameter coder 112 will be described. As illustrated in FIG. 39, a parameter coding controller 1121, the affine prediction unit 30372, the matching prediction unit 30373, the merge prediction parameter derivation unit 3036, the AMVP prediction parameter derivation unit 3032, and a subtraction unit 1123 are included. The parameter coding controller 1121 includes a merge index derivation unit 11211 and a vector candidate index derivation unit 11212. The merge prediction parameter derivation unit 3036, the AMVP prediction parameter derivation unit 3032, the affine prediction unit 30372, and the matching prediction unit 30373 may be collectively referred to as a motion vector derivation unit (motion vector derivation apparatus). The inter prediction parameter coder 112 outputs, to the prediction image generation unit 101, the motion vectors (mvLX, subMvLX), the reference picture index refIdxLX, the inter prediction indicator inter_pred_idc, or information indicating these. Furthermore, the inter prediction parameter coder 112 outputs, to the entropy coding unit 104, the merge flag merge_flag, the merge index merge_idx, the inter prediction indicator inter_pred_idc, the reference picture index refIdxLX, the prediction vector index mvp_lX_idx, the difference vector mvdLX, the affine flag affine_flag, and the matching flag fruc_flag.

The merge index derivation unit 11211 derives the merge index merge_idx, and outputs it to the merge prediction parameter derivation unit 3036 (merge prediction unit). The vector candidate index derivation unit 11212 derives the prediction vector index mvp_lX_idx.

The merge prediction parameter derivation unit 3036 derives the inter prediction parameter based on the merge index merge_idx.

The AMVP prediction parameter derivation unit 3032 derives the prediction vector mvpLX based on the motion vector mvLX. The AMVP prediction parameter derivation unit 3032 outputs the prediction vector mvpLX to the subtraction unit 1123. Note that the reference picture index refIdxLX and the prediction vector index mvp_lX_idx are output to the entropy coding unit 104.

The affine prediction unit 30372 derives an inter prediction parameter (affine prediction parameter) of a subblock.

The matching prediction unit 30373 derives an inter prediction parameter (motion vector) of a subblock.

The subtraction unit 1123 subtracts the prediction vector mvpLX, which is the output of the AMVP prediction parameter derivation unit 3032, from the motion vector mvLX input from the coding parameter determination unit 110, and generates the difference vector mvdLX. The difference vector mvdLX is output to the entropy coding unit 104.

The addition unit 106 adds a pixel value of the prediction image of the block input from the prediction image generation unit 101 and the prediction error input from the inverse quantization and inverse transform processing unit 105 to each other for each pixel, and generates a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among a plurality of sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the plurality of sets, an RD cost value indicating the magnitude of an amount of information and a coding error. The RD cost value is, for example, the sum of a code amount and the value obtained by multiplying a coefficient λ by a square error.

The code amount is an amount of information of the coding stream Te obtained by performing entropy coding on a quantization error and a coding parameter. The square error is the square sum of prediction errors calculated in the subtraction unit 102. The coefficient λ is a real number greater than a preconfigured zero. The coding parameter determination unit 110 selects a set of coding parameters of which cost value calculated is a minimum value. With this configuration, the entropy coding unit 104 outputs the selected set of coding parameters as the coding stream Te. The coding parameter determination unit 110 stores the determined coding parameters in the prediction parameter memory 108.

Note that, some of the video coding apparatus 11 and the video decoding apparatus 31 in the above-described embodiment, for example, the entropy decoding unit 301, the parameter decoding unit 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coding unit 104, the inverse quantization and inverse transform processing unit 105, the loop filter 107, the coding parameter determination unit 110, and the parameter coder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, a part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiment and various amendments can be made to a design that fall within the scope that does not depart from the gist of the present invention.

Application Examples

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

At first, referring to FIG. 2, it will be described that the above-mentioned video coding apparatus 11 and the video decoding apparatus 31 can be utilized for transmission and reception of videos.

Figure 2:
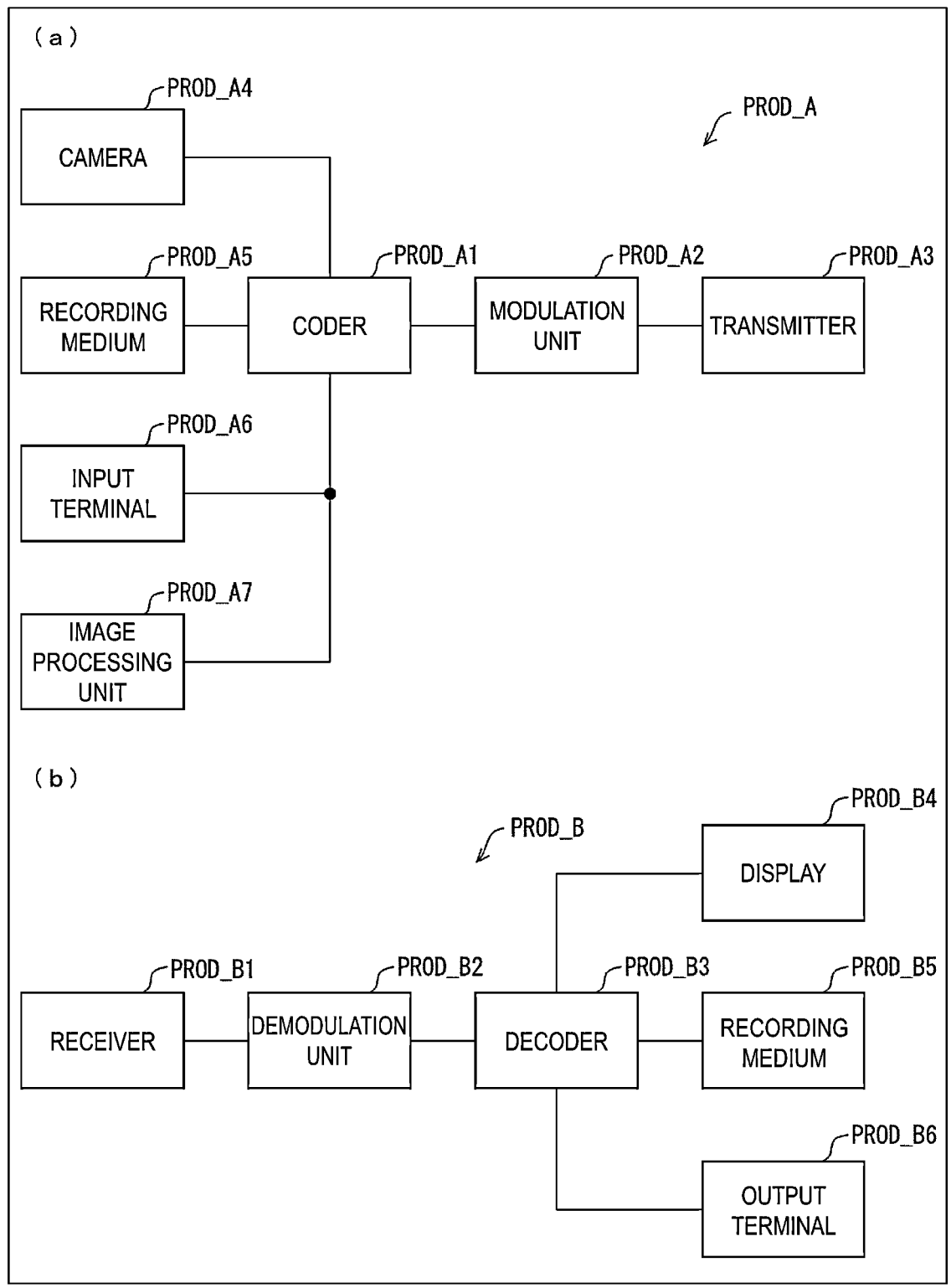
FIG. 2 is a diagram illustrating configurations of a transmitting apparatus equipped with a video coding apparatus and a receiving apparatus equipped with a video decoding apparatus according to the present embodiment. (a) thereof illustrates the transmitting apparatus equipped with the video coding apparatus, and (b) thereof illustrates the receiving apparatus equipped with the video decoding apparatus.

FIG. 2(*a*) is a block diagram illustrating a configuration of a transmitting apparatus PROD_A installed with the video coding apparatus 11. As illustrated in the diagram, the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in the diagram, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2(*b*) is a block diagram illustrating a configuration of a receiving apparatus PROD_B installed with the video decoding apparatus 31. As illustrated in the diagram, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in the diagram, some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Next, referring to FIG. 3, it will be described that the above-mentioned video coding apparatus 11 and the video decoding apparatus 31 can be utilized for recording and regeneration of videos.

Figure 3:
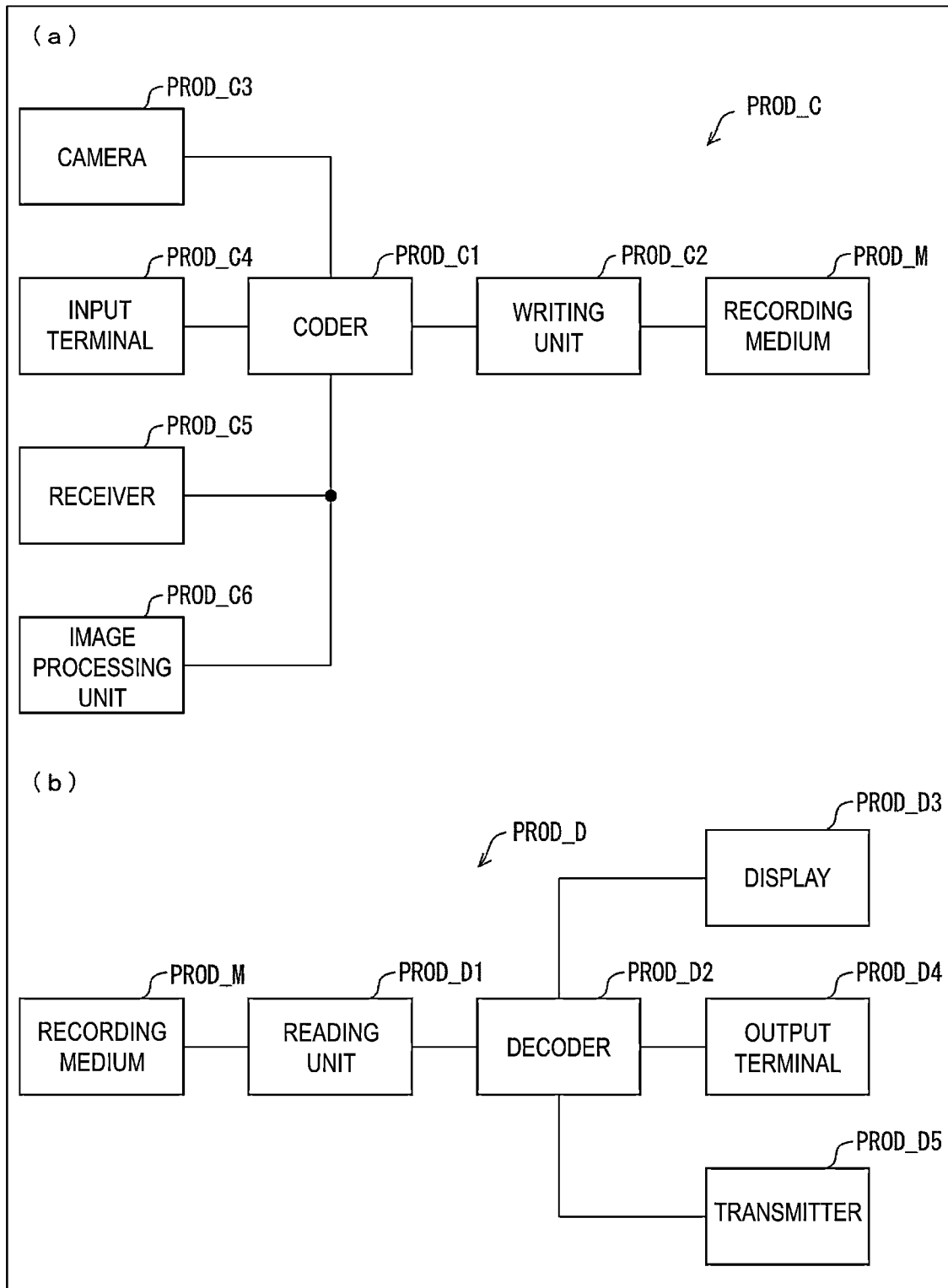
FIG. 3 is a diagram illustrating configurations of a recording apparatus equipped with the video coding apparatus and a reconstruction apparatus equipped with the video decoding apparatus according to the present embodiment. (a) thereof illustrates the recording apparatus equipped with the video coding apparatus, and (b) thereof illustrates the reconstruction apparatus equipped with the video decoding apparatus.

FIG. 3($a$) is a block diagram illustrating a configuration of a recording apparatus PROD_C installed with the above-mentioned video coding apparatus 11. As illustrated in the diagram, the recording apparatus PROD_C includes a coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in the diagram, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 3($b$) is a block diagram illustrating a configuration of a reconstruction apparatus PROD_D installed with the above-mentioned video decoding apparatus 31. As illustrated in the diagram, the reconstruction apparatus PROD_D includes a reading unit PROD_D1 which reads coded data written in the recording medium PROD_M, and a decoder PROD_D2 which obtains a video by decoding the coded data read by the reading unit PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in the diagram, some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. In addition, an objective of the embodiment of the present invention can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or an MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD: trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiment of the present invention can be also realized in the form of computer data signals embedded in a carrier such that the transmission of the program codes is embodied in electronic transmission.

The embodiment of the present invention is not limited to the above-described embodiment, and various modifications are possible within the scope of the claims. That is, an embodiment obtained by combining technical means modified appropriately within the scope defined by claims is included in the technical scope of the present invention as well.

Supplemental Note

An aspect of the present invention may also be expressed as follows.

An image coding apparatus according to an aspect of the present invention includes: in an image decoding apparatus for performing image decoding processing with reference to a prediction image, a prediction image generation unit configured to generate a prediction image by using at least one of weight coefficients and offsets that are applied to each pixel value included in one or a plurality of reference images and that are first weight coefficients and offsets configured for each first unit region and second weight coefficients configured for each second unit region different from the first unit region.

An image coding apparatus according to an aspect of the present invention includes: in an image decoding apparatus for performing image decoding processing with reference to a prediction image, a prediction image generation unit configured to derive weight coefficients and offsets calculated on each pixel value included in one or a plurality of reference images with reference to an index decoded from coded data for each slice, and configured to generate a prediction image by using at least one of the weight coefficients and offsets that are derived, in which the prediction image generation unit decodes at least one of the weight coefficients and the offsets from coded data in a case that the index is a prescribed value, and derives the weight coefficients with reference to the index in a case that the index is other than the prescribed value.

An image coding apparatus according to an aspect of the present invention includes: in an image decoding apparatus for performing image decoding processing with reference to a prediction image, a prediction image generation unit configured to generate a prediction image by using at least one of weight coefficients and offsets calculated on each pixel value included in one or a plurality of reference images, the weight coefficients and the offsets configured for each specific unit region, in which in a case that the prediction image generation unit generates a prediction image by using a merge prediction, the prediction image generation unit generates a prediction image by using a weight coefficient of a spatial merge candidate.

An image coding apparatus according to an aspect of the present invention includes: in an image decoding apparatus for performing image decoding processing with reference to a prediction image, a prediction image generation unit configured, by using weight coefficients calculated on each pixel value included in one reference image, the weight coefficients configured for each prescribed unit region, to generate the prediction image from the one reference image, in which the prediction image generation unit selects the weight coefficients indicated by a value of syntax decoded from coded data.

An image coding apparatus according to an aspect of the present invention includes: in an image decoding apparatus for performing image decoding processing with reference to a prediction image, a prediction image generation unit configured to generate the prediction image by using weight coefficients calculated on each pixel value included in one or a plurality of reference images, the weight coefficients configured for each prescribed unit region, in which the prediction image generation unit derives the weight coefficients by using an offset from a prescribed value indicated by a value of syntax decoded from coded data.

An image coding apparatus according to an aspect of the present invention includes: in an image coding apparatus for performing image coding processing with reference to a prediction image, a prediction image generation unit configured to generate a prediction image by using at least one of weight coefficients and offsets that are calculated on each pixel value included in one or a plurality of reference images and that are first weight coefficients and offsets configured for each first unit region and second weight coefficients configured for each second unit region different from the first unit region.

In order to solve the above-described problems, an image coding apparatus according to an aspect of the present invention includes: in an image coding apparatus for performing image coding processing with reference to a prediction image, a prediction image generation unit configured to derive weight coefficients and offsets calculated on each pixel value included in one or a plurality of reference images with reference to an index decoded from coded data for each slice, and configured to generate a prediction image by using at least one of the weight coefficients and offsets that are derived, in which the prediction image generation unit decodes at least one of the weight coefficients and the offsets from coded data in a case that the index is a prescribed value, and derives the weight coefficients with reference to the index in a case that the index is other than the prescribed value.

An image coding apparatus according to an aspect of the present invention includes: in an image coding apparatus for performing image coding processing with reference to a prediction image, a prediction image generation unit configured to generate a prediction image by using at least one of weight coefficients and offsets calculated on each pixel value included in one or a plurality of reference images, the weight coefficients and the offsets configured for each specific unit region, in which in a case that the prediction image generation unit generates a prediction image by using a merge prediction, the prediction image generation unit generates a prediction image by using a weight coefficient of a spatial merge candidate.

An image coding apparatus according to an aspect of the present invention includes: in an image coding apparatus for performing image coding processing with reference to a prediction image, a prediction image generation unit configured, by using weight coefficients calculated on each pixel value included in one reference image, the weight coefficients configured for each prescribed unit region, to generate the prediction image from the one reference image, in which the prediction image generation unit selects the weight coefficients indicated by a value of syntax decoded from coded data.

An image coding apparatus according to an aspect of the present invention includes: in an image coding apparatus for performing image coding processing with reference to a prediction image, a prediction image generation unit configured to generate the prediction image by using weight coefficients calculated on each pixel value included in one or a plurality of reference images, the weight coefficients configured for each prescribed unit region, in which the prediction image generation unit derives the weight coefficients by using an offset from a prescribed value indicated by a value of syntax decoded from coded data.

CROSS-REFERENCE OF RELATED APPLICATION

This application claims the benefit of priority to JP 2018-177818 filed on Sep. 21, 2018, which is incorporated herein by reference in its entirety.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

REFERENCE SIGNS LIST

31 Video decoding apparatus (image decoding apparatus)
3094 Weighted prediction unit (prediction image generation unit)
11 Video coding apparatus (image coding apparatus)
10112 Weighted prediction unit (prediction image generation unit)

The invention claimed is:

1. An image decoding apparatus for performing image decoding processing with reference to a prediction image, the image decoding apparatus comprising:
a parameter decoding circuit configured to (1) decode reference picture indices (refIdxL0, refIdxL1) from coded data, and (2) decode an accuracy (luma_log 2_weight_denom) of a first weight coefficient (w0) and a second weight coefficient (w1), a first difference value (delta_luma_weight_l0[i]) of the first weight coefficient (w0) and a second difference value (delta_luma_weight_l1[i]) of the second weight coefficient (w1) from the coded data; and
a prediction image generation circuit configured to generate a bi-prediction image (Pred) (1) by using the first weight coefficients (w0) and the second weight coefficient (w1) of a weighted prediction according to a first formula, Clip3(0,(1<<bitDepth)−1, (PredL0[x][y]*w0+PredL1[x][y]*w1+((o0+o1+1)<<log 2Wd))>>(log 2Wd+1)), wherein o0 and o1 are offsets derived from coded data, or (2) by using a third weight coefficient (gbw0) and a fourth weight coefficient (gbw1) of a generalized bi-prediction according to a second formula, (gbw0*predL0+gbw1*predL1+roundGbi)>>log 2Gbi2,
wherein the prediction image generation circuit (1) derives a first variable (LumaWeightL0[i]) specified by an index i by using the accuracy (luma_log 2_weight_denom) and the first difference value (delta_luma_weight_l0[i]), according to a third formula, LumaWeightL0[i]=(1<<luma_log 2_weight_denom)+delta_luma_weight_l0[i], (2) derives a second variable (LumaWeightL1 [i]) specified by the index i by using the accuracy (luma_log 2_weight_denom) and the second difference value (delta_luma_weight_l1[i]) according to a fourth formula, LumaWeightL1[i]=(1<<luma_log 2_weight_denom)+delta_luma_weight_l1[i], (3) derives the first weight coefficients (w0) equal to the first variable (Luma WeightL0[refIdxL0]) specified by the index i set equal to refIdxL0, and (4) derives the second weight coefficient (w1) equal to the second variable (Luma WeightL1 [refIdxL1]) specified by the index i set equal to refIdxL1,
the prediction image generation circuit (1) derives an index (gbiIndex) for each coding unit (CU), (2) derives the fourth weight coefficient (gbw1) equal to gbwTable [gbiIndex], and (3) derives the third weight coefficient (gbw0) based on the fourth weight coefficient (gbw1), wherein an index (gbiIndex) indicates one of elements of a table (gbwTable[ ]), the table (gbwTable[ ]) includes pre-defined plural weight coefficient candidates, in a case that the weighted prediction is on and the index (gbiIndex) is equal to a predetermined value, the prediction image generation circuit generates the bi-prediction image (Pred) by using the first weight coefficient (w0) and the second weight coefficient (w1) of the weighted prediction according to the first formula, and in a case that the weighted prediction is on and the index (gbiIndex) is not equal to the predetermined value, the prediction image generation circuit generates the bi-prediction image (Pred) by using the third weight coefficient (gbw0) and the fourth weight coefficient (gbw1) of the generalized bi-prediction according to the second formula.

* * * * *